United States Patent [19]
Ishii et al.

[11] Patent Number: 5,361,173
[45] Date of Patent: Nov. 1, 1994

[54] DEVICES FOR CONTROLLING RECORDING AND/OR REPRODUCING APPARATUS UTILIZING RECORDED MANAGEMENT DATA AND INTERACTIVE INFORMATION INPUT APPARATUS FOR AN ELECTRONIC DEVICE

[75] Inventors: Toshiyuki Ishii; Kousuki Misono, both of Kanagawa; Miwako Tsuneki; Kiyoshi Ota, both of Tokyo; Tetsuo Nishigaki, Kanagawa, all of Japan

[73] Assignee: Sony Corporation, Tokyo, Japan

[21] Appl. No.: 642,995

[22] Filed: Jan. 18, 1991

[30] Foreign Application Priority Data

Jan. 21, 1990 [JP] Japan ................................ 2-10866
Mar. 31, 1990 [JP] Japan ................................ 2-85700

[51] Int. Cl.$^5$ .................... G11B 5/02; G11B 15/04; G11B 19/04; G11B 31/00
[52] U.S. Cl. ......................... 360/27; 360/15; 360/55; 360/57; 360/60; 360/79
[58] Field of Search .............. 360/13, 14.1, 14.2, 360/14.3, 15, 27, 55, 57, 60, 79, 80; 364/410

[56] References Cited

U.S. PATENT DOCUMENTS

| | | | |
|---|---|---|---|
| 4,445,187 | 4/1984 | Best | 364/410 X |
| 4,490,810 | 12/1984 | Hon | 364/410 |
| 4,549,231 | 10/1985 | Namiki | 360/14.2 |
| 4,716,529 | 12/1987 | Nakayama | 364/410 |
| 4,734,792 | 3/1988 | Maeda et al. | 360/14.2 X |
| 4,796,223 | 1/1989 | Sugita et al. | 360/47 X |
| 4,891,784 | 1/1990 | Kato et al. | 364/900 |
| 5,210,851 | 5/1993 | Kato et al. | 395/425 |
| 5,227,926 | 7/1993 | Nagaoka et al. | 360/15 |

FOREIGN PATENT DOCUMENTS 3818801 12/1989 Germany .
2131221 6/1984 United Kingdom .

*Primary Examiner*—David Mis
*Attorney, Agent, or Firm*—William S. Frommer; Alvin Sinderbrand

[57] ABSTRACT

In a storage medium, data for controlling a recording and reproducing apparatus is stored in a management database recording region provided in recording tracks. Management data recorded in the management database recording region can include various types of management information, such as erase permission or inhibition, information indicating whether the program recorded in the recording tracks has been reproduced, external unit control data for controlling cooperating apparatus, subscriber data corresponding to a respective program, a recorded flag for redesignating recording reservation information corresponding to a recorded program as recorded program information and character display information for depicting a personified guide character for an interactive display.

11 Claims, 40 Drawing Sheets

| ITEM | CONTENT | BYTE |
|---|---|---|
| A1 | FORMAT VERSION | 1 |
| A2 | THE NUMBER OF REPEATED RECORDINGS | 1 |
| A3 | THE NUMBER OF PICTURES USED | 1 |
| A4 | THE NUMBER OF PROGRAMS USED | 1 |
| A5 | GENERATION DATE AND TIME | 5 |
| A6 | UPDATE DATE AND TIME | 5 |
| A7 | SYSTEM VOLUME NUMBER | 8 |
| A8 | SCREEN DISPLAY COLOR | 2 |
| A9 | VARIOUS FLAGS | 1 |
| A10 | TYPE OF VIDEO CASSETTE | 2 |
| A11 | PASSWORD | 2 |
| A12 | USER VOLUME NUMBER | 2 |
| A13 | REPRODUCING ORDER | 32 |
| A14 | RECORDING ORDER | 32 |
| A15 | VOLUME LABEL | 40 |

$D_{VMX}$

FIG. 5

| ITEM | CONTENT | BYTE |
|---|---|---|
| B 1 | STARING ADDRESS | 3 |
| B 2 | END ADDRESS | 3 |
| B 3 | VARIOUS FLAGS | 1 |
| B 4 | SYSTEM PROGRAM NUMBER | 1 |
| B 5 | PROGRAM NUMBER | 1 |
| B 6 | CATEGORY CODE | 1 |
| B 7 | INPUT SOURCE | 1 |
| B 8 | RECORDING/ACTION MODE | 1 |
| B 9 | RECORDING STARTING TIME | 5 |
| B 10 | RECORD END TIME | 2 |
| B 11 | RESERVATION RECORDING CONTROL INFORMATION | 10 |
| B 12 | TITLE | 40 |

$D_{PRX}$

TBL

| TODAY | TOMORROW | THE DAY AFTER TOMORROW | MONTH | 1 | 2 | 3 | 0 | BS | DISPLAY. | DON'T NOT |
|---|---|---|---|---|---|---|---|---|---|---|
| NEXT WEEK | EVERY WEEK | EVERY DAY | DATE | 4 | 5 | 6 | βIII | LINE | MODIFI- CATION. | CALENDAR |
| SUNDAY | MONDAY | TUESDAY | MORNING | 7 | 8 | 9 | HOUR | CABLE | CANCEL- ING. | |
| WEDNES- DAY | THURSDAY | FRIDAY | AFTER- NOON | 10 | 11 | 12 | MINUTE | ch | CONTINUOUS REPETITIONS | RECORD RESERVATION |
| SATURDAY | FROM | UP TO | FOR | OF | AT | TO | DURING | YES. | NO. | END |

|  | DATE | START | END | SUBSCRIBER |
|---|---|---|---|---|
| PRG1 → | 5.28 (MON) | 21:00 ~ | 22:00 | CHI CHI ← D_NAME |
| PRG2 → | 5.29 (TUES) | 20:00 ~ | 22:00 | HA HA |

4A (6A)     DISP1

FIG. 24

LIST1

RESERVATION LIST OF CHI CHI

|  | DATE | START | END |
|---|---|---|---|
| PRG11 → | 5.28 (MON) | 21:00 ~ | 22:00 |
| PRG12 → | 5.29 (TUES) | 21:00 ~ | 23:00 |
| PRG13 → | 5.30 (WED) | 21:00 ~ | 22:00 |

4A (6A)     DISP2

FIG. 25

PICTURE C1

PICTURE C2

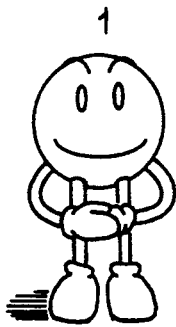
PICTURE C3
FIG. 30
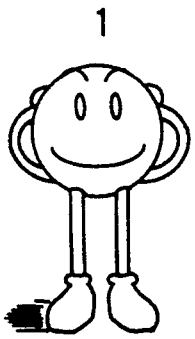
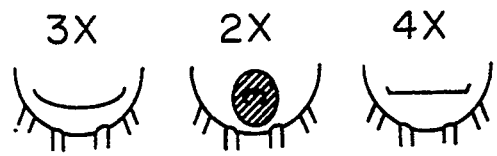
PICTURE C4
FIG. 31
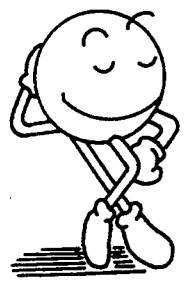
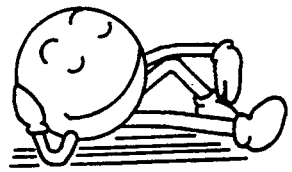
PICTURE C5
FIG. 32
PICTURE C6
FIG. 33

PICTURE C7

PICTURE C9

PICTURE C11

PICTURE C13

PICTURE C12

PICTURE C14

PICTURE C15

PICTURE C16

PICTURE C17

PICTURE C1-B

PICTURE KAO

| PICTURE NAME | MOTION NUMBER | ELEMENT | T₁ | T₂ | T₃ | T₄ | T₅ | T₆ | T₇ | T₈ | T₉ | T₁₀ | T₁₁ | T₁₂ | T₁₃ | T₁₄ | T₁₅ | ... |
|---|---|---|---|---|---|---|---|---|---|---|---|---|---|---|---|---|---|---|
| C 1 | 1-A | MOUTH | 2 | 3 | 2 | 3 | 2 | 3 | 2 | 3 | 2 | 3 | 2 | 3 | 2 | 3 | 2 | ... |
|  | 1-B | EYE | → | → | → | 4 | 5 | → | → | → | 4 | 5 | → | → | → | 4 | 5 | ... |
|  | 1-C | HAND | \multicolumn{15}{l}{PERFORM THE RECORD RESERVATION PLEASE} 8 8 8 9 | ... |
|  | 1-D | BOWING | → 6 | → 6 | 6 | 6 | 7 | → | → | → | → | → | → | → | → | → | → | ... |
| C 2 | 2-A | MOUTH | 2 | 3 | 2 | 3 | 2 | 3 | 2 | 3 | 2 | 3 | 2 | 3 | 2 | 3 | 2 | ... |
|  | 2-B | EYE | 4 | → | → | 5 | 4 | → | → | → | 5 | 4 | → | → | 2 | 5 | 4 | ... |
|  | 2-C | WINK | \multicolumn{15}{l}{(WINKING ONCE EVERY TIME THE EYES CLOSE FOUR TIMES)} | ... |
|  | 2-D | EYEBROW | → | → | 8 | → | → | → | → | 7 | → | → | → | → | 8 | → | → | ... |
|  | 2-E | HAND | → | → | → | → | 9 | 9 | 10 | → | → | → | 9 | 9 | 10 | → | → | ... |

DEPICTING PERIOD

FIG. 45A

| PICTURE NAME | MOTION NUMBER | ELEMENT | DEPICTING PERIOD ||||||||||||||| 
| --- | --- | --- | --- | --- | --- | --- | --- | --- | --- | --- | --- | --- | --- | --- | --- | --- |
| | | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ |
| C3 | 3-A | BLINKING | | | → | 2 | 3 | | | → | 2 | 3 | | | → | 2 | 3 |
| C4 | 4-A | BLINKING | | | → | 4 | 3 | | | → | 4 | 3 | | | → | 4 | 3 |
| | 4-B | YAWN EYE | 2 | 3 (AFTER 90 SECONDS EVERY 9 SECONDS) | | | | | | | | | | | | |
| | 4-BX | YAWNED MOUTH | 2X | 3X (AFTER 90 SECONDS EVERY 9 SECONDS) | | | | | | | | | | | | |
| | 4-C | EYE CLOSED | 4 (AFTER 2 MINUTES) | | | | | | | | | | | | | | |
| | 4-CX | MOUTH CLOSED | 4X (AFTER 2 MINUTES) | | | | | | | | | | | | | | |
| C5 | 5-A | | (AFTER 150 SECONDS) | | | | | | | | | | | | | | |
| C6 | 6-A | | (AFTER 3 MINUTES) | | | | | | | | | | | | | | |

FIG. 45B

| PICTURE NAME | MOTION NUMBER | ELEMENT | T₁ | T₂ | T₃ | T₄ | T₅ | T₆ | T₇ | T₈ | T₉ | T₁₀ | T₁₁ | T₁₂ | T₁₃ | T₁₄ | T₁₅ | ... |
|---|---|---|---|---|---|---|---|---|---|---|---|---|---|---|---|---|---|---|
| C7 | 7-A | MOUTH | 2 | 3 | 2 | 3 | 2 | 3 | 2 | 3 | 2 | 3 | 2 | 3 | 2 | 3 | 2 | ... |
|  | 7-B | EYE |  | ↑ | 6 | 4 | 5 | ↑ |  |  | 4 | 5 | ↑ |  | ↑ | 4 | 5 | ... |
|  | 7-C | RIGHT HAND |  | ↑ |  |  |  |  |  | ↑ | ↑ | 7 | ↑ | ↑ | 6 | ↑ | ↑ | ... |
|  | 7-D | LEFT HAND |  |  |  |  |  |  |  |  |  |  | ↑ | 9 | 8 | ↑ | ↑ | ... |
| C9 | 9-A | MOUTH | 2 | 3 | 2 | 3 | 2 | 3 | 2 | 3 | 2 | 3 | 2 | 3 | 2 | 3 | 2 | ... |
| C11 |  |  |  |  |  |  |  |  |  |  |  |  |  |  |  |  |  |  |

DEPICTING PERIOD

FIG. 45C

| PICTURE NAME | MOTION NUMBER | ELEMENT | DEPICTING PERIOD ||||||||||||||| 
|---|---|---|---|---|---|---|---|---|---|---|---|---|---|---|---|
| | | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ |
| C12 | 12-A | MOUTH | 2 | 3 | 2 | 3 | 2 | 3 | 2 | 3 | 2 | 3 | 2 | 3 | 2 | 3 | 2 |
| | 12-B | EYE | | | ↑ | 4 | 5 | | ↑ | | 4 | 5 | | | ↑ | 4 | 5 |
| | 12-C | HAND | ↑ | | | ↑ | 6 | | ↑ | 7 | ↑ | 6 | | ↑ | | | ↑ |
| C13 | | | | | | | | | | | | | | | | | |
| C14 | 14-A | MOUTH | 2 | 3 | 2 | 3 | 2 | 3 | 2 | 3 | 2 | 3 | 2 | 3 | 2 | 3 | 2 |
| | 14-B | EYE | | | ↑ | 4 | 5 | | ↑ | | 4 | 5 | | | ↑ | 4 | 5 |
| | 14-C | HAND | ↑ | 6 | 7 | | | | | | | | | | ↑ | 6 | 7 |

FIG. 45D

| PICTURE NAME | MOTION NUMBER | ELEMENT | DEPICTING PERIOD | | | | | | | | | | | | | | | |
|---|---|---|---|---|---|---|---|---|---|---|---|---|---|---|---|---|---|---|
| | | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | ⋯ |
| C15 | 15-A | MOUTH (HAND) | 7 | 6 | 7 | 6 | | | | | | | 3/7 | 2/6 | 7 | 6 | 7 | |
| | 15-AX | MOUTH (HAND) | ↑ | | | ↑ | 5/9 | 4/8 | 9 | 8 | 9 | 8 | ↑ | | | | ↑ | |
| | 15-B | EYE | 12 | 11 | — | 10 | 11 | | | | 10 | 11 | | | | 10 | 11 | |
| | 15-C | RIGHT HAND | ↑ | | | ↑ | 15 | 13 | 15 | 13 | 16 | 14 | | | ↑ | | ↑ | |
| C16 | 16-A | | 2 | 3 | 2 | 3 | 2 | 3 | 2 | 3 | 2 | 3 | 2 | 3 | 2 | 3 | 2 | |
| C17 | 17-A | MOUTH HAND | 2 | 3 | 2 | 3 | 2 | 3 | 2 | 3 | 2 | 3 | 2 | 3 | 2 | 3 | 2 | |
| | 17-B | FOOT | 4 | 5 | 4 | 5 | 4 | 5 | 4 | 5 | 4 | 5 | 4 | 5 | 4 | 5 | 4 | |
| C1-B | | | | | | | | | | | | | | | | | | |

| PICTURE NAME | EXPRESSIONS | MOTION NUMBER | DEPICTING PERIOD |||||||||||||||| 
|---|---|---|---|---|---|---|---|---|---|---|---|---|---|---|---|---|---|
| | | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | ⋯ |
| KAO | MESSAGE 1 | A | 3 | 2 | 3 | 2 | 3 | 2 | 3 | 2 | 3 | 2 | 3 | 2 | 3 | 2 | 3 | |
| | | | 5 | ↑ | | | 9 | 5 | | ↑ | | 9 | 5 | 4 | | | ↑ | |
| | MESSAGE 2 | B | 3 | 2 | 3 | 2 | 3 | 2 | 3 | 2 | 3 | 2 | 3 | 2 | 3 | 2 | 3 | |
| | | | 5 | | | ↑ | 9 | 4 | ↑ | 6 | 5 | | | ↑ | 9 | 4 | ↑ | |
| | MESSAGE 3 | C | 3 | 2 | 3 | 2 | 3 | 2 | 3 | 2 | 3 | 2 | 3 | 2 | 3 | 2 | 3 | |
| | | | 4 | | | ↑ | 9 | 4 | 7 | | 5 | | | | 9 | 5 | ↑ | |
| | WAITING 1 | D | 3 | | | | | | | | | | | | | | | |
| | | | 5 | | ↑ | 9 | 5 | | ↑ | 7 | 5 | ↑ | 9 | 5 | ↑ | 7 | 5 | |

| PICTURE NAME | EXPRESSIONS | MOTION NUMBER | DEPICTING PERIOD ||||||||||||||| |
|---|---|---|---|---|---|---|---|---|---|---|---|---|---|---|---|---|
| | | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ |
| KAO | MESSAGE 4 | E | 15 | 17 | 15 | 17 | 15 | 17 | 15 | 17 | 15 | 17 | 15 | 17 | 15 | 17 | 15 |
| | | | | | ↑ | 11 | 14 | | | ↑ | 11 | 14 | | ↑ | | 11 | 14 |
| | MESSAGE 5 | F | 15 | 17 | 15 | 17 | 15 | 17 | 15 | 17 | 15 | 17 | 15 | 17 | 15 | 17 | 15 |
| | | | | ↑ | ↑ | 11 | 14 | | ↑ | 12 | 14 | | 15 | ↑ | 11 | 15 | ↑ |
| | WAITING 2 | G | 13 | | | | | | | | | | | | | | ↑ |
| | | | 16 | 17 | 16 | 17 | 16 | 17 | 16 | 17 | 16 | 17 | 16 | 17 | 16 | 17 | 16 |

FIG. 46B

DEVICES FOR CONTROLLING RECORDING AND/OR REPRODUCING APPARATUS UTILIZING RECORDED MANAGEMENT DATA AND INTERACTIVE INFORMATION INPUT APPARATUS FOR AN ELECTRONIC DEVICE

BACKGROUND OF THE INVENTION

This invention relates to a recording and reproducing apparatus, and more particularly to a recording and reproducing apparatus applicable in electronic devices for consumer use such as video tape recorders (VTR) for recording and reproducing a program, so-called radio cassettes and the like.

A tape recorder of the above-described type is disclosed in U.S. Pat. No. 4,224,644.

The following is a description of a conventional video tape recorder for consumer use. A plurality of programs are recorded on a video tape extending in a longitudinal direction. In this case, a program head fetching signal is recorded in the starting position of each program. For instance, when the user wants to reproduce a desired program from a program-recorded tape, the video tape recorder is temporarily set in a search mode. The video tape is quickly fed to a position in which the program head fetching signal can be regenerated. Thereafter, the video tape recorder is temporarily changed over to the reproducing mode for confirming whether or not the program is the one the user wants to watch.

However, the following problems are inherent in this type of conventional video tape recorder. For confirming whether the user has seen a program recorded on the video tape in the past, and if, for example, a plurality of programs are recorded in a signal video cassette, the initial position of each program is searched. Subsequently, complicated operations are repeated, wherein the relevant program is reproduced to confirm the content thereof. Besides, it is required that the content be determined by reproducing the program from the video cassette. Thus, troublesome manipulation is indispensable for practical use.

Furthermore, this type of conventional video tape recorder presents the following problems. An erase-prevention pawl is provided on the box of the video cassette. Recording in the video cassette is inhibited by breaking off this pawl.

Hence, even is such a video cassette whose pawl has been broken off for preventing erasure is loaded in a VTR to execute a recording, the VTR cannot start recording.

When the pawl of such a video cassette is broken off to set an erase inhibiting status, however, all the information recorded on the video tape of the video cassette is subject to the erase inhibiting status. As a result, for instance, if a plurality of programs were recorded on the video tape of the single video cassette, it is difficult to set only one predetermined program of the plurality in the erase-inhibiting status.

The video cassette whose pawl is broken off to prevent erasure is then brought into an erase inhibiting status. However, when resetting the video cassette in the erase permission status, it is necessary to adhere an adhesive tape or the like in place of the broken pawl which is inconvenient. Besides, an erase inhibition status cannot be achieved where a video cassette with an unbroken pawl is loaded into the VTR body. Thus, sufficient practicability is not provided.

Moreover in a conventional video tape recorder for consumer use, a plurality of programs are recorded by reservation on a video tape extending in a longitudinal direction. In this case, the user sequentially reserves reservation information on respective programs by utilizing an internal tuner and timer. Then, recording proceeds.

The conventional video tape recorder only executes relatively simple functions. Consequently, a conventional information recording and reproducing apparatus could not execute the following elaborate control processes over external units. The same apparatus could not record a picture in a reserved recording mode while interlocking with external units consisting of a variety of picture sources such as tuners, video tape recorders and the like for a desired period as necessary. Besides, this prior art apparatus could not cause one or a plurality of video tape recorders to effect dubbing of regenerative video signals and monitors to display the pictures.

Moreover in use this type of conventional video tape recorder presents the following problems. The information for a plurality of programs is recorded only in program-recorded video tape positions per program. Therefore, when confirming or determining or searching the program the user wants to reproduce, the search is repeated until the desired program is reached. This in fact requires a troublesome operation of quickly feeding the video tape over a long period of time.

In the case of managing a multiplicity of recorded video tapes or non-recorded video tapes or a so-called series program in which recording extends over a plurality of video tapes, the following troublesome management operations are required. The user has to write beforehand, in a cassette or a cassette case of the video tape, the contents of the program recorded on each video tape, the recording time and the management information indicating whether to preserve the programs.

However, the effort to write the management information or discern the written management information by reading is troublesome. The amount of work cumulatively increases with the number of programs to be recorded or reserved and of the video tapes. It is therefore desirable that the operations be simplified as much as possible.

Moreover, this type of electronic device for consumer use, e.g., a vide tape recorder, is contrived as follows. One or a plurality of programs that the user wants to record are reserve-recorded by use of a program timer. Still higher functions are executable by employing the information registered by reservation.

Where a plurality of users commonly employ this type of conventional video tape recorder, however, the following problems arise. When modifying or canceling the reserve-registered information on the reserve-registered program, pieces of intermixed reserving information respectively registered by the plurality of users are indistinguishably displayed as is on the display screen at one time. It is therefore difficult to grasp and read the contents of information reserved by the users themselves.

If a time zone of a newly registered program overlaps that of a previously registered program, the following inconvenience is caused. It is impossible to know who registered the programs whose time zones overlap from the contents displayed on the screen. For this reason, when modifying or canceling the reserved information, the user concerned cannot see whether another user's consent needs to be obtained. Hence, there is a possibility that programs having higher significance can be recorded, or partial recording is merely allowed.

A multifunctional electronic device for consumer use presents the following problems. To execute a multiplicity of operational modes without causing any error, the user is required to input proper instructions at times adapted to the operational status of the electronic device. To satisfy this requirement, a monitor display screen is used as a means for inputting the information. Displayed on the display screen are interactive display elements such as messages or the like to display an input operation performed by the user. This may be considered effective for guiding the user's operating procedures in accordance with the operational status of the electronic device in a man-machine interactive mode.

As a matter of fact, however, where the electronic device is highly multi-functional, the contents of the messages displayed on the display screen become more and more complicated. For this reason, presumably the user cannot intuitively determine which input operation to carry out.

Accordingly, an object of the present invention is to provide a recording and reproducing apparatus in which the user is able to confirm by a simple method whether or not a program recorded on a recording medium was reproduced in the past.

Another object of the present invention is to provide a recording and reproducing apparatus capable of controlling the erase-inhibition status of a predetermined program among a plurality of programs recorded on a single recording medium.

Another object of the present invention is to provide a recording and reproducing apparatus capable of specifying an erase permission or inhibition status with priority to the condition of an erase-prevention pawl.

Another object of the present invention is to provide an information recording and reproducing apparatus capable of further facilitating systemization with external units by transmitting control signals to the external units in a variety of forms as needed.

Another object of the present invention is to provide an information recording and reproducing apparatus capable of further simplifying the processes of recording and reserving information when recording and reserving the program (hereinafter referred to as record-/reservation).

Another object of the present invention is to provide a program reserving apparatus in which a plurality of users are able to easily grasp the contents of necessary reservation information even when the plurality of users employ in common the program reserving apparatus. Thus, operability can be further improved.

Another object of the present invention is to provide an information inputting device arranged so that the user can intuitively judge the contents of a guide display thereof with accuracy.

The foregoing objects and other objects of the invention have been achieved by the provision of an apparatus for recording program information in a form reproducible by a program reproduction apparatus comprising: a recording medium 36 formed with a recording track; and a management database recording region provided in the recording track on which management data is recorded, the management data being usable for managing a program recorded on the recording track wherein the management data includes reproduction information indicating whether a program recorded in the recording track has been reproduced and corresponding to the recorded program, the reproduction information being recorded in a form capable of controlling the display thereof to a user by the program reproduction apparatus.

A representation element is displayed based on the reproduction information. It is possible to confirm whether or not each recorded program was reproduced in the past by a simple method of discerning the representation element. This method does not require troublesome efforts to determine the contents of each recorded program by reproducing it.

The foregoing objects and other objects of the invention have also been achieved by the provision of a device for controlling a recording and reproducing apparatus comprising: a recording medium formed with a recording track; and a management database recording region provided in the recording track on which management data $D_{AV}$ is recorded, the management data being operative for managing programs recorded on the recording track, wherein erase permission information or erase inhibition information is recorded in the management database recording region as program information corresponding to each of the programs recorded on the recording track, such that the erase permission status of the corresponding program is predetermined so that the programs may either be erased or inhibited from being erased based on the erase permission information or the erase inhibition information.

The erase permission or erase inhibiting of each of a plurality of programs recorded on the recording medium is specified by the erase permission/inhibition information recorded as program information in the management data recording region. When the recording medium is changed and program information having erase inhibition information recorded therewith is read therefrom, erasure of the program can be prevented.

The foregoing objects and other objects of the invention have been achieved further by the provisions of a device for controlling a recording and reproducing apparatus comprising: a recording medium formed with recording tracks; and a management database recording region provided in the recording tracks on which management data is recorded, the management data being operative for managing programs recorded on the recording tracks, wherein erase permission information or erase inhibition information is recorded in the management database recording region such that the program on the recording medium 36 is erased (or erasure is inhibited) based on the erase permission information or erase inhibition information.

The information for specifying erase permission or erase inhibition is recorded in the management data recording region of the recording medium. Based on this information, the erase permission or inhibition status of the recording and reproducing apparatus is controlled. The user is thereby allowed to specify the erase permission or erase inhibition status as necessary when setting the management data $D_{AV}$. As a result, the operability of the apparatus can be further improved.

The foregoing objects and other objects of the invention have also been achieved by the provision of a control device for use with a recording and reproducing apparatus arranged to record at least one program on recording tracks formed on a recording medium wherein a management database region is formed in predetermined positions of the recording tracks in which management data corresponding to the program is recorded in the management database in a form which is reproducible by the recording and reproducing apparatus; the management data including external unit control data operative when reproduced by the recording and reproducing apparatus to control a plurality of external units coupled with the recording and reproducing apparatus.

The external unit control data stored with the management data are transmitted as control signals to the external units. The plurality of external units can thereby be controlled.

The foregoing objects and other objects of the invention have been further achieved:

in a program storage device arranged to record at least one program on recording tracks formed on a recording medium thereof, a management database region is formed in predetermined positions of the recording tracks in which management data corresponding to a program is recorded, the management data including a recorded program flag which is operative when changed to a recorded program state to redesignate recording reservation information corresponding to a respective program which has been recorded to recorded program information.

The recorded program flag is recorded in the management database recording region. The program information previously written as reserving information is redesignated as recorded program information, thereby further simplifying the processes of recording and reserving information.

The foregoing objects and other objects of the invention have been achieved still further by the provision of a storage device for controlling the display of program reservation information by a program reproduction apparatus for programs stored in the storage device comprising: a recording medium formed with recording tracks having portions provided for storing at least one program wherein management database recording regions are provided on the recording tracks for recording management data corresponding to each program in a form which is reproducible by the program reproduction apparatus, the management data including subscriber data corresponding to at least one respective program, the subscriber data being operative when reproduced by the program reproduction apparatus to control the display of a reservation status of the respective program by the program reproduction apparatus.

A registration status of the program is displayed on a display screen of the program reproduction apparatus in accordance with the subscriber data. Even when a plurality of users commonly employ the storage device, the subscribers are able to readily confirm the program reservation status of their respective programs. It is therefore feasible to accurately grasp the program reservation status.

The foregoing objects and other objects of the invention have been achieved yet again by the provision of an information inputting apparatus for prompting a user response by providing an interactive display representing operating conditions of an electronic device on a display screen thereof comprising a message display means for displaying a personified guide character on the display screen in association with the displayed messages and exhibiting expressions and actions for conveying information to users corresponding to the contents of the messages displayed by the interactive display means.

When the interactive display message is provided to the user, the guide character is displayed exhibiting expressions and actions corresponding to the contents of the message. The user is therefore able readily to intuitively grasp the operating conditions of the electronic device with the help of the guide character. The corresponding information inputting operation can be performed more easily and accurately.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4 to 6 are, respectively, a schematic diagram and charts showing the configuration of a management database;

FIG. 11 is a chart showing a configuration of a language specified item list;

FIG. 24 is a chart showing a reservation display screen;

FIG. 25 is a chart showing a reservation display screen arranged according to subscriber;

FIGS. 28 to 44 are schematic diagrams showing display elements of guide characters; and FIGS. 45A–46B are charts for describing basic pictures, and actions and expressions of faces thereof.

DETAILED DESCRIPTION OF THE INVENTION

Preferred embodiments of this invention will be described with reference to the accompanying drawings.

[I] FIRST EMBODIMENT (1) Overall Construction of Video Tape Recorder

Figure 1A:
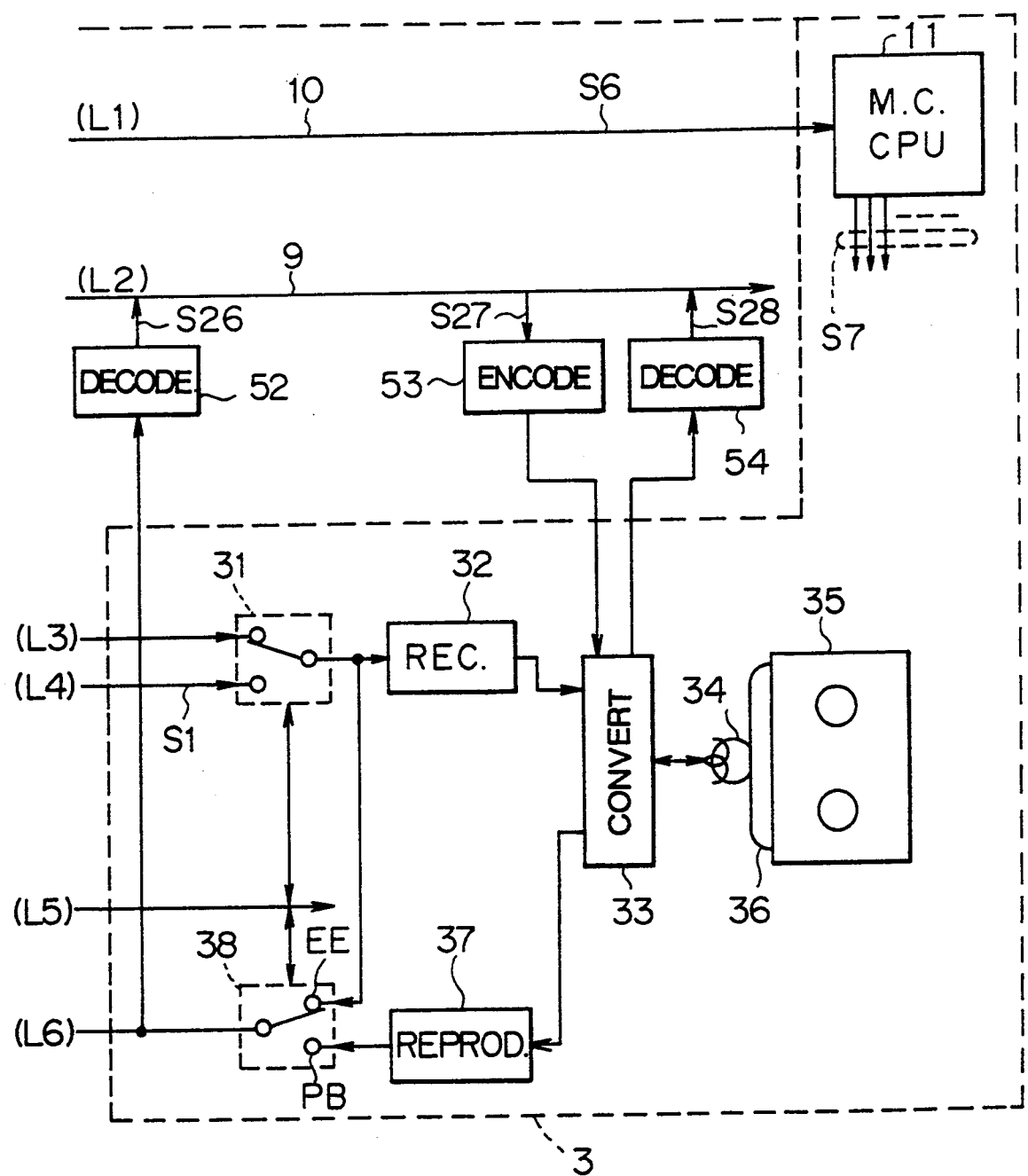
FIGS. 1A and 1B together provide an overall block diagram of a video tape recorder according to the present invention.
Figure 1B:
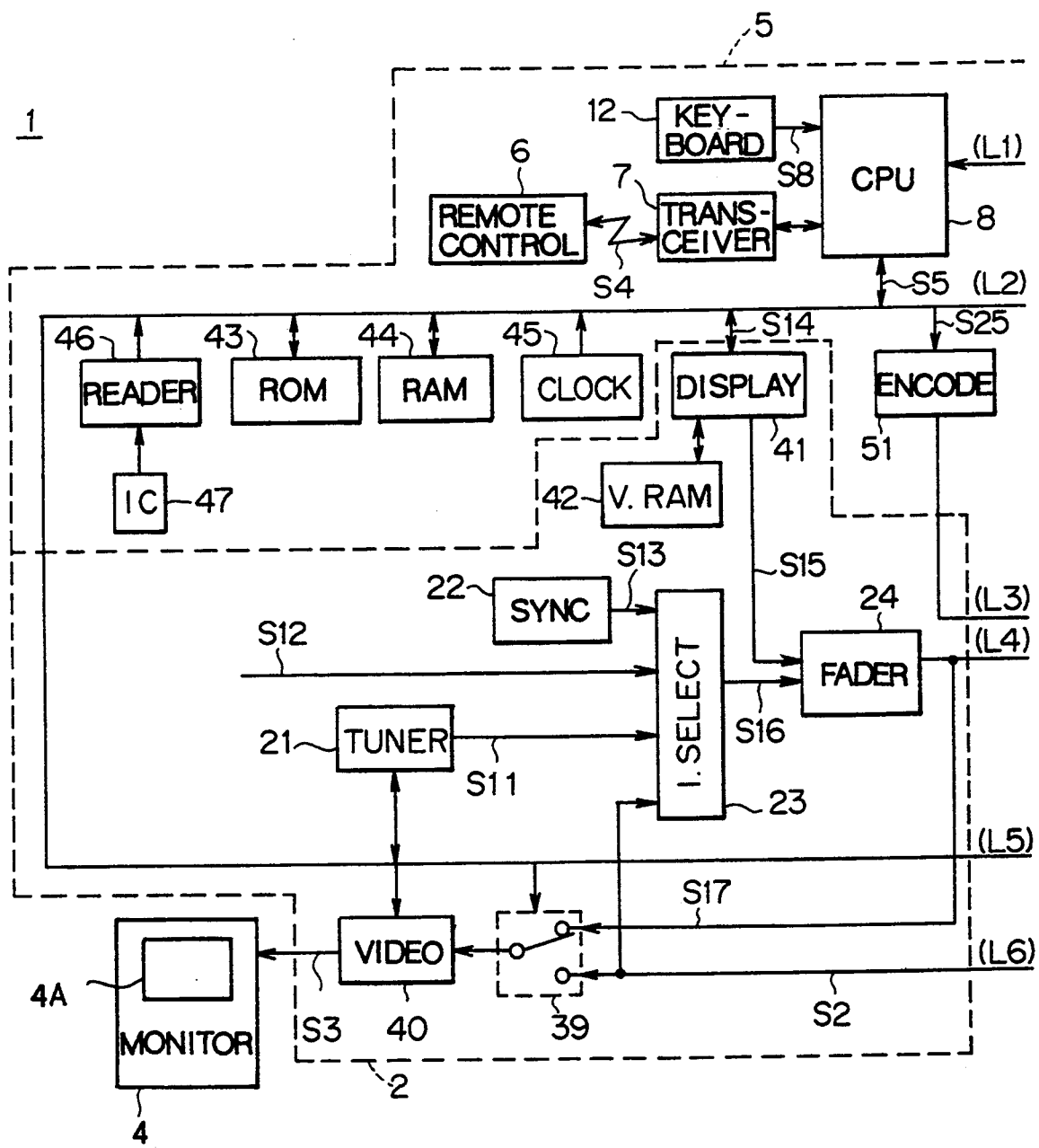

FIGS. 1A and 1B illustrate a video tape recorder (VTR) 1 as a whole. A video signal S1 to be recorded is input via a video signal processing unit 2 and supplied to a VTR unit 3, thereby recording a picture. Simultaneously, a reproduction video signal S2 is supplied as a video output signal S3 to a monitor 4 through the video signal processing unit 2.

A control management data processing unit 5 is provided in addition to the components given above. An I/O information signal S4 from a remote controller 6 is transmitted via a remote control transceiver 7 to a central processing unit (CPU) 8 for processing the control management data. Control information S5 is transmitted to a bus 9 for controlling circuit elements combined to configure the video signal processing unit 2 and the VTR unit 3. Control information S6 is communicated via a bus 10 between the control management data processing CPU 8 and a mechanism control CPU 11 of the VTR unit 3. As a result, a control signal S7 is generated for mechanism elements of the video tape recorder unit 3.

The video signal processing unit 2 works in the following manner. Inputted via an input selecting circuit 23 to a superimpose fader circuit 24 are a video signal S11 received by a tuner 21, and external line video signal S12 supplied from an input line serving as an external video signal source and an internal synchronous signal S13 generated by an internal synchronous circuit 22. The video signal S1 to be recorded is thus obtained at an output terminal of the superimpose fader circuit 24.

The recording video signal S1 is supplied via a record switching circuit 31 to a recording circuit 32. The recording video signal S1 is recorded on a video tape 36 of a video cassette 35 by use of a magnetic head 34 through a recording mode electromagnetic converting circuit 33.

The video signal thus recorded on the video tape 36 is picked up in a reproduction mode by a reproducing circuit 37 sequentially through the magnetic head 34 and the electromagnetic converting circuit 33. The video signal is then transmitted as the reproduction video signal S2 via a reproducing switching circuit 38 to the video signal processing unit 2.

The video signal S2 is converted into a video output signal S3 by means of a video processing circuit 40 through an output selecting circuit 39. The video output signal S3 is displayed on a display screen 4A of a monitor 4.

Basic data is stored in a ROM-based basic data memory 43 to be utilized on the basis of the I/O information signal S4 inputted from the remote controller 6 or an input information signal S3 inputted from a VTR keyboard 12. Process data is stored in a RAM-based register 44. The control management data processing CPU 8 of the control management data processing unit 5 processes the basic and process data in accordance with a clock signal of a clock circuit 45. Control information S5 and S6 are thereby transmitted to the buses 9 and 10.

In this embodiment, a card reader 46 is connected to the bus 9. The control management data processing CPU 8 is capable of taking the basic data read from an IC card 47 by the card reader 46 into the register 44.

A processed result is obtained by carrying out data processing in the CPU 8. When there is a necessity for informing the user of the result, the CPU 8 supplies an image display information signal S14 as a part of the control information S5 to a video display processor 41. An image display signal S15 read from a video RAM 42 in response to the information signal S14 is supplied to the superimpose fader circuit 24. A superimpose output signal S17 is generated by superimposing the display signal S15 on a video signal S16 supplied from the input selection circuit 23. The superimpose output signal S17 is supplied via an output selection circuit 39 to the image processing circuit 40. A picture is formed by superimposing an image signal consisting of a letter, character and a line on the video signal. The picture is displayed on the display screen 4A of the monitor 4, thereby providing interactive data to the user.

In this embodiment, when displaying the image composed of the letter, character and line on the screen 4A of the monitor 4, the control management data processing CPU 8 supplies the remote controller 6 with an image signal representing the same image as the I/O information signal S4 from the remote control transceiver 7. Consequently, the same image as that displayed on the screen 4A of the monitor 4 is displayed on a display screen 6A of the remote controller 6.

The CPU 8 records write management data S25 as a part of the control information S5 on video recording tracks of the video tape 36, the data S25 being associated with recording and reproducing operations of the VTR unit 3. This recording process is effected sequentially through an image recording encoder 51, the record switching circuit 31, the recording circuit 32 and the electromagnetic converting circuit 33. The management data written to the video recording tracks is read via a reproducing switching circuit 38. Subsequently, the management data is, after passing through the electromagnetic converting circuit 33, the reproducing circuit 37 and the reproducing switching circuit 38, received as readout management data S26 by the CPU 8.

In accordance with this embodiment, the control management data processing CPU 8 additionally supplies the electromagnetic converting circuit 33 with write management data S27 similar to the data S25 given to the image recording encoder 51 via an audio recording encoder 53. The data S27 is recorded on audio recording tracks of the video tape 36 by use of the magnetic head 34. Simultaneously, the management data recorded on the audio tracks of the video tape 36 is read from the electromagnetic converting circuit 33 through the reproducing mode magnetic head 34 to an audio recording decoder 54. The management data is received as readout processing data S28 by the CPU 8.

(2) Function Blocks of Video Tape Recorder

Figure 2:
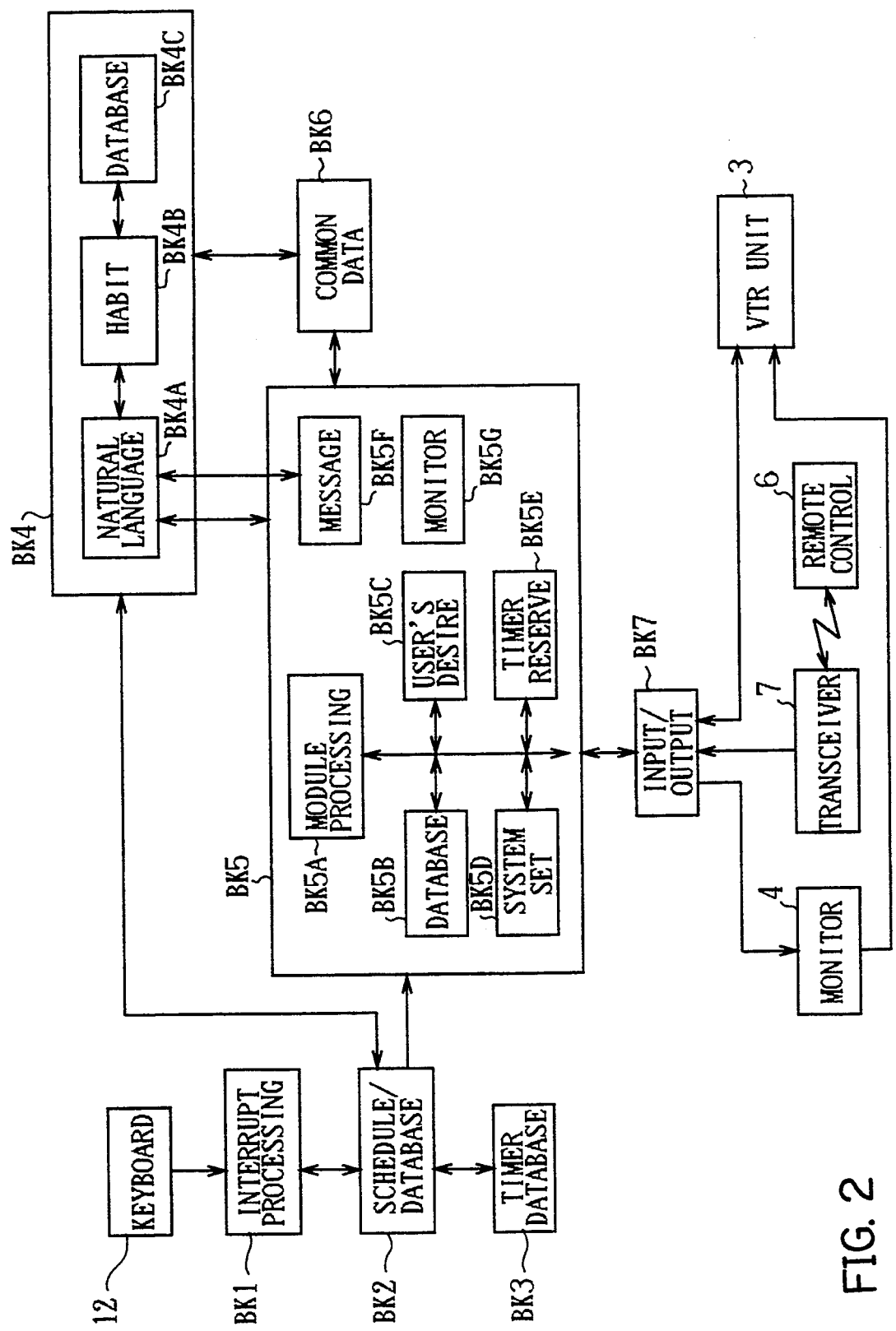
FIG. 2 is a block diagram illustrating functional blocks of the video tape recorder of FIGS. 1A and 1B.

The control management data processing CPU 8 controls the video tape recorder as a whole in conformity with the function blocks depicted in FIG. 2.

To be specific, the CPU 8, when receiving an instruction input from the keyboard 12, functions as an interrupt processing means in a block BK1. Thereafter, the CPU 8 functions as a system schedule/database holding means in a block BK2. At this time, the CPU 8 as the system schedule/database holding means communicates with a timer reservation database preparing means of a block BK3 while managing a time series of the entire system. The CPU 8 as system schedule/database holding means executes functions as an artificial intelligence module indicated by a block BK4 as well as an application processing means indicated by block BK5.

In the artificial intelligence module BK4, the CPU 8 discerns the content of an instruction input in natural language in accordance with the input of instructions expressed in natural language by a natural language system BK4A.

Based on a mode of the natural language instruction content, a habit of the user is learned and inferred by a habit learning/inferring system BK4B. Simultaneously, a habit database is prepared by a habit database preparation system BK4C.

In the application processing means BK5, the CPU 8 cooperates with a module processing means BK5A to execute functions of a management database module BK5B, a user's desire module BK5C, a system set module BK5D and a timer reservation module BK5E.

Concurrently, in the application processing means BK5, the CPU 8 executes a message display process in a message system BK5F. The CPU 8 then executes a display process of the monitor 4 in a monitor block BK5G.

When carrying out the functions of the artificial intelligence module BK4 and the application processing means BK5, the CPU 8 executes a timer reservation packet process and a flag process in a common data area processing block BK6.

When carrying out the functions of the application processing means BK5, the means BK5 is connected via the I/O driving means BK7 to external units such as the VTR unit 3, the monitor 4, the remote control transceiver 7 and the remote controller 6.

(3) Recording Format of Video Tape

Figure 3:
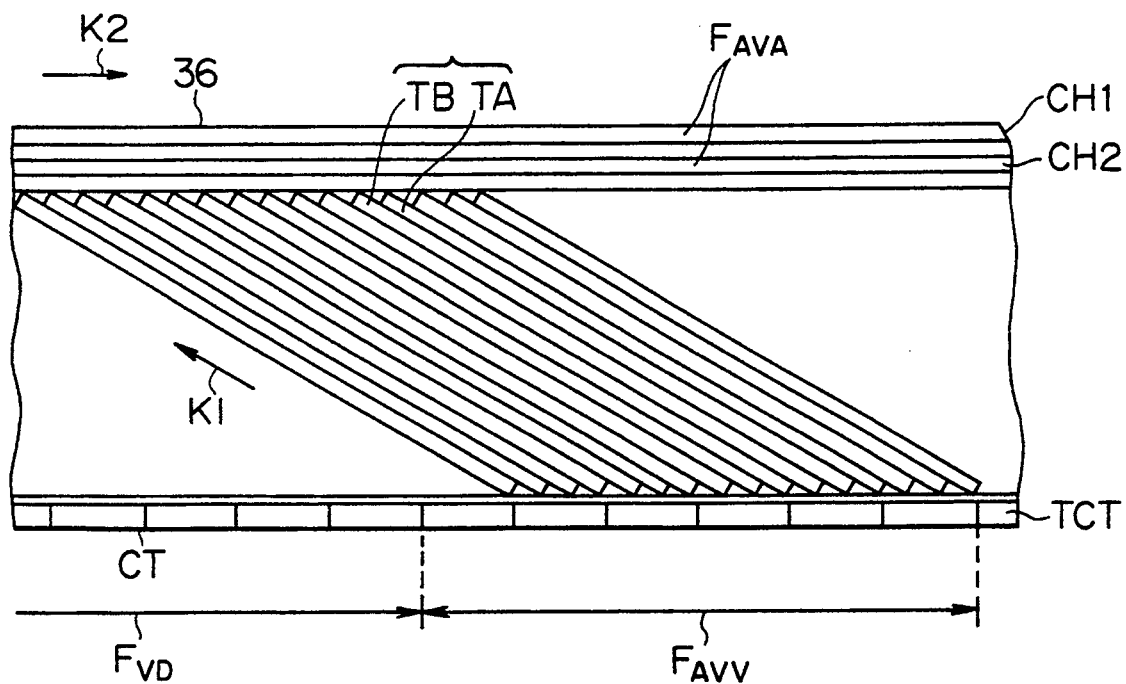
FIG. 3 is a schematic diagram showing a recording format on a video tape.

The following is a description of an arrangement of a video tape 36 as illustrated in FIG. 3. Video recording tracks TA and TB having different azimuth angles are formed in a head scanning direction K1 obliquely across a tape travelling in a direction K2. The recording tracks TA and TB are sequentially adjacent in the tape traveling direction K2. A control signal (CTL) recording track TCT is formed in a longitudinal direction of the video tape 36 so that the track TCT is located at a longitudinal extremity of the video recording tracks TA and TB along a first edge of the video tape 36. A control signal CT is recorded on the control signal recording track TCT. Two channel audio recording tracks CH1 and CH2 are formed at a second edge of the video tape 36 opposite the first edge.

Formed at an initial recording portion of the video tape 36 is a management database video track recording region $F_{AVV}$ extending over several predetermined video recording tracks TA and TB. Following the management database video track recording region $F_{AVV}$, a video signal recording region $F_{VD}$ is formed to record 1-field of a video signal in respective video recording tracks TA and TB.

Figure 4:
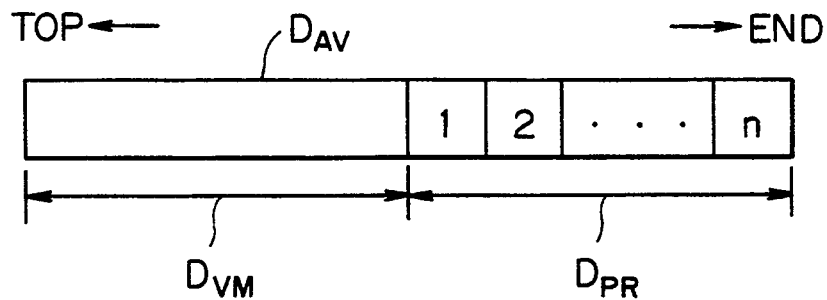

Management data $D_{AV}$ configured as illustrated in FIG. 4 are recorded on the recording tracks TA and TB which belong to the management database video track recording region $F_{AVV}$.

A management database audio track recording region $F_{AVA}$ is formed in a predetermined track location, for instance, in the initial portions of the audio recording tracks CH1 and CH2. The management data having a configuration depicted in FIG. 4 is similarly recorded in this region $F_{AVA}$.

The management data $D_{AV}$ is arranged so that a volume information block $D_{VM}$ and a program information block $D_{PR}$ are recorded sequentially from the top or initial part of the recording track.

The volume information block $D_{VM}$ consists of management information on the video cassette 35 mounted in the VTR unit 3. The volume information block $D_{VM}$ is recorded as 135-byte volume information containing, as illustrated in FIG. 5, information items A1–A15.

The information item A1 represents a [format version]. The number of versions of the management data $D_{AV}$ is recorded in 1-byte of data, thereby identifying the format version concerned when mounting the video cassette 35. With this arrangement even where the management data $D_{AV}$ is an old version, the system is set so that the data can be processed.

The item A2 represents [the number of repeated recordings]. For example, the management of data $D_{AV}$ is recorded in the management database audio track recording region $F_{AVA}$ in 1-byte of data. At this time, the number of repeated recordings is recorded. The number of recordings of the management data $D_{AV}$ is recorded as reference material using the audio signal recording system.

The item A3 indicates [the number pictures used]. When recording the management data $D_{AV}$ on the video cassette 35 in, e.g., 1-byte of data, the number of recording tracks occupied by the management database video track recording region $F_{AVV}$ is recorded. With this arrangement, the system discerns a top track location of the video signal recording region $F_{VD}$.

The item A4 indicates [the number of programs used]. The number of programs reserved or recorded in the video cassette 35 and the existence or non-existence of a recording space are recorded in, e.g., 1-byte of data.

In this embodiment, the number of recordable programs reserved or recorded represented by 0–6 bits is 32 at a maximum. The 7th bit indicates whether a recording space remains (represented by a logic [0]) or not (represented by a logic [1]). With this arrangement, even when the number of programs used less than the maximum of 32 depending on the length of the tape in the video cassette 35 or the length of the programs reserved or recorded, if no recording space remains, this can be confirmed by the 7th bit.

The item A5 represents [generation date and time]. The date and time when the management data $D_{AV}$ were initially written in the video cassette 35 are recorded in 5 bytes of data.

In this embodiment, [minute], [hour], [date], [month] and [year] are recorded as two binary coded decimal digits in the first through fifth bytes. The age of the video cassette 35 can be obtained form the volume information $D_{VM}$ in the item representing the data and time of generation.

The item A6 indicates [update date and time]. The date and time when the management data $D_{AV}$ is modified is recorded in five bytes of data.

In accordance with this embodiment, the data on the update date and time are treated to that [minute], [hour], [date], [month] and [year] are recorded as binary coded decimal numbers sequentially in the first through fifth bytes. It is thus possible to confirm when the presently used management data $D_{AV}$ was modified.

The item A7 indicates [system volume number]. If the video cassette 35 is classified as one of a so-called series of videos using, e.g., eight bytes of data, the series number is recorded in the eight bytes of data. It is therefore feasible to confirm that the video cassette 35 presently loaded is one of a series of videos as well as to discern the series number thereof. A system volume number is added to the record reservation information held by the VTR unit 3, whereby those matters are displayed on the monitor. The user is thus informed of a video tape 36 which will be reservation-recorded.

The item A8 represents [screen display color]. For displaying, e.g., a list based on, e.g., two bytes of data, a display color for the list can be specified. When displaying the lists on the screen after the user has loaded the video cassette 35, it is possible to immediately discern which cassette is to be loaded by the user from the display list color on the screen.

The item A9 represents [various flags]. The data of several flags can be recorded in, e.g., one byte of data.

In this embodiment, the user is allowed to record a flag [inhibition of recording] in the 0th bit, thereby preserving the recorded contents of the video cassette 35.

A [formatted] flag can be input as the first bit by the system. It is thus possible to confirm whether or not all the recording areas of the video tape 36 are completely formatted.

An [address mode] flag representing a type of program end address can be input as the second and third bits by the system. Consequently, even if the program end address is recorded in a mode which differs depending on the video cassette 35, this can be detected reliably.

The item A10 represents a [type of video cassette]. A length and type of the tape can be recorded in, e.g., two bytes of data.

According to this embodiment, the system is capable of automatically setting the first byte. However, the user is able to set the second byte as necessary. When loading the video cassette 35, the hub diameter can be recognized by confirming the type and length of the tape.

The item A11 represents a [password]. The user is allowed to register a password expressed as four binary coded decimal digits in two bytes of data.

The user registers the password in the video cassette 35. When the video cassette 35 is loaded in the VTR unit 3, if the user cannot properly input the password registered in the video cassette 35, the recording/reproducing processes of the video cassette 35 are inhibited. This inhibits viewing the contents of the video tape 36.

The item A12 represents [user volume number]. The user is allowed to record a video cassette file number, i.e., a volume number on the video cassette 35 as the user desires in two bytes of data. In this embodiment, the volume number can be added by the binary coded decimal numbers within a numeric value range of 0–64000. The user volume number is added to the record reservation information held by the VTR unit 3, thereby displaying it on the monitor. With this arrangement, the user can be informed of the video tape 36 which will be recorded by reservation.

The item A13 represents [reproducing order]. As necessary, the reproducing order of 32 programs at a maximum is recordable in thirty-two bytes of data. In a so-called program reproducing mode, the programs recorded in the order from the first byte to the 32nd byte are sequentially specified. The programs can thus be reproduced.

The item A14 represents [recording order]. The serial numbers of 32 programs at a maximum are recordable in 32 recording order positions stored in thirty-two bytes of data.

In a so-called program reproducing process, the programs with the serial numbers recorded sequentially from the first byte to the 32nd byte can thus be reproduced.

The item A15 represents [volume label]. The user is allowed to add labels such as title to the video cassette 35 in forty bytes of data as specified. A volume label is added to the record reservation information held by the VTR unit 3, for displaying it on the monitor. With this arrangement, the user can be informed of a video tape 36 which will be recorded by reservation.

In this embodiment, 40 characters at the most are recordable when using ASCII codes. When employing S-JIS codes, the labels of 20 characters at the most are recordable.

Contrastingly, the program information block $D_{PR}$ is, as illustrated in FIG. 4, composed of program information $D_{PRX}$ shown in FIG. 6, corresponding to the program information recorded or record-reserved on the video tape 36 of the video cassette 35.

The item B1 represents [starting address]. The programs are recorded in a video signal recording region $F_{VD}$ of the video cassette 35. Thereafter, in accordance with the [byte] data, a starting address value of each program is written by the system on the basis of the top address of the video tape 36.

In this embodiment, address values may be selectively written according to a time mode ([second], [minute] and [hour] are expressed by binary coded decimal numbers), a program number mode (the program numbers based on the VASS (Video Address Signal Search) (VHS) standard are indicated) and a control signal mode (representation by the number of CTL pulses on the basis of the CTL ($\beta$) standard).

The item B2 represents [end address]. A program end address value from the top position of the video tape 36 is recorded in three bytes of data.

In this embodiment, as in the case of the program starting address value, the program end address value is so arranged as to select the time mode, the program number mode and the control signal mode.

The item B3 represents [various flags]. Information indicating a handling status of the program information concerned is recorded in one byte of data.

In this embodiment, the 0th bit is [recorded information] (indicating whether the relevant program is in the recording state or not). The first and second bits are [record end status information] (indicating an end status when recording has been finished). The third bit is a [record permission flag] (indicating whether recording is inhibited or not). The fourth bit is [whether-to-see flag information] (indicating whether or not the user has seen the relevant recorded program at least once.)

The item B4 represents a [system program number]. A series of file numbers attached to the relevant programs by the system are recorded in one byte of data.

In this embodiment, a series of numerals consisting of [0], [1], [2], . . . are written sequentially from the top of the tape as system numbers.

The item B5 represents a [program number]. The user is able to input the number of a series program (for instance, a serial drama) in one byte of data.

The item B6 represents a [category code]. Categories (for example, sports, news, dramas, etc.) for a program are recorded in one byte of data.

The item B7 represents an [input source]. An input source code indicating where the relevant program is obtained is recorded in one byte of data.

In this embodiment the channel number selected by a tuner 21 (FIG. 1) and the outside line number of an outside line video signal S12 are written as information indicating the source.

The item B8 represents a [recording/action mode]. An action mode and a recording mode for the video cassette 35 are written in one byte of data.

In this embodiment, when recording on the video cassette 35 is effected by means of the VTRA of the [β system], [VHS system] or [8 mm video system], the recording modes are written. In the β system, the type of mode, i.e., [β Is mode], [β II mode] and [β III mode] are written. In the VHS system, these are the [SP system], [LP system] and [EP system]. In the 8 mm video system, they are the [SP mode] and [LP mode]. The action modes during recording, for instance, [ordinary recording mode], [only-reference-signal writing mode], etc, are written.

The item B9 represents a [record starting time]. A starting time of the recorded program or reservation is recorded in five bytes of data.

In this embodiment, the [minute], [hour], [date], [month] and [year] are sequentially written in the 1st through 5th bytes as binary coded decimal numbers.

The item B10 represents the [record end time]. An end time of the recorded program or reservation is recorded based on, e.g., the 2-byte data.

In this embodiment, the [minute] and [time] data are written in the 1st and 2nd bytes as binary coded decimal numbers.

The item B11 represents [reservation recording control information]. Reservation recording is set in VTR unit 3 (FIG. 3) in these ten bytes of data when executing reservation recording. Information necessary for controlling peripheral units to be operated in the foregoing process is simultaneously recorded.

The item B12 represents a [title]. The character information indicating a title of a the program concerned is written in these forty bytes of data.

(4) Process for setting the VTR

Based on instruction signals input from the remote controller 6 or the keyboard 12, the CPU 8 controls the control management data processing unit 5, the video signal processing unit 2 and VTR unit 3. This control process is performed in a status specified by the user in conformity with processing program RT0, RT1, and RT31 shown in FIGS. 7 through 9.

Figure 10:
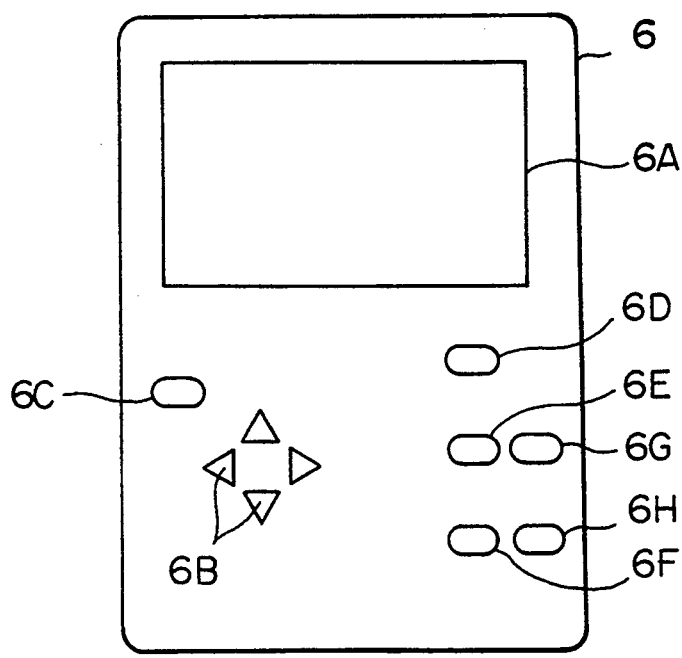
FIG. 10 is a front elevation view of a remote controller.

In this embodiment, the remote controller 6, as illustrated in FIG. 10, has a display screen 6A in which a touch panel is provided on a liquid crystal plate as an operating panel on the case surface. When the listed items specified are displayed on the display screen 6A, the click inputs are effected by touching directly on the respective display items. Specifying signals associated with the display items concerned can thus be input. In addition, a cursor displayed on the screen 6A is moved by a 4-directional cursor key 6B, thus specifying a predetermined display item. Thereafter, the specifying signal relative to the display item concerned can be input by operating an execution key 6C.

The remote controller 6 further includes a normal operation instructing key 6D, a menu display instructing key 6E, a management data mode instructing key 6F, a management data mode instructing key 6F and reservation 1/reservation 2 operation mode specifying keys 6G and 6H. These mode specifying keys serve to specify the operation modes of the VTR 1 for CPU 8.

Figure 7A:
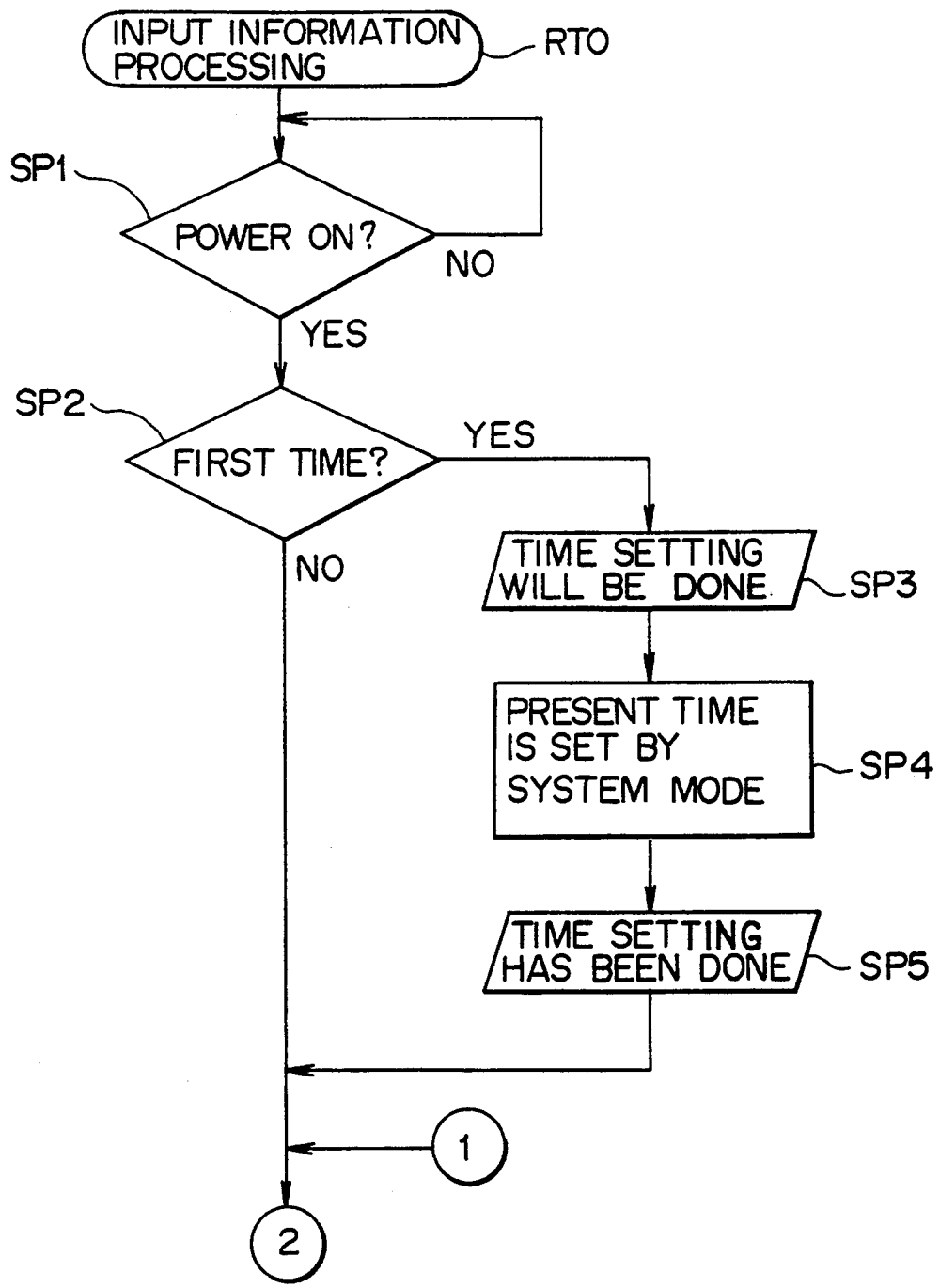
FIGS. 7A and 7B together provide a flowchart showing input information processing procedures of the video tape recorder.
Figure 7B:
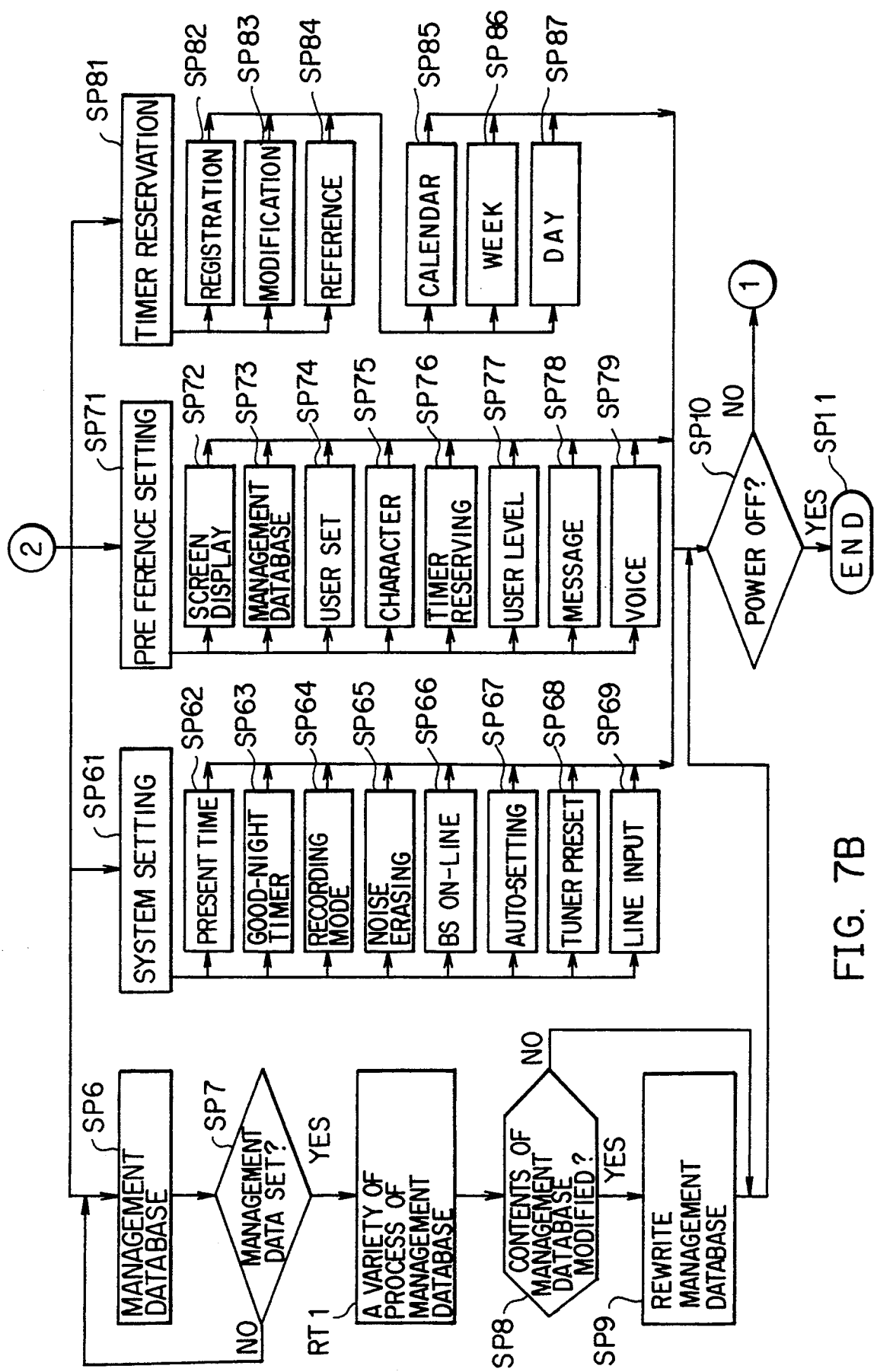

At a step SP1 of the input information processing program RTO shown in FIG. 7, the CPU 8 waits till the power supply in turned ON. If an affirmative result is obtained, in step SP2 the CPU 8 judges whether the power-ON event is the first such event. If so, the CPU 8 sequentially executes the processes of steps SP3, SP4 and SP5. As a result, a message [time setting will be done] is displayed on the display screen 4A of the monitor 4 as well as on the display screen 6A of the remote controller 6. Subsequent to this step, the present time is set in the system setting operation mode. A message [time setting has been done] is then displayed on the screens 4A and 6A.

The VTR 1 is thus brought into an instruction waiting status in which the present time is set.

This instruction waiting status is retained continuously even when a negative result is obtained at the step SP2. In the instruction waiting status, items such as [management database], [system setting], [preference setting] and [timer reservation] can selectively be specified.

As a matter of course, in the instruction waiting status, the CPU 8 causes the remote controller 6 (or the keyboard 12) to execute an operation mode specifying a display of [management database], [system setting], [preference setting] and [timer reservation] on the display screens 6A and 4A through operation of the menu display mode specifying key 6E therein. Consequently, the user is able to specify one of the operation modes by a click-type operation.

In the [management database] mode, the management data $D_{AV}$ (FIG. 4) is recorded in a management database video track record region $F_{AVV}$ or a management database audio track record region $F_{AVA}$ Of the video tape 36 (FIG. 3). Alternatively, in the operation mode wherein the VTR unit 3 is drive-controlled using the recorded management data $D_{AV}$, the CPU 8 judges at a step SP7 whether the management data $D_{AV}$ for the video cassette 35 is set when the item [management database] is selected from among the menu display items at the step SP6, the video cassette 35 containing the tape (referred to as a management data tape) on which the management data $D_{AV}$ would have been recorded. If set, a variety of processes (described below) of the management database are executed in a subroutine RT1.

Thereafter, at a step SP8 the CPU 8 judges whether or not the contents of the management database are modified. If modified, at a step SP9 the CPU 8 executes a process to rewrite the data recorded in the management database video record region $F_{AVV}$ or the management database audio track record region $F_{AVA}$ into the modified management data.

In this manner, the processes relative to the management database have been finished. At a step SP10, the CPU 8 judges whether or not the power supply is turned OFF. If the answer is negative, the CPU 8 reverts to the instruction waiting status described above. If affirmative, the input information processing program comes to an end at a step SP11.

When entering the multiprocess routine RT1, as illustrated in FIG. 8, at a step SP21 the CPU 8 causes the remote controller 6 and the monitor 4 to display the management database list on the display screens 6A and 4A. After this step, the CPU 8 is brought into the instruction waiting status.

At this time the display screens display items such as [label], [reservation canceling], [auto-reproducing], [manual reserving], [program information confirming] and [management data reserving]. In this state, one of the items can be specified.

The item [label] herein represents an operation mode for selectively setting either the volume information or the program information which is contained in the volume information block $D_{VM}$ or the program information block $D_{PR}$ (FIG. 4) among the management data $D_{AV}$. When [label] is selected, the display screens display items such as [password], [recording mode], [type of tape], [category] and [title]. In this state, one of the items may be selected.

When the user selects [password], at a step SP23 the CPU 8 permits the user to rewrite the password data recorded in the item A11 of the volume information $D_{VMX}$ (FIG. 5).

Similarly, at a step SP24 the CPU 8 specifies the record/operation mode recorded in the item B8 of the program information $D_{PRX}$ (FIG. 6). As a result, the record mode data thereof can be written.

At a step SP25, the CPU 8 works to rewrite tape type data among the data indicating the type of the video cassette which are recorded in the item A10 of the volume information $D_{VMX}$ (FIG. 5).

At a step SP26, the CPU 8 works to rewrite the category code data recorded in the item B6 of the program information $D_{PRX}$ (FIG. 6).

At a step SP27 the CPU 8 works to rewrite the title data recorded in the item B2 of the program information $D_{PRX}$ (FIG. 6).

In this way, the CPU 8 rewrites the items ranging from [password] to [title] in the steps SP23 through SP27. Subsequent to these steps, when specifying the item [end] at a step SP28, the management database processes are finished. From the step SP29 the process returns to the management database processing loop shown in FIG. 7, wherein the process of the step SP8 resumes.

Figure 8A:
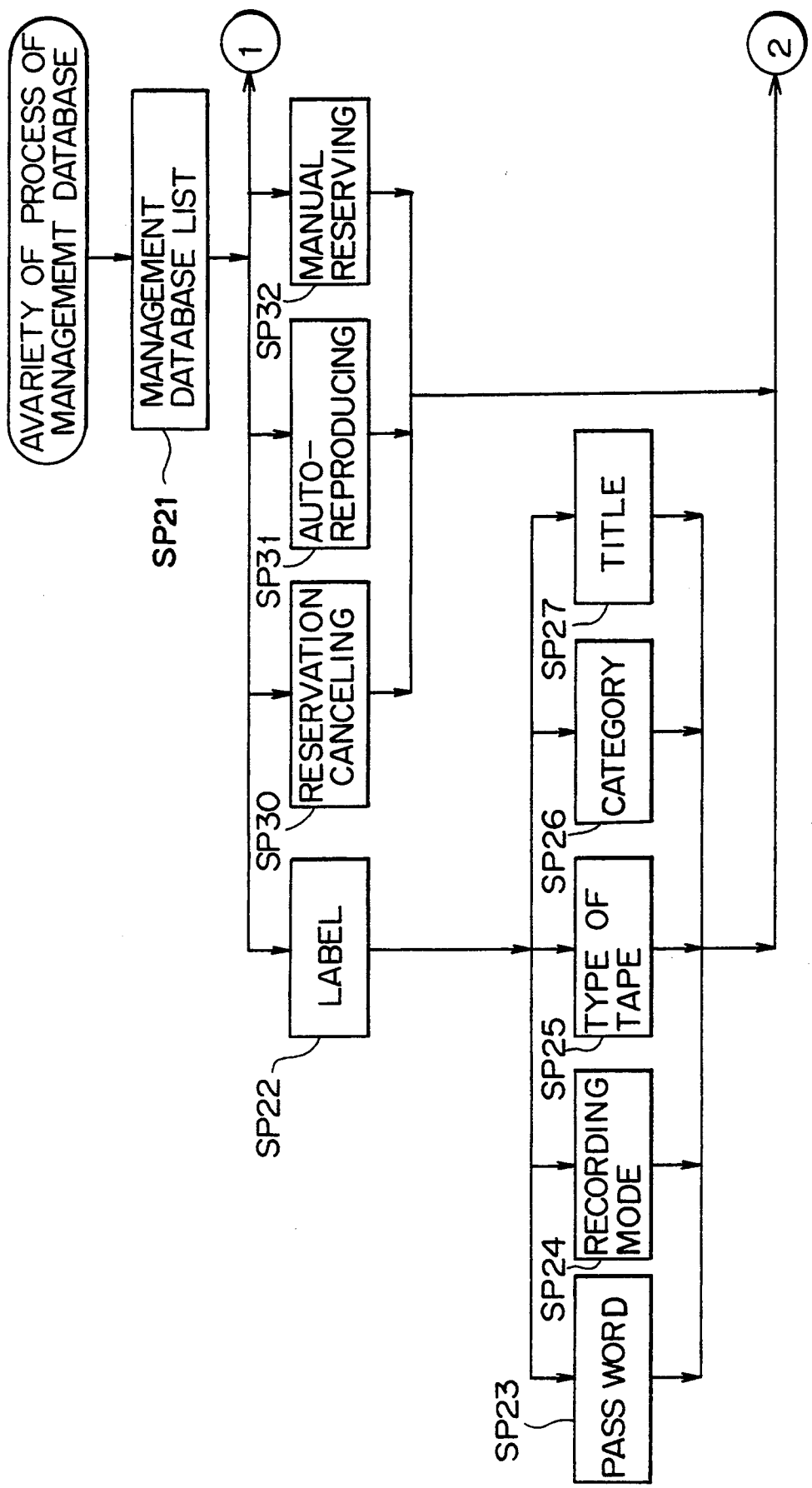
FIGS. 8A, 8B and 9 are flowcharts showing management database processing procedures of the video tape recorder of FIGS. 1A and 1B.

At the step SP21 of FIG. 8A the user may instead select [reservation canceling] in the instruction waiting status where the management data list is displayed. At this time, the CPU 8 cancels the reservations of all the programs recorded in the relevant management data list at a step SP30.

When the user selects [auto-reproducing], at a step SP31 the CPU 8 functions to reproduce the reproducing order data (item A13 of the volume information $D_{VMX}$ (FIG. 5)) in the predetermined order and, if necessary, to rewrite the data.

When the user selects [manual reservation], the CPU 8 sequentially receives manual settings concerning a predetermined number of programs. Then, the CPU 8 inputs them as management data.

After finishing the processes of steps SP30, SP31 and SP32, the CPU 8 reverts to the management database processing loop (FIG. 7), passing through the steps SP28 and SP29.

While the CPU 8 is in the instruction waiting status for displaying the management data list at the step SP21 of FIG. 8, it initiates a step SP33 after the user has selected [program information confirming]. The representation on the display screen is changed at a step SP34. At a step SP35, SP36, SP37 or SP38, there a display mode is carried out to confirm or rewrite the recorded items [record permission], [whether-to-see flag], [category] and [title] of the program information $D_{PRX}$ (FIG. 6) and the volume information $D_{VMX}$ (FIG. 5).

In this embodiment, predetermined pictorial representations, i.e., characters, are employed for the items [record permission], [whether-to-see flag], [category] and [title]. It is therefore possible to confirm and modify the information recorded in association with a plurality of reserved programs in a relatively narrow display area.

After finishing the steps SP35 to SP38, the CPU 8 returns via the steps SP28 and SP29 to the management database processing loop (FIG. 7).

In the instruction waiting status where the management data list is displayed, the user may select the item [management data reserving]. Then, the CPU 8 enters a management data subroutine RT3. In subroutine RT3, the CPU 8 executes a management data reservation processing procedure RT31, shown in FIG. 9, for switching the reservation mode.

At this time, the CPU 8 instructs the user to select a timer reservation mode at a step SP41.

In accordance with this embodiment, there is provided a list of items which may be submitted so that a user may selectively designate a specified item of management data. As illustrated in FIG. 11, a language specified item list TBL is prepared consisting of language input items in which the specified items are expressed by natural language. Also, a graphic specified item list is prepared consisting of graphic input items in which the specified items are, as in the ordinary way, expressed by graphic elements such as Roman alphabets, numerals and symbols. The CPU 8 instructs the user to selectively specify one of the language input and the graphic input for the reservation screen to be used.

As a result, if the language input is selected, the CPU 8 moves to a step SP42. Subsequently, the CPU 8 takes, in the register 44 (see FIG. 1B), the data corresponding to the language input item specified by the user while displaying the language specified item list TBL on the display screen.

If the graphic input is selected, the CPU 8 moves to a step SP43. Subsequently, the CPU 8 takes, in the register 44, the data corresponding to the graphic input item specified by the user while displaying the graphic specified item list on the display screen.

The input specifying operation carried out by the user has thus been terminated. The CPU 8 finishes the management data reservation input process and reverts to the management database processing loop of FIG. 8.

At this time, the CPU 8 serves to subsequently display items such as [registration], [modification] and [reference] on the display screen. At steps SP51 to SP53, the user selects [registration], [modification] or [reference]. In consequence, the CPU 8 launches into a process to execute the selected item.

When processing the item selected, a calendar reservation table, a one-week reservation table and a one-day reservation table are displayable according to the selection by the user at steps SP54 through SP56. A start time or an end time of the program reserved is written in the calendar reservation table or the one-week reservation table or the one-day reservation table.

The CPU 8, after finishing such processes, terminates the management database processing program at the step SP28. The CPU 8 returns to the management database processing loop (FIG. 7) from the step SP29.

In the initial instruction waiting status of FIG. 7, the processes discussed above are those to record the management data on the video tape, modify the same data and confirm the same data by selecting the item [management database] at the step SP6. In the initial instruction waiting status, however, if the user selects [system setting] or [preference setting] or [timer reserving], the CPU 8 executes a process to set the operating conditions of respective units of the VTR 1.

More specifically, the user may select the item [system setting] at a step SP61. In this case the display screen displays items such as [present time], [good-night timer], [recording mode], [noise erasing], [BS on-line], [auto-setting], [tuner preset] and [line input]. These items are selected at steps SP62 through SP69. The operating conditions of the individual units of the system can thereby be set. After finishing such setting process, the CPU 8 terminates the system setting processing loop and moves to the above-mentioned step SP10.

At a step SP71, [preference setting] is selected through the CPU 8. At this time the display screen displays items such as [screen display], [management database], [user set], [character], [timer reserving], [user level], [message] and [voice]. These items are selected at steps SP72 through SP79. At this time, the CPU 8 executes the process of the respective items concerned. The CPU 8, when finishing the relevant processes, shifts to the above-described step SP10.

In the initial instructing waiting status, the user may also select [timer reserving] at a step SP81. Then, the CPU 8 displays the items [registration], [modification] and [reference] on the display screen. When the user selects the respective items at steps SP82 through SP84, the items [calendar reservation table], [one-week reservation table] and [one-day reservation table] are displayed on the display screen. Subsequently, when the user specifies one of these items, the CPU 8 serves to display the calendar reservation table, the one-week reservation table or the one-day reservation table at a step SP85, SP86 or SP87. The program is then reserved with the aid of the reservation table displayed.

The CPU 8, after finishing the timer reservation processing loop, moves to the step SP10.

The CPU 8 executes the input information processing program RT0 of FIG. 7 in the foregoing manner. Hence, it is feasible to control the VTR unit 3 with assurance on the basis of the data input by the user.

(5) [Whether-to-see] Confirming Operation of Records Program Contents

The user observes its contents by reproducing a predetermined recorded program. Thereafter, the remote controller 6 or the keyboard 12 is operative to rewrite the [whether-to-see flag information] in an ON state (i.e., logic [1]), this information being provided in each flag of the item B3 of the program information $D_{PRX}$ corresponding to the relevant recorded program.

In a recorded program which has undergone even one reproducing process by the user in the past, the [whether-to-see flag information] corresponding to this program has been rewritten in the ON state. The CPU 8 detects this [whether-to-see flag information], to provide the user with information indicating whether each recorded program was reproduced in the past.

Figure 8B:
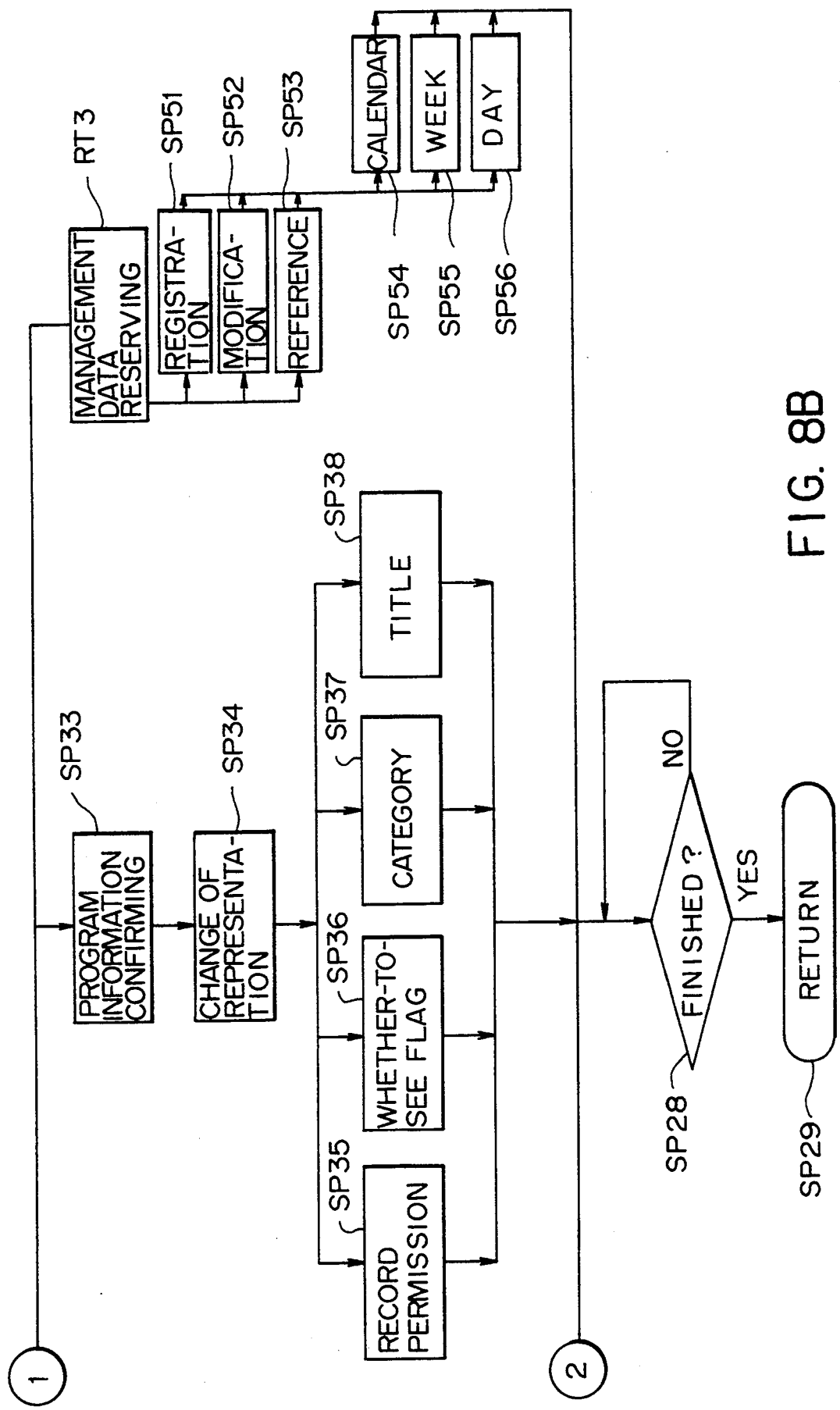
Figure 12:
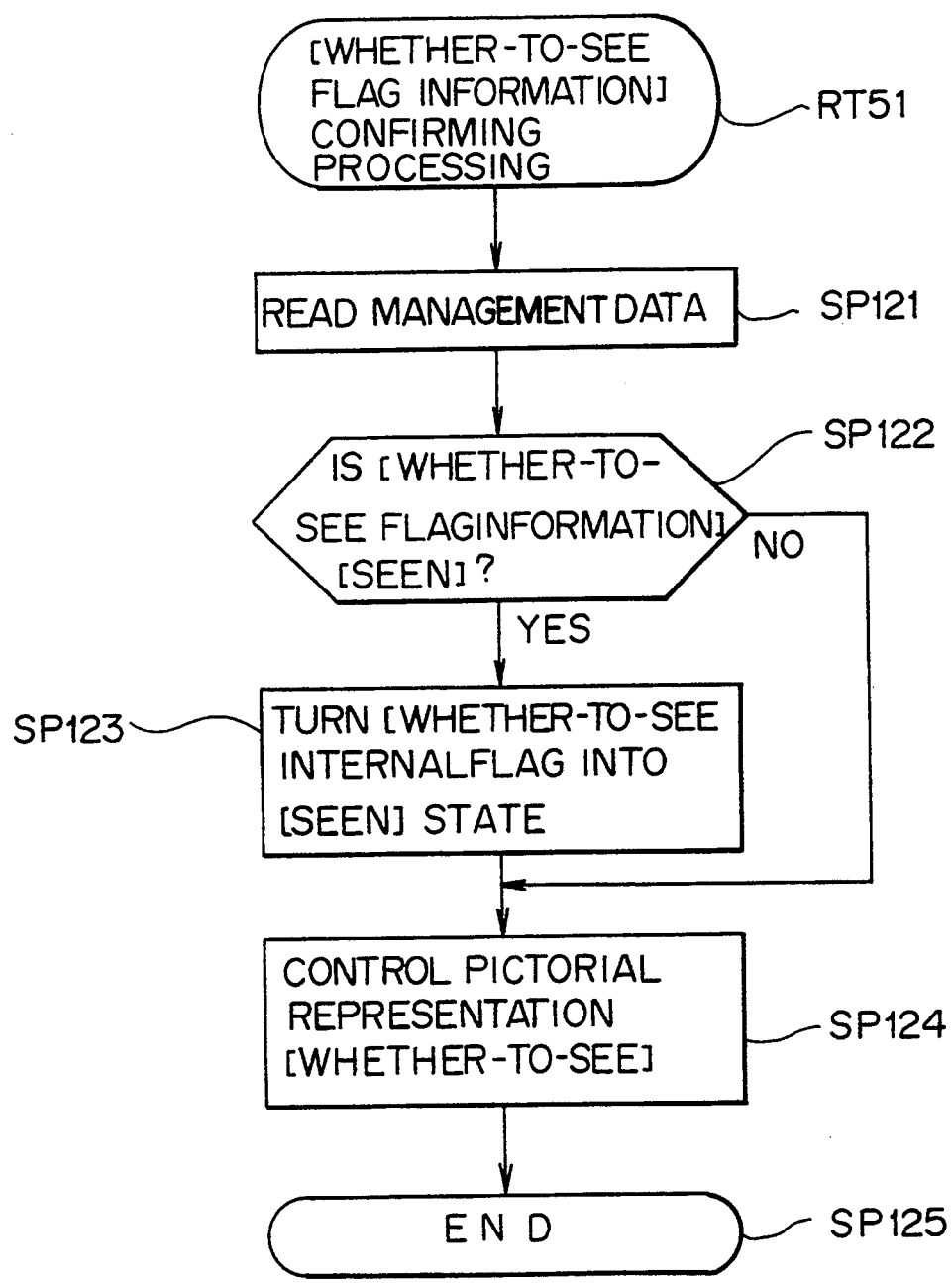
FIG. 12 is a flowchart showing procedures for confirming [whether-to-see flag information]

To be specific, a [whether-to-see flag information] confirmation procedure RT51 shown in FIG. 12 represents a [whether-to-see flag information] confirmation process in the input information process and the management database setting process of FIGS. 7 and 8. At a step SP121 a procedure for reading the management data $D_{AV}$ (FIG. 4) recorded in the management database video track recording region $F_{AVV}$ or the management database audio track recording region $F_{AVA}$ of the video tape 36 loaded at the step SP7 of FIG. 7, is carried out. After this step, the data $D_{AV}$ is temporarily stored in register 44 (FIG. B1). At a subsequent step SP122, the process of the step SP36 shown in FIG. 8B is executed. It is determined whether the [whether-to-see flag information] of the 4th bit of [various flags] is in the ON state (viz., a [seen] state), the foregoing flag information being recorded as the item B3 of the program information $D_{PRX}$ (FIG. 6) corresponding to the program to be confirmed from the management data $D_{AV}$ stored therein.

Figure 13:
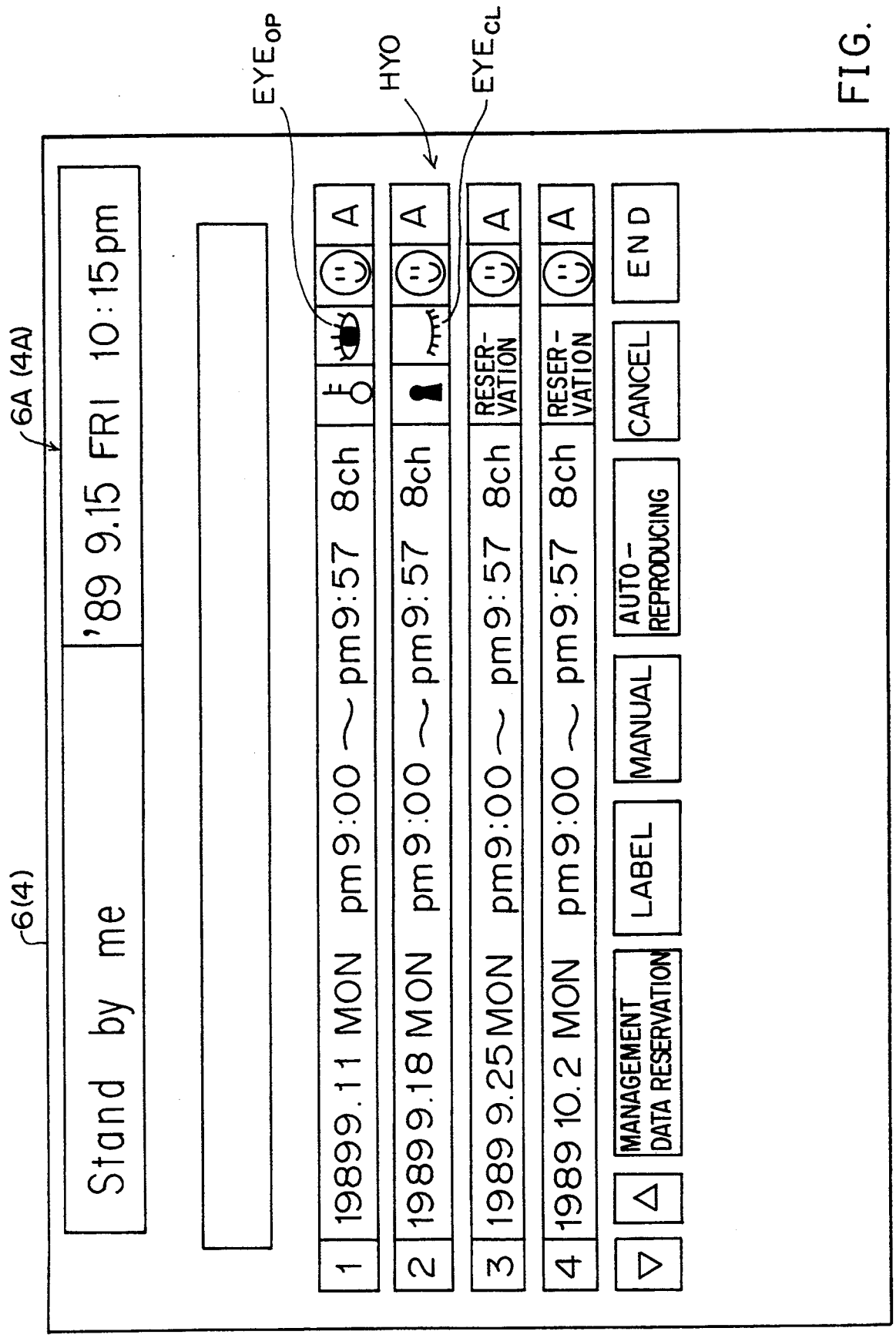
FIG. 13 is a chart illustrating graphic representations on a display screen.

If the answer obtained is negative, this implies that the recorded program corresponding to such [whether-to-see flag information] was not reproduced at least once in the past. The CPU 8 then jumps over a step SP123. FIG. 13 illustrates graphic representations HY0 displayed on the display screens 4A and 6A. Displayed at the right side of the display screens at a step SP124 is a pictorial representation $EYE_{CL}$ depicting an eye closed with respect to a present readout program among the representations HY0.

If, however the answer is affirmative, this implies that the recorded program presently read out was reproduced in the past. The CPU 8 moves to a step SP123 in which it turns ON a [whether-to-see] internal flag (i.e., sets this flag in the [seen] state) incorporated in the VTR unit 3. At a subsequent step SP124, a pictorial representation $EYE_{OP}$ depicting an eye opened is displayed in the display column of the program concerned.

Hence, the user confirms the pictorial representation $EYE_{CL}$ or $EYE_{OP}$ which is displayed based on [whether-to-see flag information] with respect to the recorded program from the display columns of the respective recorded programs indicated in the graphic representations HY0. The user is therefore able to discern whether or not the relevant program was reproduced in the past. After confirming such [whether-to-see flag information], the CPU 8 shifts to the step SP28 of FIG. 8. The processing operation comes to an end at a step SP125.

The first and second registered programs have already been recorded in, e.g., the process of FIG. 12. If the user has seen the contents of the first recorded registered program in the past (i.e., the relevant recorded program was reproduced before), the open-eye pictorial representation $EYE_{OP}$ is displayed in the display column of the first registered program. It is therefore feasible to confirm that the user has seen the contents in the past without the complicated procedure of confirming the reproduced contents.

If the user did not see the recorded contents of the second recorded registered program (i.e., the relevant recorded program was not reproduced before), the eye-closed pictorial representation $EYE_{CL}$ is displayed in the display column of the second recorded registered program. From this representation, the user can determine that he has not yet seen the second recorded registered program.

Thus, the user is able to discern whether or not he has seen the contents recorded on the video tape 36 on the display screens 4A of the monitor 4 or and the display screen 6A of the remote controller 6 simply by loading the tape 36 into the VTR unit 3.

The management data $D_{AV}$ (FIG. 4) recorded in the management database video track recording region $F_{AVV}$ or the management database audio track recording region $F_{AVA}$ of the video tape 36 is read by virtue of the construction described above. Based on the [whether-to-see flag information] stored in a variety of flags of the item B3 in the management data $D_{AV}$, the user can discern whether or not he has seen the relevant recorded program in the past without reproducing the program recorded on the video tape 36. This confirmation involves the step of displaying the eye-opened pictorial representation $EYE_{OP}$ or the eye-closed pictorial representation $EYE_{CL}$ of the graphic representations HY0 on the display screen 4A of the monitor 4 or the display screen 6A of the remote controller 6.

(6) Variations of First Embodiment (6-1) The embodiment discussed above employs the eye-closed pictorial representation $EYE_{CL}$ and the eye-opened pictorial representation $EYE_{OP}$ which indicate states of the [whether-to-see flag information]. The present invention is not, however, limited to this pictorial representation. Various other pictorial representations and character representations are usable.

(6-2) The embodiment discussed above has dealt with the case in which the user, whenever watching the recorded program, manually changes the [whether-to-see flag information] to the ON state. The present invention is not, however, limited to this changeover method. Various other methods are usable, wherein, for example, the [whether-to-see flag information] is automatically rewritten into the ON state when more than 70% of the content of one recorded program is reproduced.

(6-3) The embodiment discussed above visually displays the [whether-to-see flag information]. The present invention is not, however, limited to this display mode. This flag information may be conveyed, e.g., by voice messages or the like.

(6-4) In the above-described embodiment, the management data $D_{AV}$ is configured such that the volume information block $D_{VM}$ and the program information block $D_{PR}$ are written sequentially from the top position of the recording track. Instead, however, the block arrangement order may be interchanged. A variety of modifications may be effected, wherein fine sectioning is done for intermixing as the case may be.

(6-6) The embodiment discussed above has dealt with a case where this invention is applied to a VTR. Instead, however, this invention is similarly applicable to various other recording/reproducing apparatus, wherein an audio signal is recorded as in the manner of a so-called radio cassette.

[2] SECOND EMBODIMENT

In the second embodiment, the VTR 1 is constructed as described below, adding to the construction of the first embodiment.

(1) Record Permission/Inhibition Processing Operation

The management data $D_{AV}$ is recorded in the management database audio track recording region $F_{AVA}$ or the management database video track recording region $F_{AVV}$ of the video tape 36. A [record permission flag] corresponding to a predetermined program among the [record permission flags] in [various flags] provided in the item B3 of the program information $D_{PRX}$ corresponding to each program of the management data $D_{AV}$, is set at [1] by the user. In this record permission status, the CPU 8 permits the recording of only the program in which the [record permission flag] is set in the record permission status.

Figure 14:
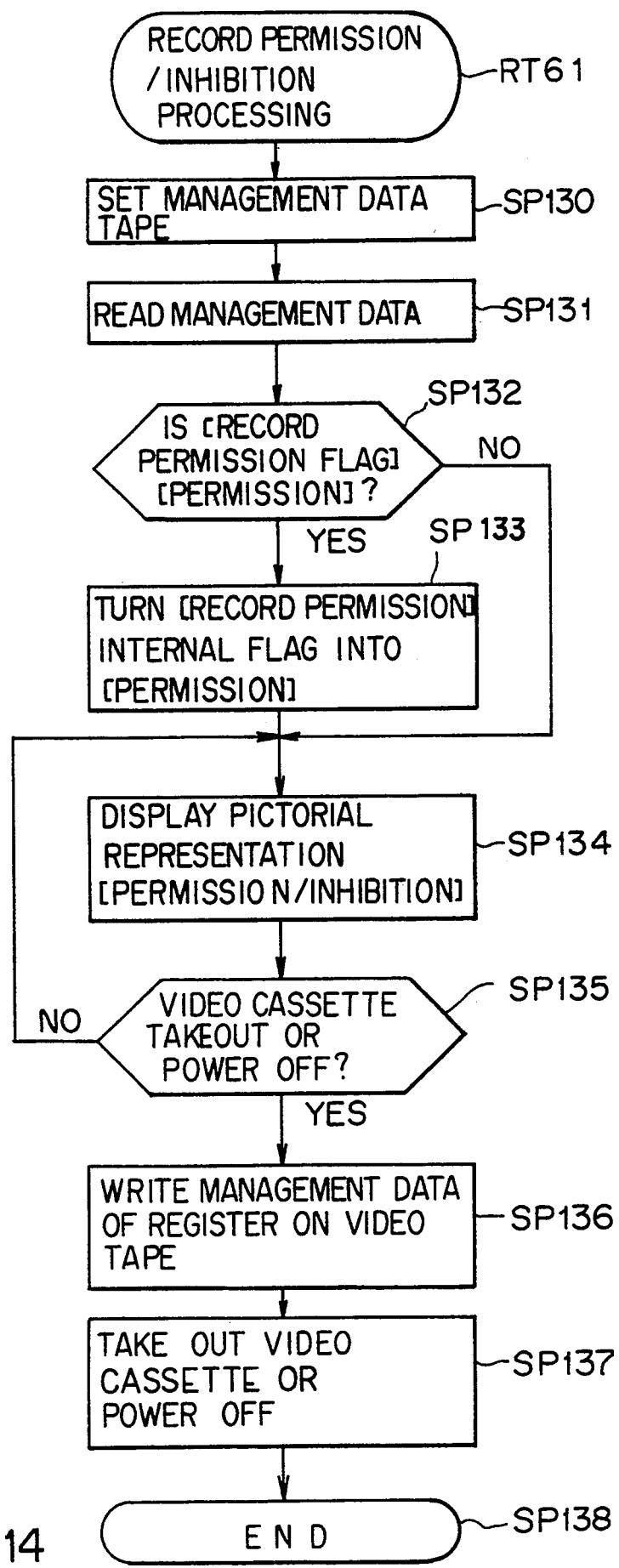
FIG. 14 is a flowchart showing record permission/inhibition processing operations.

More specifically, a record permission/inhibition processing routine RT61 shown in FIG. 14 indicates record permission/inhibition processing operations in the input information process and the management database setting process which are shown in FIGS. 7 and 8. At a step SP130, the user loads the video cassette 35 in the VTR unit 3 (step SP7 of FIG. 7). At a step SP131, the CPU 8 sequentially reads program information $D_{PRX}$ of the respective recorded programs recorded on the video tape 36 from the management data $D_{AV}$ recorded on the video tape 36 of the video cassette 35. At a subsequent step SP132, the CPU 8 judges whether or not the [record permission flag] provided in the 3rd bit of [various flags] is in the ON state (i.e., a [1] is set to indicate the [record permission status]) with respect to every recorded program by executing the process of the step SP35 shown in FIG. 8.

If the answer is negative, this implies that the recorded program corresponding to the [record permission flag] concerned should not be erased. The CPU 8 then jumps over a step SP133. At a step SP134, the CPU 8 serves to display, in the display column of the relevant recorded program, a pictorial representation $REC_{NO}$ indicating the record inhibition status of a present readout program is displayed among graphic representations HY0 of FIG. 13 on the display screens 4A and 6A.

If, however, the answer is affirmative, this implies that a program may now be recorded in the recording region of the recorded program that is now being processed (i.e., this program may be erased). The CPU 8, when moving to the next step SP133, changes a [record permission] internal flag provided in the VTR unit 3 from an initial status, i.e., a [record inhibition] status to a [record permission] status. At subsequent step SP134, a pictorial representation $REC_{OK}$ indicating a record permission status is displayed in the display column of the relevant program.

Thus, the CPU 8 indicates on the display screens 4A and 6A whether to erase the respective programs recorded in the video tape 36 of the loaded video cassette 35. At the same moment, the CPU 8 is inhibited from recording a new program even when the user tries to record this new program in the recording region concerned. This is because the [record permission] internal flag corresponding to the relevant recorded program has assumed a record inhibition status for the recording region of the recorded program under erase inhibition.

Figure 15:
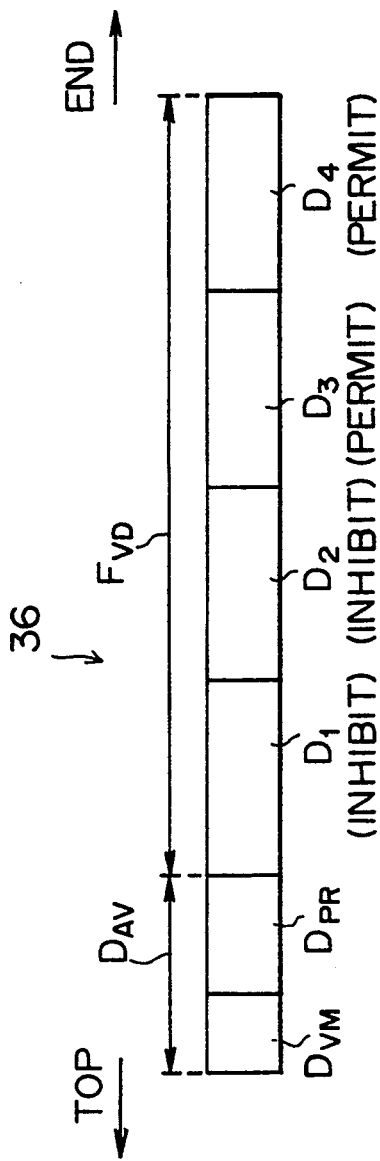
FIG. 15 is a schematic diagram depicting a record inhibiting region on a video tape.

More specifically, the [record permission flags] corresponding to each of the programs $D_1$–$D_4$ recorded in a program information block $D_{PR}$ are illustrated in FIG. 15, wherein the [record permission flags] corresponding to, e.g., the first and second programs $D_1$ and $D_2$ are in the inhibition status. In this case, the programs $D_1$ and $D_2$ are maintained in the record inhibition status (viz., an erase inhibition status). New programs are not recorded in the regions of the programs $D_1$ and $D_2$ on the basis of the start positions of these regions recorded in [start addresses] of the program information $D_{PRX}$ for programs $D_1$ and $D_2$.

Hence, when the user tries to record new programs on the video tape 36, the regions of the programs $D_3$ and $D_4$ in which recording is permitted are detected based on the [start addresses] of the program $D_3$ and $D_4$. Thereafter, the new programs are recorded in the recording regions $D_3$ and $D_4$.

The CPU 8 shifts to a step SP135 to execute the process of the step SP10 of FIG. 7. In consequence of this, the user waits for execution of a take-out instruction of the video cassette 35 or a power-OFF instruction. After executing the instruction, the CPU 8 moves to a subsequent step SP136. The management data stored in the register 44 is written to the management database video track recording region $F_{AVV}$ or the management database audio track recording regions $F_{AVA}$ of the video tape 36. Thereafter, at a step SP137 the CPU 8 executes the take-out action of the video cassette 35 or the power-OFF action in conformity with the user's instruction. At a step SP138, the record permission/inhibition processing mode is terminated.

In this manner, the user is able to confirm the program region in which the program may be erased or should not be erased on the display screens 4A and 6A. The new program may only be recorded in the erase permission program region.

Based on the configuration discussed above, the management data $D_{AV}$ (FIG. 4) is recorded in the management database video track recording region $F_{AVV}$ or the management database audio track recording region $F_{AVA}$ of the video tape 36. In the management data $D_{AV}$, the record permission/inhibition (i.e., erase permission/inhibition) information is recorded as the program information in association with every program recorded on the video tape 36. When setting the video tape 36 in the VTR unit 3, the foregoing information is read to visually display the record permission/inhibition region. Simultaneously, recording of the new program can be inhibited in the record inhibition region.

With this arrangement, the record (erase) permission or inhibition mode can be specified for each of the plurality of programs recorded on the video tape 36.

(2) Variations of Second Embodiment (2-1) The embodiment discussed above has dealt with a case of using the pictorial representation $REC_{OK}$ and $REC_{NO}$ shown in FIG. 13, for indicating the status of the record permission flag. The present invention is not, however, limited to this pictorial representation. Various other pictorial representations and character representations are usable.

(2-2) In the embodiment discussed above the status of the record permission flag is visually displayed. The present invention is not, however, limited to visual display. The flag status may be indicated by voice messages or the like.

(2-3) In the embodiment discussed above the user manually controls the record permission or inhibition status of the record permission flag. The present invention is not, however, limited to this control method. Other methods of controlling the record permission flag are available, wherein, for instance, the record permission flag is automatically set in the record permission status for a program that has been reproduced.

(2-4) In the above-described embodiment, the management data $D_{AV}$ is configured such that the volume information block $D_{VM}$ and the program information block $D_{PR}$ are written sequentially from the top position of the recording track. Instead, however, the block order may be interchanged. A variety of modifications may be effected, wherein fine sectioning is employed for intermixing, as the case may be.

(2-5) The embodiment discussed above has dealt with a case where this invention is embodied in a VTR. Instead, however, this invention is similarly applicable to various other recording/reproducing apparatus, wherein an audio signal is recorded as in a so-called radio built-in cassette tape recorder.

[3] THIRD EMBODIMENT (1) Record Permission/Inhibition Processing Operation

In the third embodiment, the management data $D_{AV}$ is recorded in the management database audio track recording region $F_{AVA}$ or the management database video track recording region $F_{AVV}$ of the video tape 36. To establish a record inhibition status, the user specifies a [record inhibition flag] among the [various flags] provided in the item A9 of the volume information $D_{VMX}$ of the management data $D_{AV}$. The CPU 8 controls the video tape 36 of the video cassette 35 according to the erase inhibition status giving priority to the condition of the mis-erase preventive pawl provided in the box member of the video cassette 35.

More specifically, when the user executes performs the record or record reservation of the VTR 1, the CPU 8 for processing the control data detects the condition of the mis-erase preventive pawl of the loaded video cassette 35 with the aid of the mechanism control CPU 11. The CPU 8 executes a record permission/inhibition processing routine RT71 shown in FIG. 16. Then, the CPU 8 judges whether the program may be recorded or not.

Namely, the record permission/inhibition processing routine RT71 indicates a record permission/inhibition processing operation in the input information process and the management database setting process which are shown in FIGS. 7 and 8. At a step SP140, the management data $D_{AV}$ recorded on the video tape 36 is read by executing step SP35 of FIG. 8. It is determined whether the [record inhibition flag] contained in the [various flags] is in the inhibition status from the volume information $D_{VMX}$ of the management data $D_{AV}$.

If the answer is affirmative, this implies that the program should not be newly recorded on the video tape 36 (i.e., the programs recorded on the video tape 36 should not be erased). At a subsequent step SP141, the CPU 8 sets the VTR unit 3 in the record inhibiting status. Thereafter, the action moves to the step SP28 of FIG. 8, and this processing routine comes to an end at a step SP144.

However, if the answer is negative at step SP140, this implies that the program may be newly recorded on the video tape 36 (i.e., the program recorded on the video tape 36 may be erased). At this time, the CPU 8 shifts to a step SP142. The CPU 8 discerns whether the mis-erase preventive pawl provided in the box member of the video cassette 35 is in the erase inhibition status (viz., the pawl is broken off) or in the erase permission status (i.e., the pawl is unbroken). If it turns out to be in the erase inhibition status, the CPU 8 shifts to the above-mentioned step SP141 to set the VTR unit 3 in the record inhibition status.

However, if it turns out to be in the erase permission status, the CPU 8 shifts to a subsequent step SP143 to set the VTR unit 3 in the record permission status. The process proceeds to step SP28 of FIG. 8, and the processing operation concerned is terminated at the next step SP144.

If the record inhibition flag of the management data $D_{AV}$ recorded on the video tape 36 assumes the record inhibition status, the CPU 8 sets the VTR unit 3 in the record inhibition status irrespective of the condition of the mis-erase preventing pawl provided in the box member of the video cassette 35.

Figure 17:
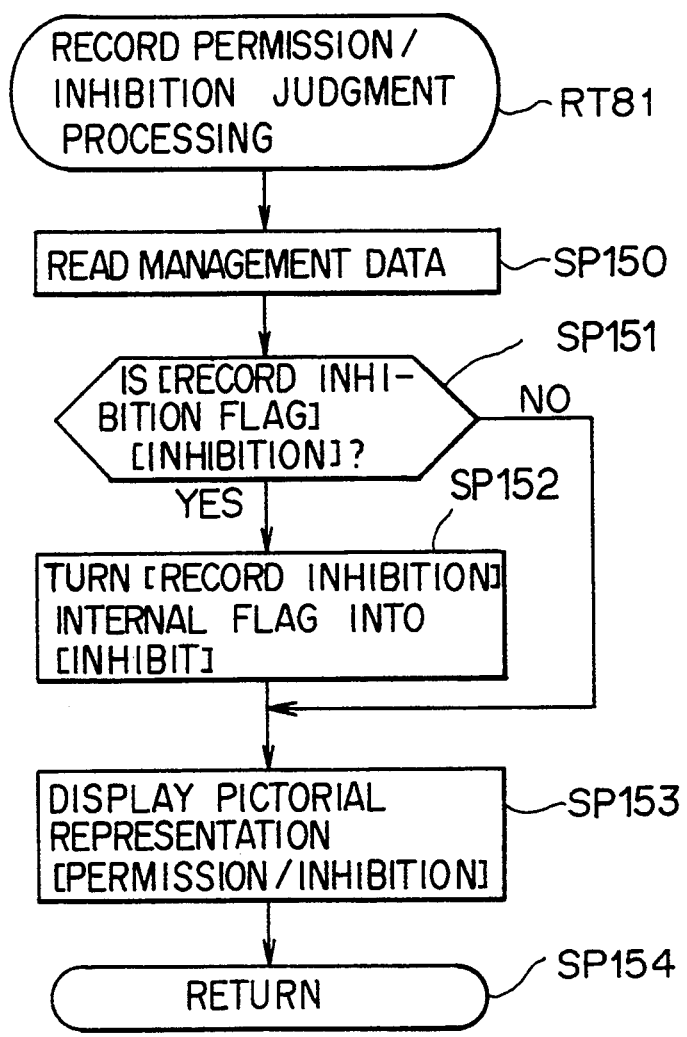
FIG. 17 is a flowchart showing record permission/inhibition determination procedures.

When determining the status of the record inhibition flag at the step SP140, the CPU 8 executes a record permission/inhibition judgement processing routine RT81 shown in FIG. 17.

That is, at a step SP150 the CPU 8 reads the management data $D_{AV}$ recorded on the video tape 36 of the video cassette 35 loaded into the VTR unit 3. At a subsequent step SP151 the CPU 8 judges whether or not the [record inhibition flag] contained in the [various flags] has an inhibition status from within the volume information $D_{VMX}$ of the management data $D_{AV}$.

If the answer is affirmative, this implies that the program recorded on the video tape 36 should be erased (i.e., the program should not be newly recorded on the video tape 36). A [record permission] internal flag of the VTR unit 3 is provided in each program recorded on the video tape 36. At the next step SP152, the CPU 8 changes the [record permission] internal flag from the [record permission] status defined as an initial status to a [record inhibition] status. At a subsequent step SP153, a pictorial representation showing the record inhibition status is displayed on the display screens 4A and 6A.

Whereas if negative, this implies that the program may be newly recorded in a region where the program has been recorded on the video tape 36 (viz., the program recorded on the video tape 36 may be erased). The CPU 8 then jumps over step SP152. At step SP153, a pictorial representation showing the record permission status is displayed on the display screens 4A and 6A.

Thus, the CPU 8 indicates whether all the programs recorded on the video tape 36 of the loaded video cassette 35 may be erased or not on the display screen 4A and 6A. Even when the user tries to record a new program on the video tape 36, the CPU 8 functions, if erase-inhibited, so as not to execute this action.

The CPU 8 returns to the step SP140 of the record permission/inhibition processing routine RT71 (FIG. 16) after shifting to a step SP154.

Hence, the user is capable of discerning from the display screens 4A and 6A whether the management data $D_{AV}$ of the video tape 36 in the loaded video cassette 35 is in a record permission status or in a record inhibition status. In the record permission status, the program can be newly recorded.

In the embodiment discussed above, the record inhibition status (i.e., the erase inhibition status) is specified by the management data $D_{AV}$ giving priority to a condition of the mis-erase preventive pawl set in the box member of the video cassette 35. Based on the management data $D_{AV}$, record inhibition can be specified with other operations such as a record reservation. The ability of the user to exercise control can be further improved, and at the same time mis-erasing can be prevented with assurance.

(2) Variations of the Third Embodiment (2-1) The embodiment discussed above confirms the condition of the mis-erase preventive pawl provided in the box member of the cassette 35 when the record inhibition flag is in the record permission status. The invention is not, however, limited to this method. Record permission or inhibition may be specified based only on the status of the record inhibition flag, as may be necessary.

Figure 18:
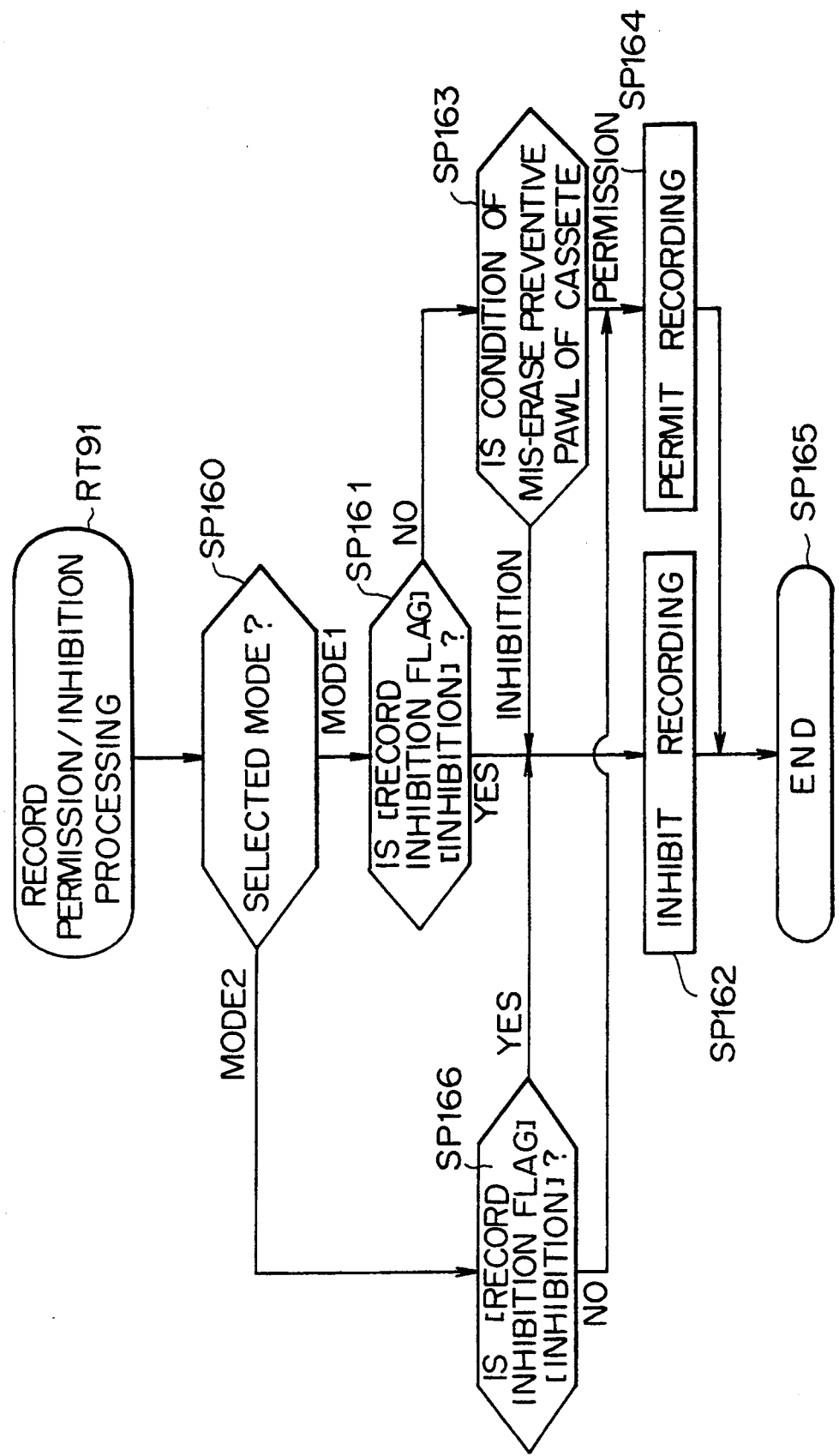
FIG. 18 is a flowchart showing an alternative record permission/inhibition determination procedure.

In this case, a record permission/inhibition processing routine RT91 shown in FIG. 18 is executed. As a result, either a processing mode which takes the mis-erase preventive pawl into consideration may be selected or else a processing mode depending only on the status of the record inhibition flag may be selected.

Figure 16:
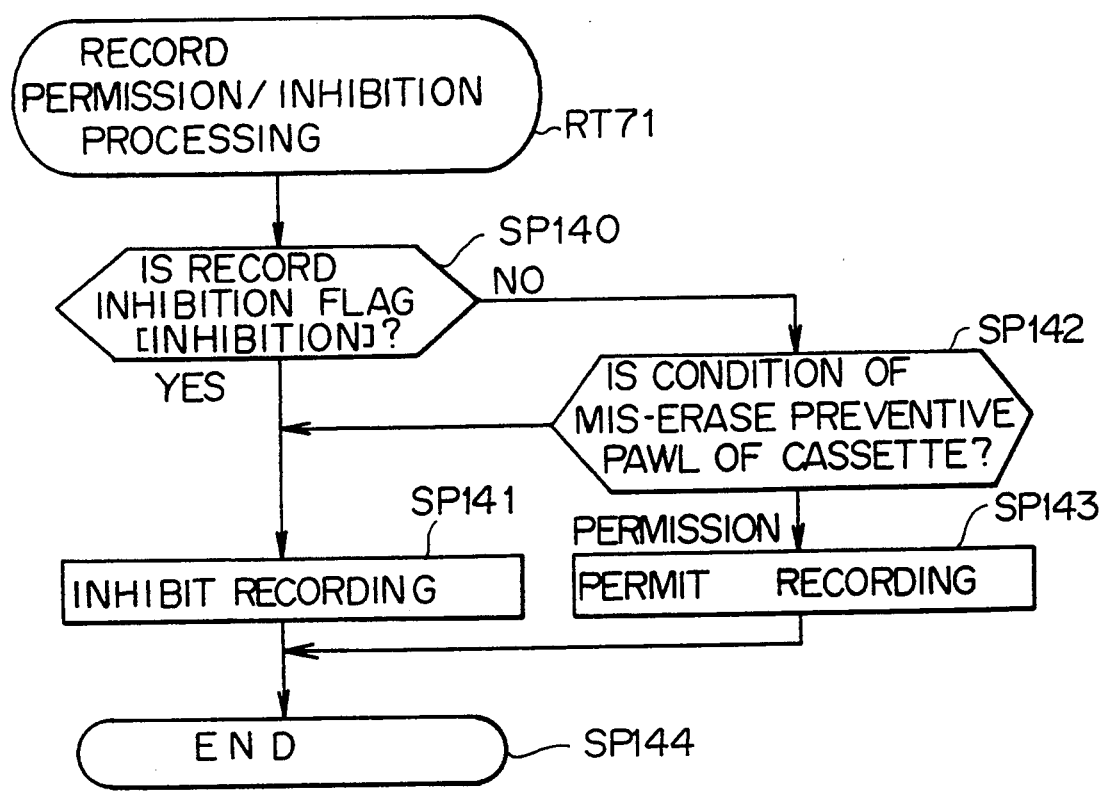
FIG. 16 is a flowchart showing record permission/inhibition processing operations.

If a processing mode 1 as shown in FIG. 18 is selected in step 160, at subsequent steps SP161 through SP164 the CPU 8 executes the same processes as those of the steps SP140 through SP143 (FIG. 16). The CPU 8 thus sets the VTR unit 3 in the record permission or inhibition status. At a step SP165, the processing routine RT91 is finished.

When the processing mode 2 is selected at the step SP160, the CPU 8 shifts to a step SP166. The CPU 8 judges whether or not the record inhibition flag assumes the record inhibition status by executing the same process as in step SP140 (FIG. 16). If an affirmative result is obtained, the CPU 8, after moving to step SP162, sets the VTR unit 3 in the record inhibition status. Thereafter, the routine proceeds to the step SP28 shown in FIG. 8, and the processing routine RT91 is terminated at a step SP165.

If a negative result is obtained, the CPU 8, after shifting to the step SP164, sets the VTR unit 3 in the record permission status. Then, the process continues to the step SP28 of FIG. 8, and the processing routine RT91 comes to an end at a step SP165.

Hence, in the processing mode 2, the CPU 8 is capable of setting the VTR unit 3 in the record permission (i.e., erase permission) state or the record inhibition (viz., erase inhibition) state depending not on the condition of the mis-erase preventive pawl in the box member of the video cassette 35 but only on the status of the record inhibition flag. For instance, the mis-erase preventive pawl of the video cassette 35 may be broken off so that the cassette 35 is in an erase inhibition status. If the record inhibition flag of the management data $D_{AV}$ recorded on the video tape 36 of the video cassette 35 is in the record permission status, the program is recordable on the video tape 36.

(2-2) The embodiment discussed above visually displays the status of the record inhibition flag. The present invention is not, however, limited to such visual display. The flag status may be indicated by a voice message or the like.

(2-3) In the above-described embodiment, the management data $D_{AV}$ is configured such that the volume information block $D_{VM}$ and the program information block $D_{PR}$ are written sequentially from the top position of the recording track. Instead, however, the block arranging order may be interchanged. A variety of modifications may be effected, wherein fine sectioning is done for intermixing as the case may be.

(2-4) The embodiment discussed above has dealt with a case where this invention is embodied in a VTR. Instead, however, this invention is similarly applicable to various other recording/reproducing apparatus, wherein an audio signal is recorded as in the manner of a so-called radio built-in cassette tape recorder.

[4] FOURTH EMBODIMENT (1) Outside Unit Control Process

In the fourth embodiment, the CPU 8 for processing the control management data stores [reserved record control information] as the item B11 (FIG. 6) of the management data $D_{AV}$ with the aid of a user's manual input in step SP32 of FIG. 8. At step SP9 (FIG. 7), [reserved record control information] is written in the management data $D_{AV}$ of the management database video track recording region $F_{AVV}$ or the management database audio track recording region $F_{AVA}$ of the video tape 36.

Figure 19:
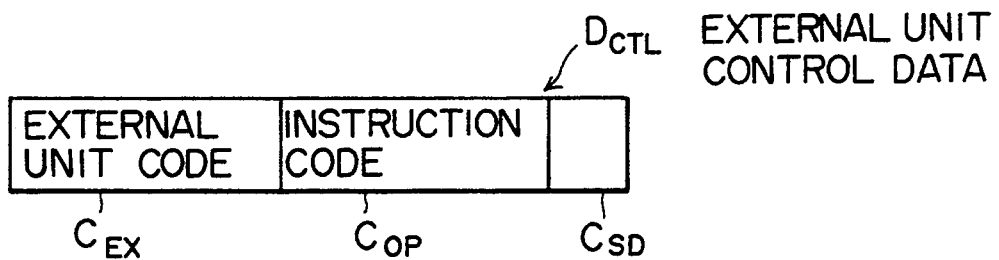
FIG. 19 is a chart showing a configuration of external unit control data.

The external unit control data $D_{CTL}$ indicating the [reserved record control information] is, as illustrated in FIG. 19, composed of an external unit code $C_{EX}$, an instruction code $C_{OP}$ and a transmission code $C_{SD}$. The external unit code $C_{EX}$ consists of code signals for specifying peripheral units connected to the video tape recorder 1. The peripheral units include, as illustrated in FIG. 20, e.g., a BS tuner 61, video tape recorders (VTR) 62, 63 and a television receiver (TV) 64. The transmission code $C_{SD}$ consists of data for discerning the reserved record starting control data or the reproduction control data.

The video cassette 35 in which the management data $D_{AV}$ is written is loaded into the video tape recorder unit 3. In this state, the user selects an item [management database] (SP73) in the [preference setting] step (SP71) shown in FIG. 7. At this time, the CPU 8 for processing the control management data of the video tape recorder 1 stores the management data $D_{AV}$ recorded on the video tape 36 in a management data memory of the register 44. This process is performed via the magnetic head 34, the electromagnetic converting circuit 33, the reproducing circuit 37, the reproduction switching circuit 38, the image recording decoder 52 and the bus 9.

The control management data processing CPU 8 finishes inputting the management data $D_{AV}$. Based on the management data $D_{AV}$ read from the management data memory of the register 44, a reserved record starting time is read for each program. The CPU 8 determines when the present time reaches the reserved record starting time of each program. Based on the external outside unit control data $D_{CTL}$ shown in FIG. 19, the CPU 8 serves to transmit the control signals S30–S33 to the BS tuner 61, the VTRs 62, 63 and the TV 64 which are connected to the video tape recorder 1.

The external unit control data $D_{CTL}$ is composed of the external unit code $C_{EX}$, the instruction code $C_{OP}$ and the transmission code $C_{SD}$. In accordance with the transmission code $C_{SD}$, the control signals S30–S33 are transmitted from the video tape recorder 1 when the reserved record is executed or when reproduction is effected. With this arrangement, whether the BS tuner 61, the VTRs 62, 63 and the TV 64 are controlled is determined.

The control management data processing CPU 8 fetches plural items of external unit control data $D_{CTL}$ corresponding to a first reserved record starting time from the transmission code $C_{SD}$. The control signals S30–S33 composed of the external unit code $C_{EX}$ and the instruction code $C_{OP}$ are transmitted to the BS tuner 61, the VTR's 62, 63 and the TV 64.

The BS tuner 61, the VTRs 62, 63 and the TV 64, when receiving the control signals S30–S33, examine the external unit code $C_{EX}$. When the received external unit code $C_{EX}$ coincides with an intrinsic unit code, the instruction is executed.

Figure 20A:
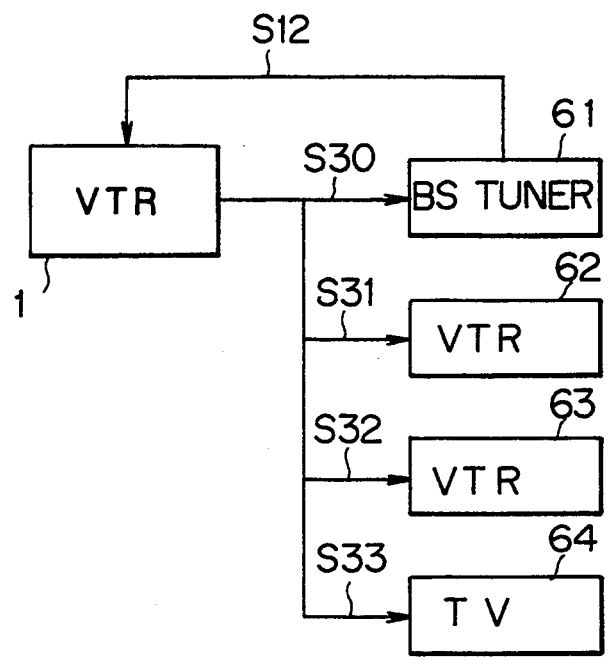
FIGS. 20A–20C are schematic diagrams for explaining a technique for exercising control over external units according to this invention.

The BS tuner 61, as shown in FIG. 20A, determines that the external unit code $C_{EX}$ of the control signal S30 coincides with the intrinsic unit code assigned to the BS tuner 61. A power supply of the BS tuner 61 is turned ON by the instruction code $C_{OP}$. A program is received by setting the receiving channel to, e.g., channel 15. At this time, the video tape recorder 1 receives a video signal or external line video signal S12 of the program which is received by the BS tuner 61.

Thereafter, the video tape recorder 1 (FIG. 1) supplies the external line video signal S12 to the input selecting circuit 23. The video signal S12 is recorded as a recorded video signal S1 on the video tape 36 through a superimpose fader circuit 24.

The CPU 8 fetches the external unit control data $D_{CTL}$ corresponding to the recording time in a second reserved record starting time. In the same way as described above, the control signals S30–S33 are transmitted to the BS tuner 61, the VTRs 62, 63 and the TV 64.

Figure 20B:
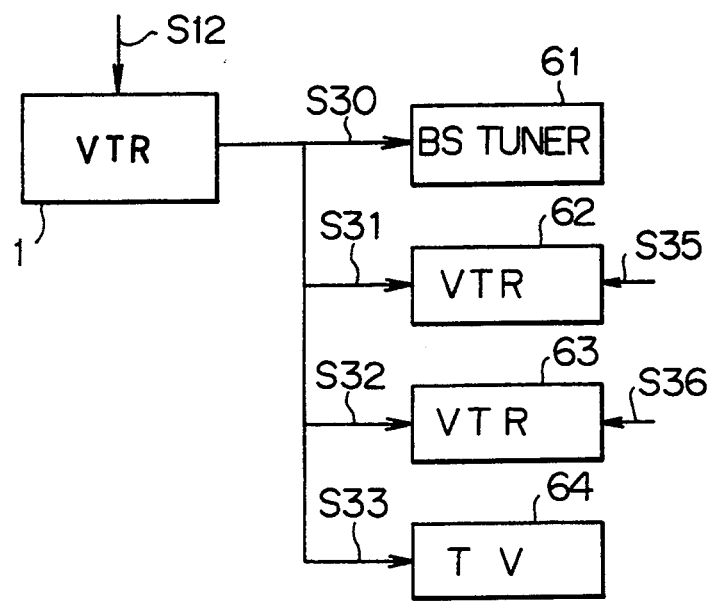

As illustrated in FIG. 20B, the VTRs 62, 63 determine that the external unit codes $C_{EX1}$ and $C_{EX2}$ coincide with the intrinsic unit codes assigned to the VTRs 62, 63 from the control signals S31 and S32. After this determination, the instruction codes $C_{OP1}$ and $C_{OP2}$ function to turn ON a power supply circuit of the VTRs 62, 63. At this time, the VTRs 62, 63 receive video signals as external line signals S35 and S36 from external input terminals. This video signal consists of a received video signal S11 input via the tuner 21 to the video tape recorder 1 or an external line video signal S12. Recording of the video signals is started in accordance with the instructions codes $C_{OP1}$ and $C_{OP2}$. AS a result, the control management data processing CPU 8 causes the video tape recorder 1 to perform the recording process. Simultaneously, the video signals undergo dubbing by means of the VTRs 62, 63.

The CPU 8, when reproducing the recorded program, fetches the external unit control data $D_{CTL}$ from the management data $D_{AV}$ corresponding to the reproduction time for this program. As in the previous case, the control signals S30–S33 are transmitted to the BS tuner 61, the VTRs 62, 63 and the TV 64.

Figure 20C:
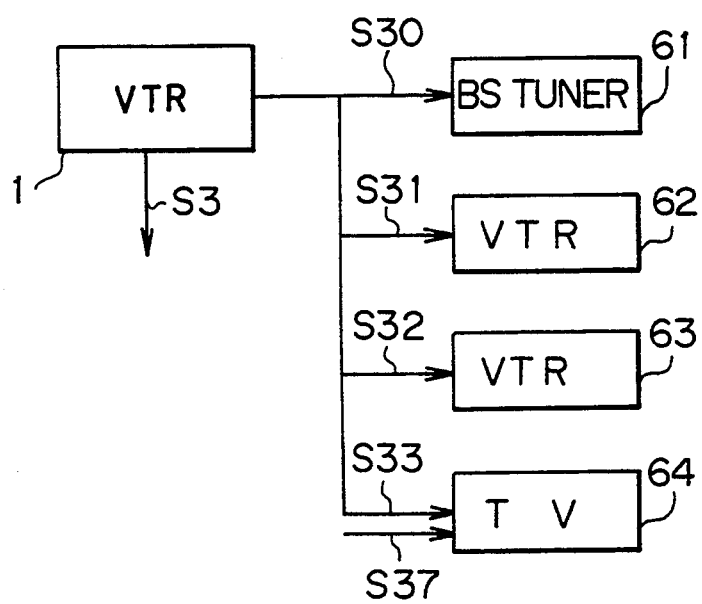

The TV 64 determines, as illustrated in FIG. 20C, that the intrinsic unit code of the TV 64 coincides with the external unit code $C_{EX}$ in the control signal S33. Based on the instruction code $C_{OP}$, a type of surround of the video signal inputted as an external line signal S37 and a volume of surround are controlled.

According to the construction described above, it is possible to control an external unit other than the video tape recorder 1 during reserved recording or reproducing. Elaborate control can be performed for each program.

Figure 21A:
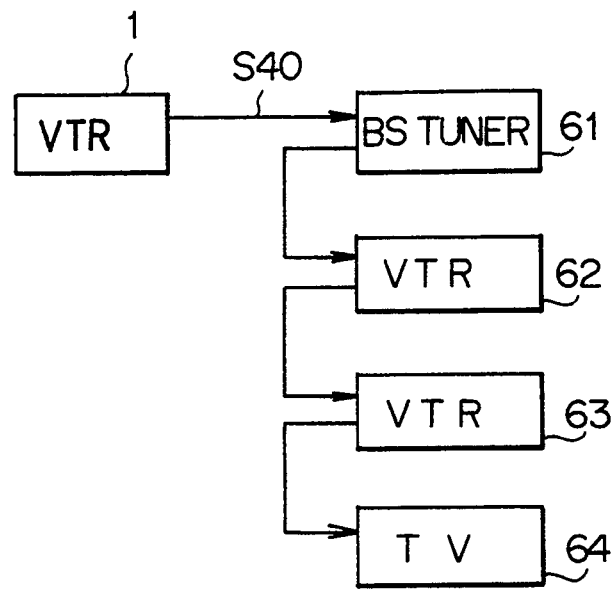
FIGS. 21A–21D are schematic diagrams for explaining alternatives to the technique illustrated in FIGS. 20A–20C.

(2) Variations of Fourth Embodiment (2-1) The embodiment discussed above transmits the control signals S30 through S33 consisting of the same control information to the BS tuner 61, the VTRs 62, 63 and the TV 64 from the video tape recorder 1. According to the present invention, instead of this method, a control signal S40 may, as depicted in FIG. 21A, be supplied via the BS tuner 61, through the VTRs 62, 63 to the TV 64.

Figure 21B:
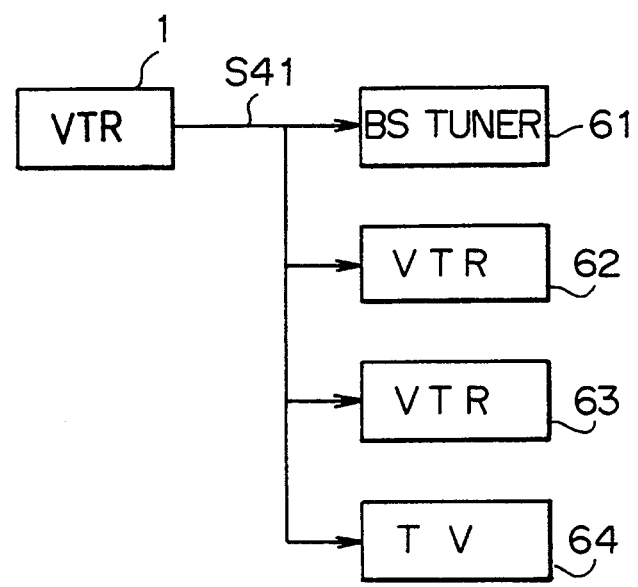

(2-2) The embodiment discussed above transmits the control signals S30 through S33 consisting of the same information to the BS tuner 61, the VTRs 62, 63 and the TV 64 from the video tape recorder 1. According to this invention, instead of the foregoing method, a control signal S41 may, as illustrated in FIG. 21B, be supplied in parallel.

Figure 21C:
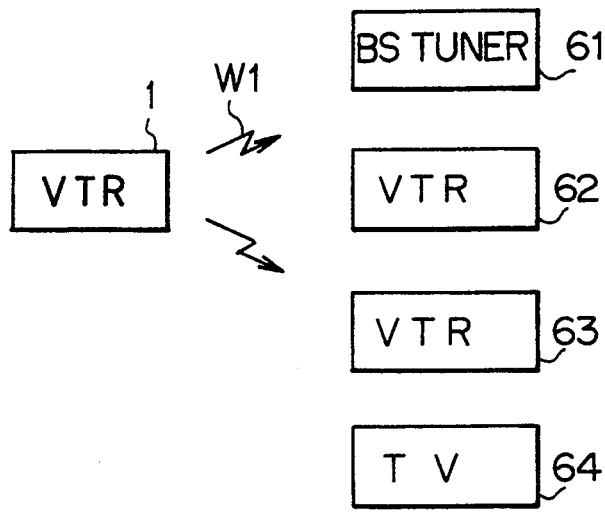

(2-3) The embodiment discussed above transmits the control signals S30 through S33 consisting of the same information to the BS tuner 61, the VTRs 62, 63 and the TV 64 from the video tape recorder 1. According to this invention, instead of the foregoing method, the external unit control data $D_{CTL}$ may, as shown in FIG. 21C, be transmitted without electrical contact with the video tape recorder 1 by means of electromagnetic waves W1 or the like.

Figure 21D:
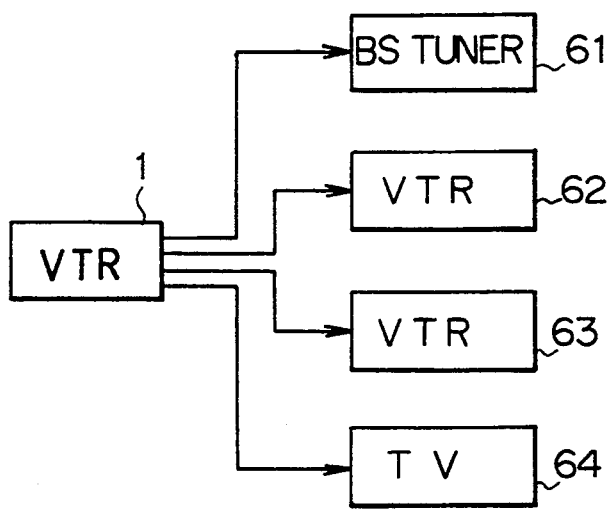

(2-4) In the embodiment discussed above the BS tuner 61, the VTRs 62, 63 and the TV 64 compare the external unit code $C_{EX}$ with an intrinsic unit code to ascertain the destination of the instruction code $C_{OP}$. According to the present invention, instead of the foregoing method, the destination of the instruction code $C_{OP}$ may, as shown in FIG. 21D, be determined from the external unit code $C_{EX}$ in the control management data processing CPU 8. Control may be effected in such a way that the instruction code $C_{OP}$ is transmitted from the video tape recorder 1 to the external unit concerned.

(2-5) In the embodiment discussed above the BS tuner 61, the VTRs 62, 63 and the TV 64 are connected as external units to the video tape recorder 1. The invention is not limited to this arrangement. The invention is applicable where a plurality of external units execute a plurality of instructions.

(2-6) In the embodiment discussed above the present invention is embodied in the video tape recorder 1. The invention is not limited to this application but is widely applicable to information recording/reproducing apparatus such as radio cassettes.

[5] FIFTH EMBODIMENT (1) Recorded Program Flag Writing Process

Figure 22:
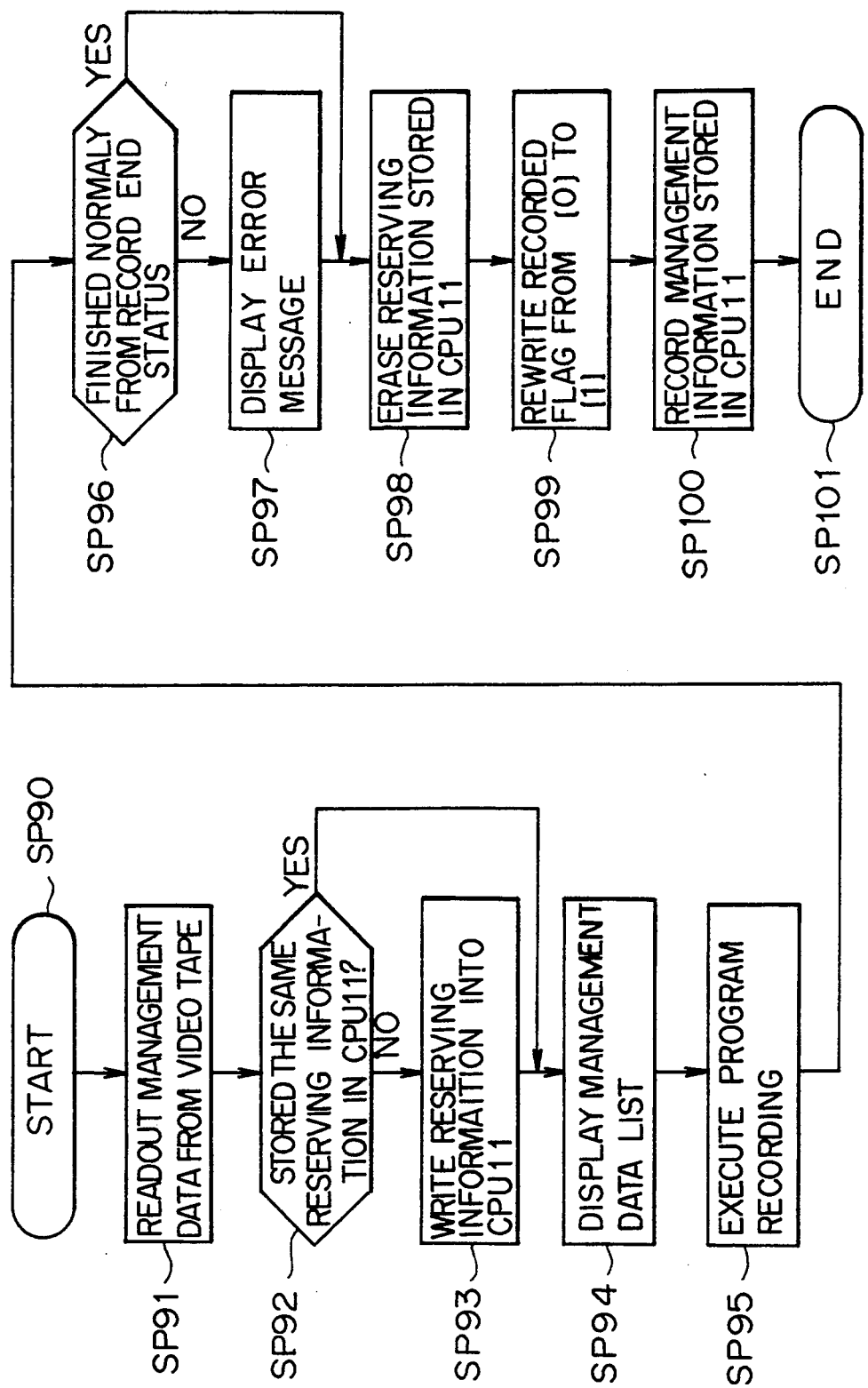
FIG. 22 is a flowchart showing a recorded flag data writing process.

In the fifth embodiment, when the video cassette 35 is loaded into the video tape recorder unit 3, a management data mode instruction key 6F of the remote controller 6 (FIG. 10) is simultaneously switched ON. The control management data processing CPU 8 enters a management data $D_{AV}$ readout mode at a step SP90 (FIG. 22). At a step SP91, the CPU 8 reads the management data $D_{AV}$ into a register 44 from the management database video track recording region $F_{AVV}$ or the management database audio track recording region $F_{AVA}$ formed on the video tape 36. This readout process is effected through the electromagnetic converting circuit 33, the reproducing circuit 37, the reproducing switching circuit 38 and the image recording decoder 52.

Subsequently, at a step SP92 the CPU 8 determines whether a reservation memory incorporated into the video tape recorder unit 3 has stored the same reservation information as that written in [record start time] of the item B9 and [record end time] of the item B10 which constitute the program information $D_{PRX}$ (FIG. 6) within the management data $D_{AV}$ read into the register 44. If the answer is negative, at a step SP93 the reservation information in the register 44 is written as reserved record data in a reservation memory of the mechanism control CPU 11. The process advances to a step SP94.

If the answer is affirmative, this implies that the reservation information written in the register 44 has already been written in the reservation memory of the mechanism control CPU 11. If so, the control management data processing CPU 8 jumps from the step SP92 directly to a step SP94.

At the step SP94, the CPU 8 serves to display portions of the reservation information for, e.g., four registered programs stored in the reservation memory of the CPU 11. The reservation information is, as depicted in FIG. 13, graphically displayed in the form of a list HY0 composed of graphic display elements arranged one line per program. A reservation status is thus indicated to the user.

Figure 23:
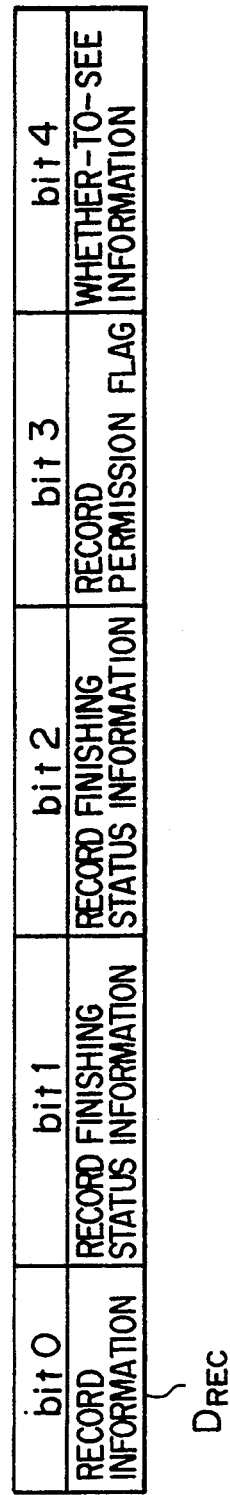
FIG. 23 is a chart showing a variety of flags.

Eventually, the present time reaches the record start time written in the register 44. At this time, the control management data processing CPU 8 proceeds to record a program on the video tape 36 at a step SP95 with the aid of the mechanism control CPU 11. This recording process is performed by transmitting control information S6 via a bus 10 to the video tape recorder unit 3. The recording of this program is finished. Thereafter, the CPU 8 either stores information indicating that the recording has been finished normally or else an abnormal state appears in first and second bits of [various flags] (FIG. 23) of the item B3 of the management data $D_{AV}$ recorded in the register 44.

Subsequently, at a step SP96 the CPU 8 determines from a record end status recorded in the item B3 of the management data $D_{AV}$ whether the recording was finished normally. If an abnormality occurs during recording, at a step SP97 the CPU 8 indicates an error message on the display screen 4A of the monitor 4 and the display screen 6A of the monitor 4 and the display screen 6A of the remote controller 6. The process continues to a step SP98.

Contrastingly, if recording is finished normally, the CPU 8 shifts from the step SP96 to the step SP98. The reservation information stored in the reservation memory of the CPU 11 is erased. At a step SP99, a 0th bit representing a recorded program flag (FIG. 23) of the item B3 is rewritten from a logic [0] state (indicating that the relevant program is now in the reserved status) into a logic [1] state (indicating that the relevant program is now in the recorded status). This rewriting process is effected while holding the [record start time] of the item B9 and the [record end time] of the item B10 in the management data $D_{AV}$ stored in the register 44. As a result, the [record start time] and the [record end time] stored as the reservation information are rewritten as the [record start time] and the [record end time] stored as the recorded information of the recorded program.

The user manipulates an eject key of the video tape recorder unit 3 to instruct the ejection of the video tape cassette 35. At this time, the control management data processing CPU 8 functions to rewind the video tape 36 to a tape top position at a step SP100. Subsequent to this step, the CPU 8 records the management data $D_{AV}$ stored in the register 44 in the management database video track recording region $F_{AVV}$ formed on the video recording track TA, TB of the video tape 36. This recording process is executed through the recording encoder 51, the electromagnetic converting circuit 33 and the magnetic head 34.

The control management data processing CPU 8 ejects the video tape cassette 35 at a step SP101, and the process concerned comes to an end.

Based on the construction discussed above, the recorded program flag $F_{REC}$ is, after finishing the recording of the program, rewritten from a logic [0] state representing the reserved status to a logic [1] state representing the recorded status. It is therefore possible to redesignate the [record start time] and the [record end time] written as reservation information, e.g., in the items B9 and B10 as the [record start time] and the [record end time] of a recorded program. Hence, there is no necessity for having a data region corresponding to each of the reservation information and the recorded information. Besides, the rewriting process of the data can be minimized. The data process can be simplified correspondingly.

(2) Variations of Fifth Embodiment (2-1) The embodiment discussed above controls management of the [record start time] and the [record end time], i.e., the record reserving information as the recorded information in accordance with the recorded flag $F_{REC}$. The present invention is not, however, limited to this method. This invention is applicable for recording reserving information such as [channel], [category], [title] and the like.

(2-2) The embodiment discussed above has dealt with a case where the reserving information already exists at the step SP94. The invention is not limited to this situation but is also applicable in the following case. If recording is initiated manually because no reserving information has been stored, the data written in the management data memory of the register 44 through the CPU 8 is employed as the reserving information.

(2-3) In the embodiment discussed above, the management data $D_{AV}$ is configured such that the volume information block $D_{VM}$ and the program information block $D_{PR}$ are written sequentially from the top position of the recording track. Instead, however, the block arrangement order may be interchanged. A variety modifications may be effected, wherein fine sectioning is employed for intermixing as the case may be.

(2-4) In the embodiment discussed above, the management database audio track recording region $F_{AVA}$ is provided at a top portion of the video tape 36. Other portions may be used for this purpose.

(2-5) The embodiment discussed above embodies the invention in a video tape recorder. Instead, this invention is widely applicable to electronic devices for consumer user such as a radio cassette or the like, whereby the same advantages realized in the above embodiment can be obtained.

[6] SIXTH EMBODIMENT (1) Input of Subscriber Data

In a sixth embodiment, the user is able to employ a [timer reservation] process executed at a step SP81 of FIG. 7 and a [management data reservation] process executed in a subroutine RT3 of FIG. 8. The apparatus then waits for an input of the subscriber data $D_{PRG}$. The CPU 8 causes the keyboard 12 or the remote controller 6 to input a subscriber name $D_{VAME}$, e.g., [CHICHI].

The letters of the subscriber name $D_{NAME}$ may be sequentially input one by one; or alternatively the subscriber name may be input by selecting it from a subscriber list previously registered by the user.

The CPU 8, after finishing the input of the subscriber name $D_{NAME}$, writes the subscriber name $D_{NAME}$ as subscriber data $D_{PRG}$ in the item B13 of program information $D_{PRX}$ stored in the management data memory of a register 44 via a bus 9.

Concurrently, the CPU 8 causes the items [registration], [modification] and [reference] to be displayed on the display screens 4A and 6A. Pending user selection of the respective items at steps SP51–SP53 or SP82–SP84, the programs are reserved by using the displayed items [calendar reserving table], [one-week reserving table] and [one-day reserving table] at subsequent steps SP54–SP56 or SP85–SP87.

The timer reservation processing loop is then finished. After terminating the input of a start time and/or end time of the reserved program, as illustrated in FIG. 24, the CPU 8 causes the display screens 4A and 6A to provide a reserving display DISP1 indicating a time zone of the reserved program which has already been registered.

In this embodiment, the reserving representation DISP1 is composed of items such as a reserved date, record start time, a record end time and a subscriber name for the reserved program PRG which has been registered. For instance, in the case of a reserved program PRG1, [5.28 (Monday) 21:00–22:00 CHICHI] is displayed in the first line. This indicates that CHICHI (father) has a reserved program in the time zone from 9:00 AM to 10:00 PM, Monday, May 28. The second line of a reserved program PRG2 indicates that HAHA (mother) has a reserved program in the time zone from 8:00 PM to 10:00 PM, Tuesday, May 29. The contents are thus recognized at a glance.

Subsequently, the user instructs the keyboard 12 or the remote controller 6 to display a reservation list LIST of, e.g., [CHICHI] as a reservation list for a particular subscriber. At this time, the CPU 8 retrieves the data inputted under the name [CHICHI] in the subscriber data $D_{PRG}$ of the item B13 within the registered reserved program PRG data stored as program information $D_{RPX}$ in the register 44. Displayed on the display screens 4A and 6A, as shown in FIG. 25, are the father's reserved programs PRG11, PRG12, PRG13 . . . as a reservation display DISP2.

In this embodiment, the reservation display DISP2 is arranged such that the information [reservation list of CHICHI] is displayed at the uppermost position as a reservation list for the subscriber name $D_{NAME}$. Displayed in a lateral line sideways from the left side at a second level are items such as a reservation date, a record start time and record end time of the program which is registered by reservation at present. It is possible at a glance to grasp and recognize the registration status of the reserved programs PRG11, PRG12, PRG13 . . . which have been registered by [CHICHI].

Figure 26:
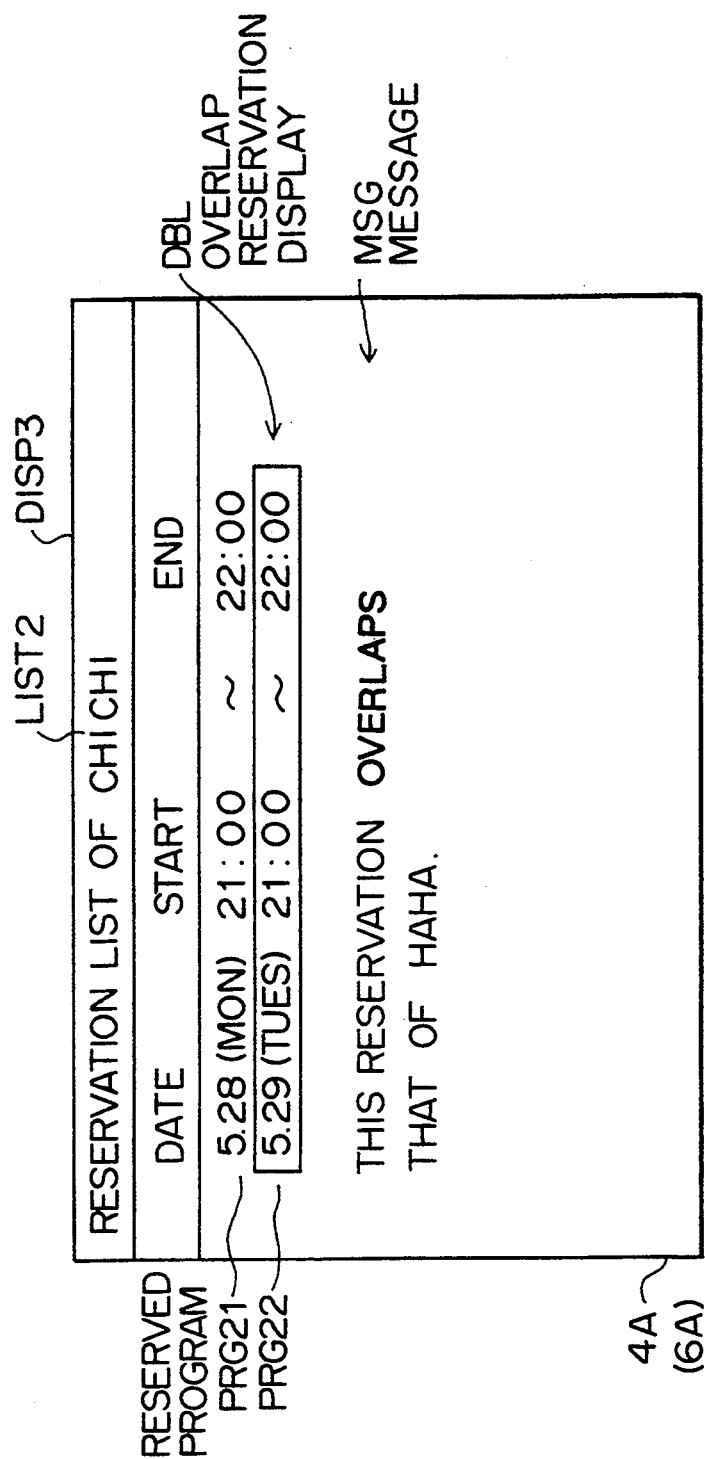
FIG. 26 is a chart showing an overlap reservation display.

At this time, when the user specifies a display of overlapping reservations, CPU 8 retrieves those programs having time zones overlapping those of the reserved programs registered by other subscribers among the time zones of the reserved programs PRG11, PRG12, PRG13 . . . shown in the reservation display DISP2. When retrieving a program having the overlapped time zone, an overlap reservation display DISP3 shown in FIG. 26 is displayed on the display screens 4A of the monitor 4 and on the display screen 6A of the remote controller 6.

In accordance with this embodiment, the overlap reservation display DISP3 is arranged as follows. A reserved program PRG22 (9:00 PM-10:00 AM, Tuesday, May 29) having an overlapping time zone is displayed in the form of an overlap display DBL. Displayed at a lower stage on the display screens 4A and 6A is a message MSG indicating [this reservation overlaps that of HAHA]. This implies that the time zone has already been reserved by mother.

When the user would register a new program, the time zone of this program overlaps that of the registered program. In this case, it is feasible to discern the other user of this time zone. The reservation can be effected in order to avoid the overlap by consulting with the other user.

As a result, programs having higher priorities can safely be registered with assurance by reservation.

In the configuration discussed above, when reserve-registering the new programs in a video tape recorder commonly employed by a plurality of users, the subscribers are registered beforehand. It is possible to confirm who reserved the programs. The reservation data of the individual users can be retrieved and displayed as well. Every user is thus able to easily grasp the reservation status of each user.

If a time zone of the newly reserved program overlaps that of an already registered reserved program, it is possible to confirm who registered the reserved program. After consulting with the user concerned, a modification or cancellation of the reserved data can be executed. It is therefore feasible to effectively avoid a situation in which a program highly important to a user is not recorded, or only partial recording thereof is effected.

(2) Variations of Sixth Embodiment (2-1) In the embodiment discussed above the subscriber name $D_{NAME}$ is input before recording the program by reservation. The present invention is not, however, limited to this method. The subscriber name $D_{NAME}$ may instead be input after the reservation information.

(2-2) In the embodiment discussed above the subscriber name $D_{NAME}$ added to the program data is used for displaying the registered program list, the registration information according to subscriber names and overlapping reservations. The present invention is not, however, limited to this representation. The subscriber name $D_{NAME}$ may be displayed in a variety of processing modes in association with the reservation information.

(2-3) In the embodiment discussed above, as illustrated in FIGS. 24 through 26, the reservation information is displayed in the form of characters, numerals and the like on the display screens 4A and 6A. The present invention is not, however, limited to this method. The information may be displayed by using graphic images.

(2-4) In the embodiment discussed above the subscriber data $D_{PRG}$ consisting of the subscriber name $D_{NAME}$ is added to the program information $D_{PRX}$ of the program registered by reservation. The present invention is not, however, limited to this method. The subscriber data $D_{PRG}$ may also be added to the registered program and then stored. With this arrangement, the previously recorded data for each user is displayed for selecting the recorded program to be reproduced.

(2-5) In the embodiment discussed above, this invention is applied in a video tape recorder. The present invention is not, however, limited to a VTR but is widely applicable to electronic devices for consumer use such as a radio cassette.

[7] SEVENTH EMBODIMENT (1) Input Guide Display by Characters

Figure 9:
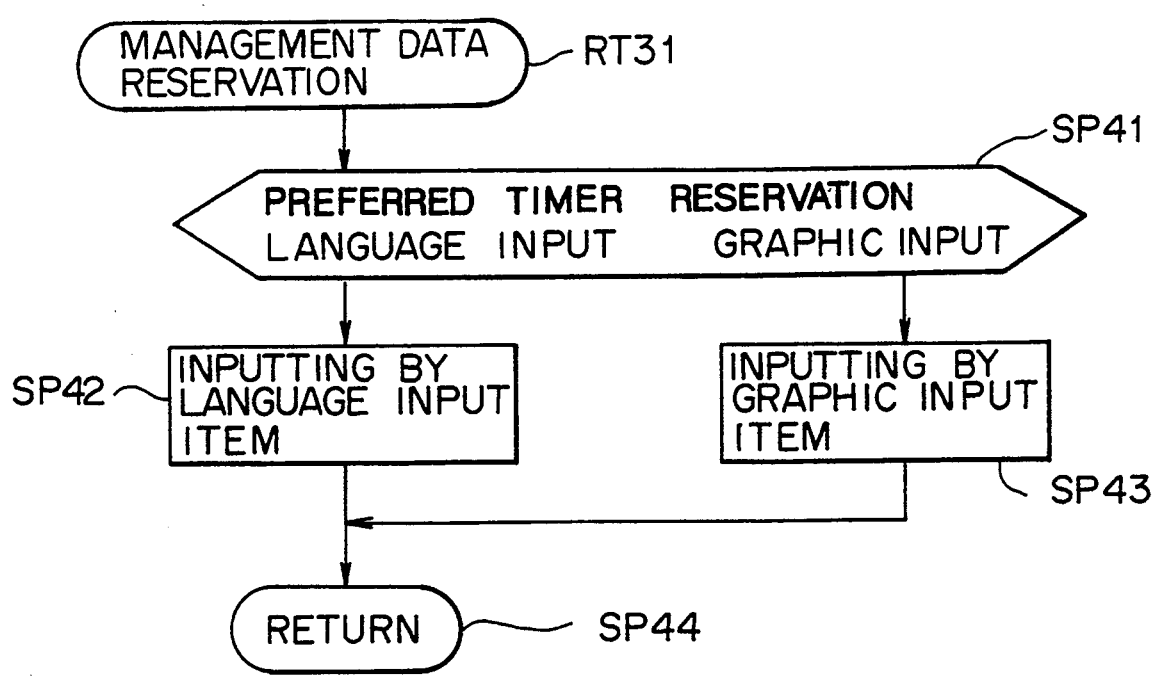

In a seventh embodiment, the CPU 8 executes the input information processing procedures shown in FIGS. 7 through 9. In this case, it is required at a multiplicity of processing steps that the user be prompted to effect the input operation and be informed of any operational mistake as well as any abnormality in the electronic device.

Figure 27:
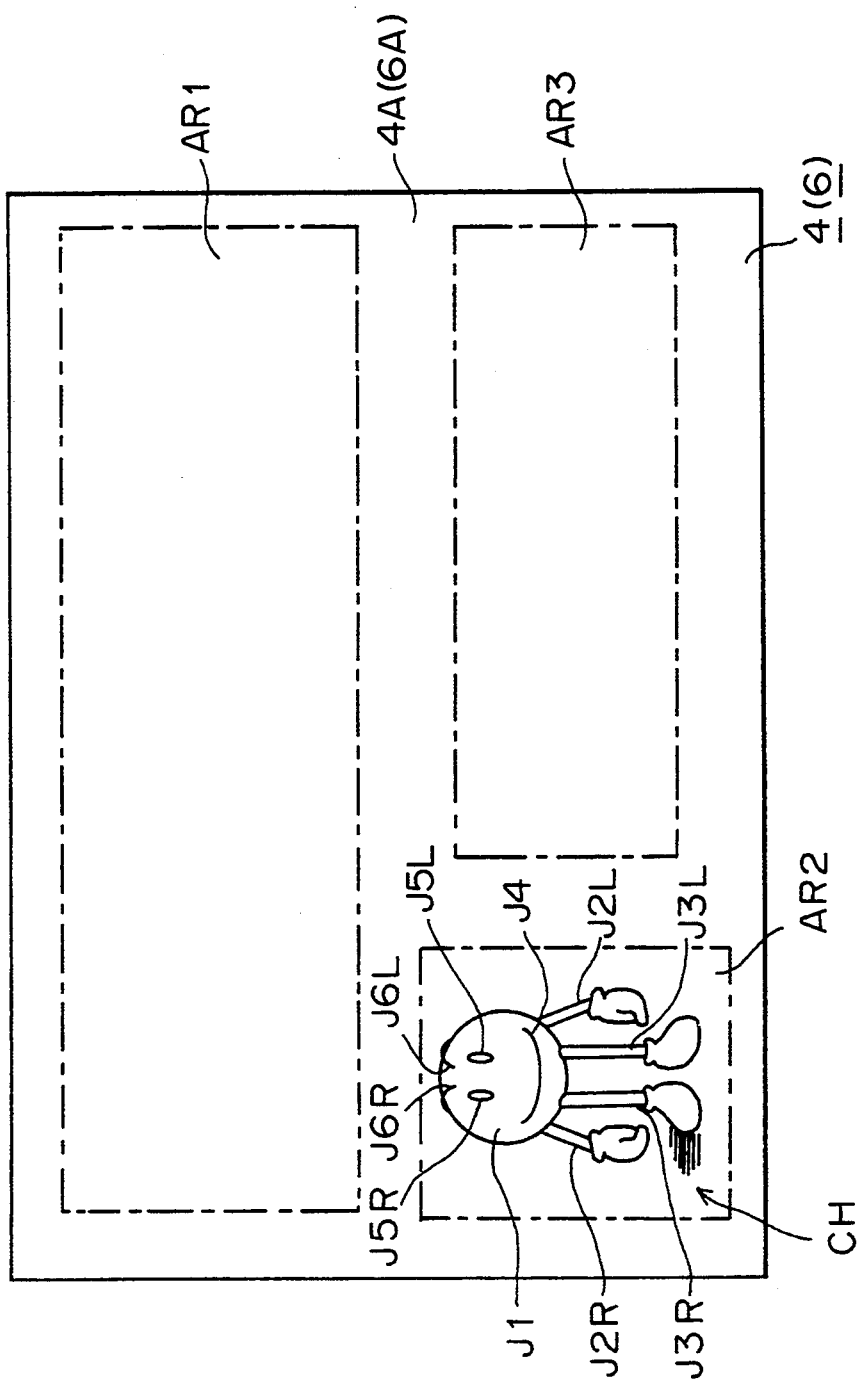
FIG. 27 is a front elevation view of a display screen.

In such case, the CPU 8 causes the display screen 4A or 6A to display a guide character CH shown in FIG. 27 which is a function of the message system shown in block BK5F of FIG. 2.

In this embodiment, a graphic display region AR1 is provided in an upper half of the display screen 4A or 6A. Displayed in this graphic display region AR1 is a list containing pictorial elements, numeric elements and letter elements which indicate items specified by the user. A character display region AR2 for displaying the guide character CH is provided below the graphic display region AR1. A message display region AR3 for displaying messages is similarly provided.

The guide character CH is composed of personified pictorial elements. As shown in FIG. 27, a face element J1, left/right hand elements J2L, J2R and left/right leg elements J3L, J3R are depicted on the display screens 4A and 6A. In this manner, a plurality of actions of the guide character CH are expressible as an animated picture.

Added to the face element J1 are illustrations of a mouth element J4, left/right eye elements J5L, J5R and left/right eyebrows J6L, J6R. Owing to this representation, a plurality of expressions of the guide character CH can be provided as an animated picture.

(2) Basic Image of Character and its Action

The guide character CH, as depicted in FIGS. 28 through 44, is formed of a basic picture having characteristics of its own and combined with motion pictures for providing the basic picture with motions.

Figure 28:
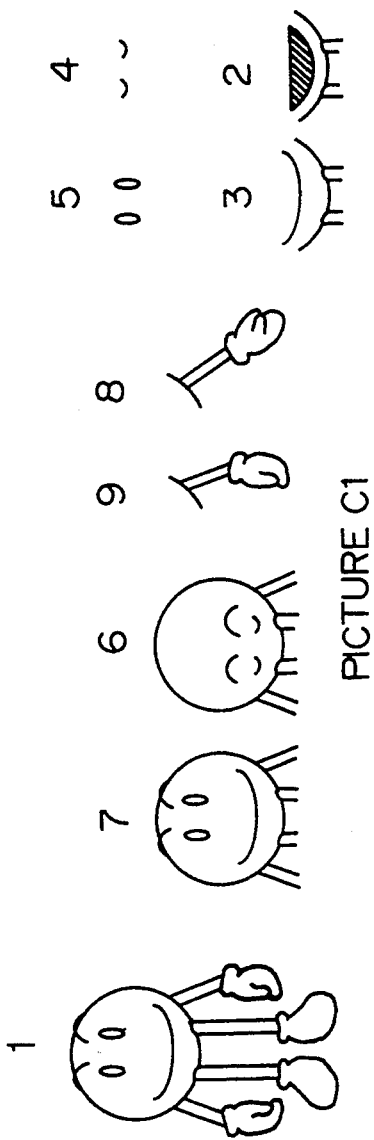

A picture C1, as illustrated in FIG. 28, consists of a basic picture 1 with the guide character CH standing, a motion picture 2 with the mount element J4 open, a motion picture 3 with the mount element J4 closed, a motion picture 4 with the eye elements J5L and J5R closed, a motion picture 5 with the eye elements J5L and J5R open, a motion picture 6 with the face element J1 inclined downwardly, a motion picture 7 with the face element J1 upright, a motion picture 8 with the left hand element J2L projecting slightly sideways and a motion picture 9 with the left hand element J2L lowered.

The mouth element J4 moves as if the guide character CH were speaking when, as shown in a motion row 1-A of picture C1 in FIG. 45A, the motion pictures 2 and 3 are alternately displayed with the passage of depiction periods $T_1, T_2, T_3$. . . The left/right eye elements J5L and J5R move as if the guide character CH were blinking occasionally when, as shown in a motion row I-B, the motion picture 4 is intermittently displayed during depiction periods $T_4, T_9, T_{14}$. . . between displays of the motion picture 5 with the passage of the depiction periods $T_1, T_2, T_3$. . . The left hand element J2L moves as if the guide character CH were moving the left hand slightly sideways while turning over the left palm when, as shown in a motion row 1-C, the motion picture 8 is displayed during the depiction periods $T_{12}, T_{13}$, and $T_{14}$ between displays of the motion picture 9 with the passage of the depiction periods $T_1, T_2, T_3...$ The face element J1 moves as if the guide character were bowing when, as shown in a motion row 1-D, the motion picture 6 is displayed only for the depiction periods $T_3$ and $T_4$ between displays of the motion picture 7 with the passage of the depiction $T_1, T_2, T_3...$ When specifying the picture C1, the guide character CH occasionally blinks with the passage of the depiction periods $T_1, T_2, T_3...$ In the meantime, the guide character CH speaks words, for example, [Good morning. Perform a record reservation please]. Simultaneously, the guide character CH bows by lowering its head while speaking [... morning]. Immediately, the character CH makes a motion which prompts the user to effect an input operation with the left hand while speaking [Please].

Thus, the picture C1 displays the guide character CH which requests an input after appearing on the display screens 4A and 6A and making a bow.

Figure 29:
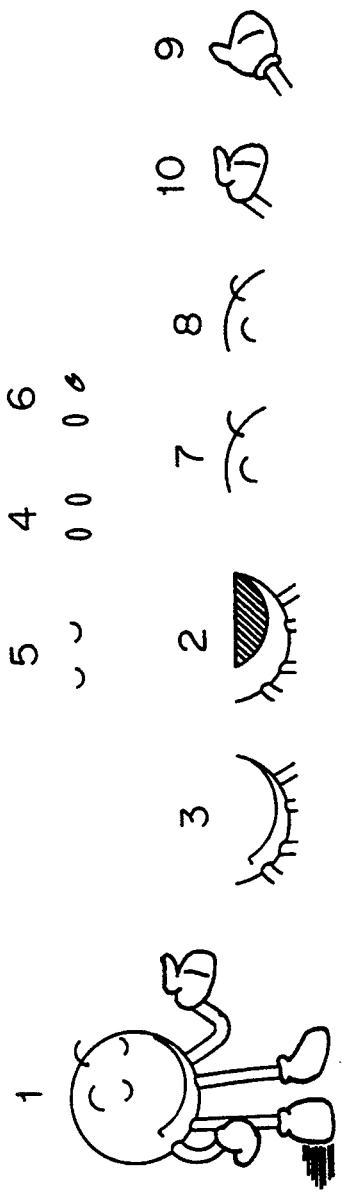

Similarly, a picture C2 includes the basic picture 1 which, as illustrated in FIG. 29, strikes a pose which requests a confirmation by bending the left hand while standing obliquely leftwards. As shown in a motion row 2-A of the picture C2 of FIG. 45A, the mouth element J4 moves as if speaking. The left/right eye elements J5L and J5R occasionally blink as shown in motion row 2-B. As shown in motion row 2-C, the left eye element J5L winks once for every four times the eyes are closed. The left/right eyebrow elements J6L and J6R act as shown in motion row 2-D. Occasionally, the left eyebrow element J6L is turned up slightly. The left hand element J2L, as shown in motion row 2-E, acts in such a way that the palm is expanded and occasionally is inclined slightly upward.

In this manner, the actions expressed by the picture C2 request confirmation of the information in the display regions AR1 and AR3 on the display screens 4A and 6A.

Pictures C3 through C6 are intended to change the behavior of the guide character CH during a period in which the user has not yet carried out an input operation in the waiting status. The picture C3 acts as follows. As illustrated in FIG. 30, the basic picture 1 stands striking a pose suggesting that an input operation is expected. Although in the motion picture C2 the left/right eye elements J5L and J5R are closed, in the motion picture C3, the eye elements are opened. The eyes blink as indicated in motion row 3-A of the picture C3 of FIG. 45B.

The picture C4 acts in the following manner. As depicted in FIG. 31, the basic picture 1 strikes a pose in which the left/right hand elements J2L and J2R join together behind the head. In this pose, as shown in motion row 4-A of picture C4 in FIG. 45B, the eyes blink when with the left/right eye elements J5L and J5R of the pictures 3 and 4 are opened and closed. Subsequently, after a waiting time, e.g., 90 seconds, has elapsed, as shown in motion rows 4-B and 4-BX, the character CH yawns every, e.g., 9 seconds, as indicated by the actions of the motion pictures 2 and 3 of the eye elements J5L and J5R and of motion pictures 2X and 3X of the mouth element J4.

After an input waiting time of 2 minutes has passed from this state, as shown in motion rows 4-C and 4-CX of FIG. 45B, the guide character CH sleeps standing up with its mouth closed in combination with the actions of the motion picture 4 of the eye elements J5L and J5R and of the motion picture 4X of the mouth element J4.

If the input waiting time further extends to 150 seconds, as shown in motion row 5-A of picture C5 of FIG. 45B and FIG. 32, the guide character CH sleeps leaning backwards.

If the input waiting time further extends to 3 minutes, as shown in motion row 6-A of the picture C6 of FIG. 45B and FIG. 33, the guide character CH sleeps lying down.

Figure 34:
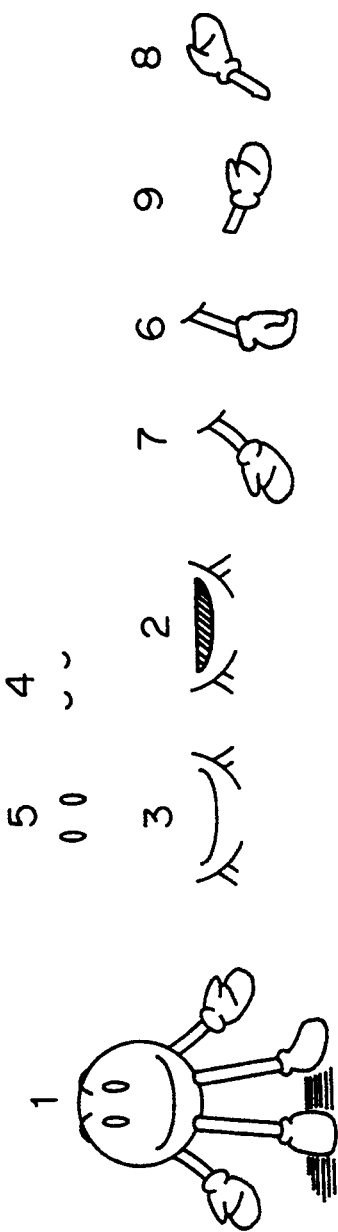

As depicted in FIG. 34 a picture C7 includes a basic picture 1 in which both of the hands are expanded. As shown in motion rows 7-A, 7-B, 7-C and 7-D for picture C7 of FIG. 45B, the character CH appears to speak as depicted by the actions of the mouth element J4 in pictures 2 and 3. The character CH appears to blink due to the actions of the left/right eye elements J5L and J5R of the pictures 4 and 5. The right hand element J2R is occasionally lowered as in the way expressed by the motion pictures 6 and 7 and the left hand element J2L raises its palm as in the way expressed by the motion pictures 9 and 8.

Thus, the picture C7 exhibits a motion requesting reoperation when an error occurs in the input operation.

Figure 35:

A picture C9 includes a basic picture 1 in which, as depicted in FIG. 35, both palms are raised up to the shoulders. The character CH appears to speak as the mouth element J4 moves as shown in motion row 9-A of picture 9C in FIG. 45A.

Thus, the motions depicted by the picture C9 indicate an error in an input sentence.

Figure 36:
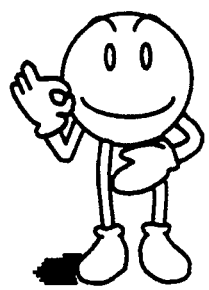

In a picture C11, as depicted in FIG. 36, the right hand element J2R displays an OK sign. This action is continuously displayed as shown in the row C11 of FIG. 45C. The user is thus informed that the system has determined that the result is proper (OK) after the confirmation.

Figure 37:
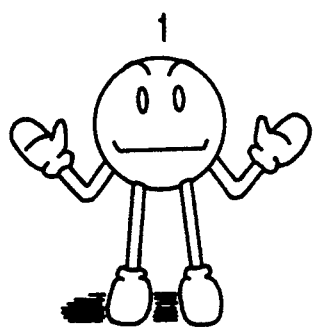
Figure 37:
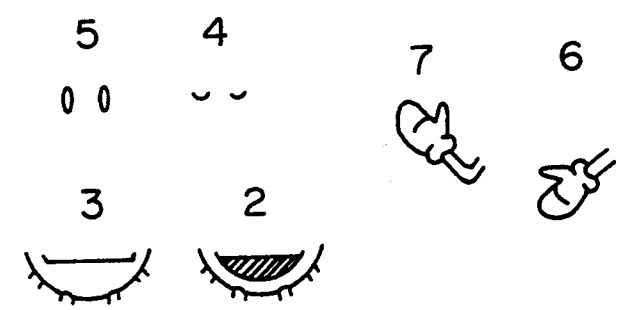

The basic picture 1 of a picture C12, as depicted in FIG. 37, strikes a pose in which its hands are raised with both palms open. As shown in motion rows 12-A, 12-B and 12-C for picture C12 in FIG. 45C, the character CH appears to speak due to the actions of the mouth element J4 of the motion pictures 2 and 3. The character CH appears to blink due to the actions of the left/right eye elements J5L and J5R of the motion pictures 4 and 5. The right hand element J2R reciprocates once between high and low positions as in the way depicted by the motion pictures 6 and 7.

In this manner, the actions of the guide character CH in picture C12 inform the user of an inferred condition of the system during, e.g., record waiting.

Figure 38:
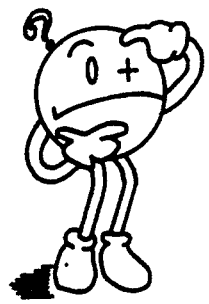

A picture C13, as illustrated in FIG. 38, expresses embarrassment. The picture C13 is, as shown in FIG. 45C, continuously displayed. This informs the user of an error in the input operation.

Figure 39:
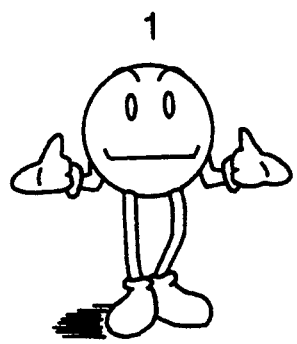
Figure 39:
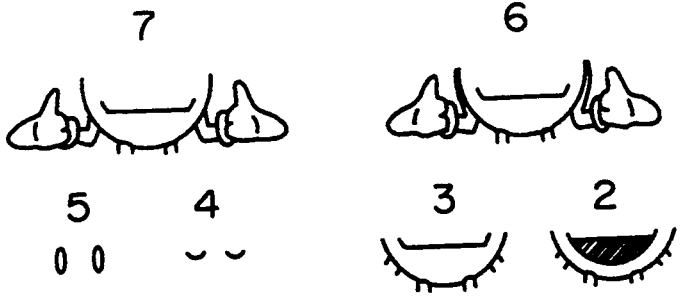

As depicted in FIG. 39, the basic picture 1 of a picture C14 strikes a pose in which the character CH shrugs with the left/right hand elements J2L and J2R expanded. In this pose, as shown in motion rows 14-A, 14-B and 14-C for picture C14 in FIG. 45C, the character CH appears to speak due to the actions of the mouth element J4 in motion pictures 2 and 3 of FIG. 37. The character CH appears to blink due to the actions of the left/right eye elements J5L and J5R shown in motion pictures 4 and 5. The positions in which the left/right hand elements J2L and J2R are raised change as in the way depicted in motion pictures 6 and 7.

Thus, the picture C14 of the guide character CH indicates an error in the input.

Figure 40:
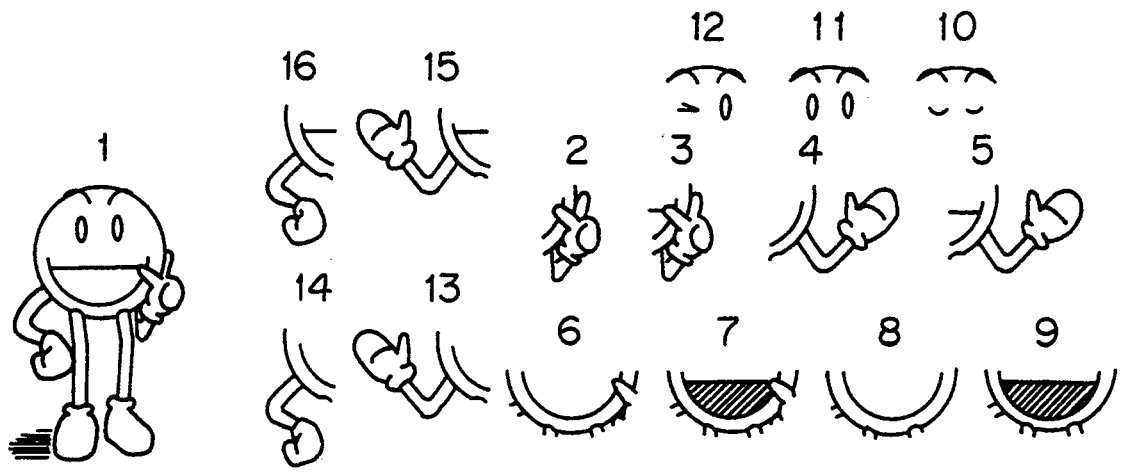

The basic picture 1 of the picture C15, as depicted in FIG. 40, exhibits a V-sign with the left hand element J2L disposed in front of the face. As shown in motion rows 15-A and 15-AX for picture C15 in FIG. 45D, the character appears to speak due to the actions of the mouth element J4 and the left hand element J5L in the motion pictures 6 and 7 of FIG. 40. Thereafter, the motion pictures 5 and 9 or 4 and 8 are combined to move the left hand aside the face while speaking. Subsequently, speech continues with actions of the motion pictures 8 and 9. Then, the pictures 3 and 7 or 2 and 6 are combined to move back the left hand to the position in front of the face while speaking. Speaking further continues with subsequent actions of the pictures 7 and 6.

Concurrently with this action, as shown in motion rows 15-B and 15-C, the right eye winks as depicted by the motion picture 12 in combination with the left/right elements J5L and J5R. Thereafter, the eyes blink as depicted by the motion pictures 11 and 12. At the same moment, the right hand element is raised up to the position of the face while being expanded as shown in the motion pictures 13 and 15. Subsequently, the right hand element returns to its original position as shown in the motion pictures 14 and 16.

Thus, the picture C15 of the guide character CH indicates an error in the input sentence.

Figure 41:
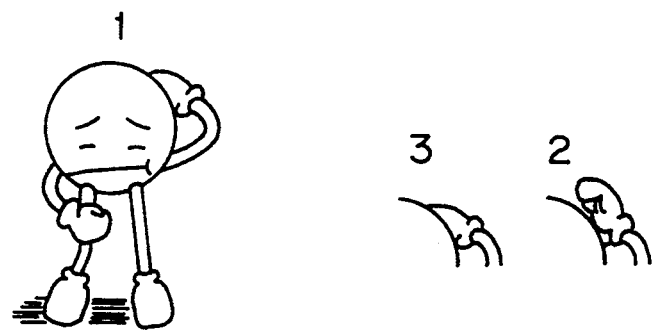

The basic picture 1 of a picture C16, as illustrated in FIG. 41, expresses sadness by lowering its head. In this pose, as shown in motion row 16-A of the picture C16 of FIG. 45D, the character CH scratches its head using its left hand as depicted by the motion pictures 2 and 3.

Thus, the picture C16 of the guide character CH informs the user of an operational mistake in the system.

Figure 42:
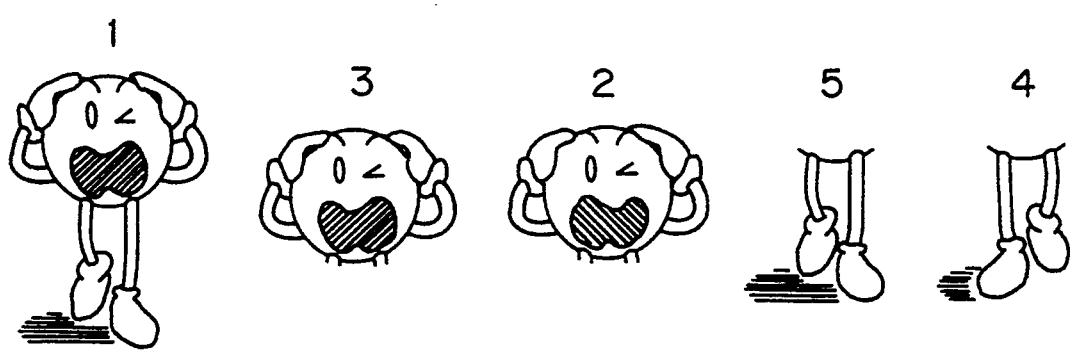

The basic picture 1 of a picture C17 appears to shout loudly with both hands holding its head as depicted in FIG. 42. In this pose, as shown in motion rows 17-A and 17-B of picture C17 in FIG. 45D, the character CH appears to speak due to the actions of the motion pictures 2 and 3. The character CH simultaneously stamps its feet as depicted by the motion pictures 4 and 5.

Thus, the picture C17 of the guide character CH informs the user of an abnormality caused in the system.

Figure 43:
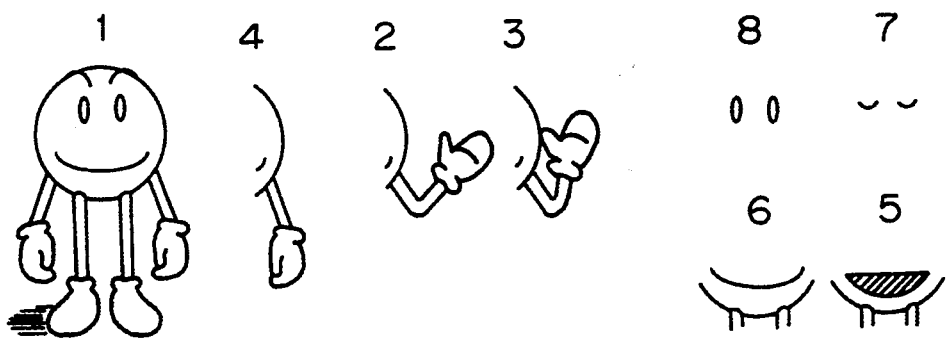

The basic picture 1 of a picture C1-B shows the character standing erect in FIG. 43. As shown for picture C1-B of FIG. 45D, the character CH appears to speak by virtue of the motion pictures 5 and 6 and appears to blink due to the motion pictures 7 and 8. The left hand waves as a result of the motion pictures 2 and 3 and thereafter moves back to the original position as shown in motion picture 4.

Thus, the picture C1-B of the guide character CH expresses a "goodbye" before disappearing from the screen.

Figure 44:
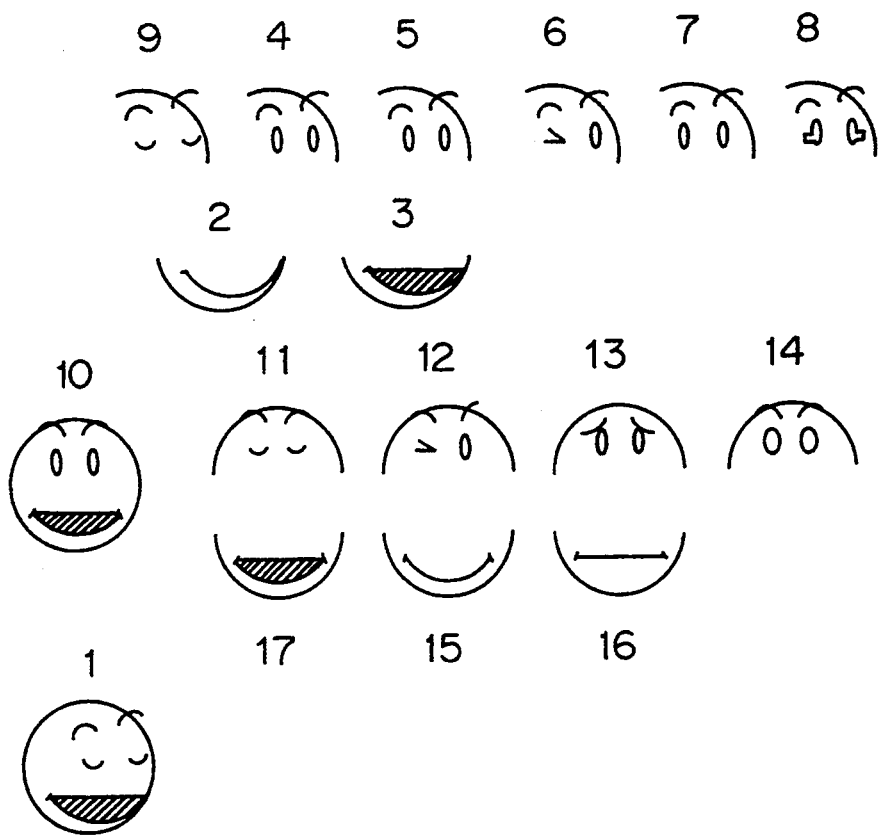

The basic picture 1 of a picture KA0 depicts a smiling face directed obliquely forwards as illustrated in FIG. 44. In this pose, as shown for picture KA0 of FIG. 46A, the character CH assumes a variety of expressions.

An expression of [message 1] in FIG. 46A is shown as follows. As shown for motion A, the character CH appears to speak as the motion pictures 2 and 3 alternate. Simultaneously the eyes appear to blink as depicted by the motion pictures 5 and 9. Thereafter, the eyes appear to open as shown in motion picture 4 while turning up the left eyebrow. This expression continues.

An expression of [message 2] is shown as follows. As shown for motion B, the character CH appears to speak due to the actions of the motion pictures 2 and 3. The eyes gradually open as depicted by the motion pictures 5, 9 and 4 in sequence while speaking. From this state, the eyes close after temporarily turning up the left eyebrow and then open. Subsequently, the right eye winks as depicted by motion picture 6. Then, the eyes blink due to the actions of the motion pictures 5, 9 and 4.

An expressions of [message 3] are described as follows. As shown for motion C, the character CH appears to speak due to the motion pictures 2 and 3. The eyes blink with the motion pictures 4 and 9 while speaking. Thereafter, the eye position moves sideways with the motion picture 7 and then returns.

An expression of [waiting 1] is described as follows. As shown for motion D, the mouth closes with an action of the motion picture 3. In this state, the eyes appear to blink as shown by the motion pictures 5 and 9 and thereafter move sideways with the motion picture 7. After this movement, the eye position returns. Such motions are repeated.

An expression of [message 4] is described as follows. As shown for motion E, the character CH appears to speak as shown in the motion pictures 15 and 17. In this state, the eyes blink by alternately repeating actions of the motion pictures 11 and 14.

An expression of [message 5] is described as follows. As shown for motion F, the character CH appears to speak with the actions of the motion pictures 15 and 17. The eyes blink once as shown in the motion pictures 11 and 14 while speaking. Thereafter, the right eye winks as depicted by the motion pictures 12 and 14. Then blinking resumes with the motion pictures 11 and 14.

An expression of [waiting 2] is described as follows. As shown for motion G, the character CH looks confused with the eye's corners turned down as in the motion picture 13. Simultaneously, the mouth closes straight and opens as shown in the motion pictures 16 and 17.

(3) Animated Action
(3-1) Timer Reservation and Management Data Reservation

When reserving management data in subroutine RT3 (FIG. 8) and a timer reservation at a step SP81 (FIG. 7), the control management data processing CPU 8 causes the display screens 4A and 6A to display the guide character CH. The user is in turn able to read a request depending on whether an input operation is needed corresponding to variations in scene from motions or expressions of the guide character CH.

[Scene 1]
To start, the user manipulates a menu display mode specifying key 6E (FIG. 10) of the remote controller 6. At this time, the CPU 8 correspondingly specifies the motions 1-A, 1-B and 1-D of picture C1 (FIG. 45A). As depicted in FIG. 28, the basic picture 1 of the guide character CH appears on the display screen and then speaks. Besides, the eyes blink, and the character CH bows. A greeting is thus displayed.

[Scene 2]
Subsequently, the CPU 8 specifies the motions 1-A, 1-B and 1-C of picture C1 (FIG. 45A). The CPU 8 causes the guide character CH to speak per the basic picture 1 of the picture C1 (FIG. 28). The palm of the left hand is turned over laterally with the eyes blinking, thus prompting the user to input.

[Scene 3]
Next, the CPU 8 specifies the basic picture 1 of picture C1. The guide character CH stands with its face indicating that it is awaiting something. This indicates a state where the system waits for the input of the user.

[Scene 4]

If this waiting status continues for 10 seconds, the CPU 8 specifies motion number 3-A of the picture name C3 for display (FIG. 45B). The eyes of the basic picture 1 of the picture C3 (FIG. 30) then blink. This informs the operator of a desire for effecting the input operation quickly, because the waiting time is increasing.

[Scene 5]

If no input is thereafter performed by the user, and when the waiting time exceeds 30 seconds, the CPU 8 specifies motion number 4-A of the picture name C4 for display (FIG. 45B). In the basic picture 1 of the picture C4 (FIG. 31) in which the eyes blink is displayed, thus expressing a tired look to the user due to the long wait.

[Scene 6]

If the input waiting status further continues, and after only 90 seconds have passed, the CPU 8 specifies motions number 4-B and 4-BX of the picture C4 for display (FIG. 45B). A mouth in a yawn is expressed by actions of the pictures 2X and 3X of FIG. 31 and corresponding eye movements are expressed by pictures 2 and 3. The yawning mouth and eyes are displayed at intervals of 9 seconds. The guide character CH intermittently yawns and blinks. The user is thus informed that the wait for the input is long enough to cause satiation.

[Scene 7]

If the input waiting status further continues, and after 2 minutes have elapsed, the CPU 8 specifies the motions 4-A and 4-CX of picture C4 (FIG. 45B) for display. The motion pictures 4 and 4X of picture C4 (FIG. 31) are displayed as if the guide character CH dozes with the eyes closed. The user is thus informed that the input waiting status continues enough to cause dozing.

[Scene 8]

If the input waiting status further continues, and after 150 seconds have passed, the CPU 8 serves to display the picture C5 (FIG. 32). The guide character appears to sleep leaning backwards. The user is thus informed that the input waiting status continues to such extent.

[Scene 9]

If the input waiting status further continues, and after 3 minutes have elapsed, the CPU 8 then displays the picture C6 (FIG. 33). Since the guide character CH is now sleeping lying down, the user is informed that the input waiting status has continued to this extent.

[Scene 10]

The operator is aware of the pose of the guide character CH and performs inputting during any of the waiting states of [Scene 3] through [Scene 9]. In this case, the CPU 8 determines whether the input sentence is deficient when the input operation is finished. If deficient, the picture C15 (FIG. 40) is specified for display. The item input is pointed out by the left hand of the basic picture 1 thereof. From this state, the right eye winks slightly. Thereafter, both hands are expanded away from the face. This motion implies that the user is prompted to carry out a further input operation.

[Scene 11]

If it is determined that a mistake exists in the input sentence when the user terminates inputting, the CPU 8 causes the guide character to express incomprehensibility by displaying the picture C13 (FIG. 38) only for approximately 1.5 seconds. After this step, the picture C9 (FIG. 35) is displayed, whereby the motions of the guide character CH express an error. Subsequently, the picture C15 (FIG. 40) is displayed, whereby the motions of the guide character CH express a desire that the input operation be corrected. The user is thus informed of this matter.

[Scene 12]

There is an error when finishing the input operation, the CPU 8 causes the guide character CH to shrug with both palms moving up and down by displaying the picture C14 (FIG. 39). Thereafter, the picture C7 (FIG. 34) is displayed, whereby the character CH strikes a pose such that the left palm is open and slightly raised. This informs the user that a further input is desired.

[Scene 13]

It is desired that the input result be confirmed when the user finishes the input operation. In this case, the CPU 8 causes the guide character CH to strike the following pose by displaying the picture C2 (FIG. 29). The character CH assumes a slightly oblique posture in which the left palm moves slightly while the left eye winks. This motion expresses a desire for a confirmation to prompt the operator.

[Scene 14]

If the system is in a record standby status when the operator performs recording, the CPU 8 infers the present status. After this inference, the picture C12 (FIG. 37) is displayed. Thus, the guide character CH moves the right hand up and down while the character appears to speak as it carries out an explanation. The user is thus informed that the system remains in the record standby status.

[Scene 15]

In this manner, the user completes all the timer reservations and selects an item [end]. At this time, the CPU 8, when displaying the picture C1-B (FIG. 43), causes the guide character CH to give a good-by sign with the left hand waving slightly. The user is thus notified of an end of the management data reservation mode or the timer reservation mode.

(3-2) Record Standby

When the video tape recorder unit 3 is brought into the record standby status, the CPU 8 makes the display screen indicate a cause thereof as a message. The guide character CH serves to inform the user of the content thereof.

[Scene 21]

When the record standby status is adopted, the CPU 8 at first functions to display the picture C1 (FIG. 28). Then, the guide character CH appears to express a greeting. After this step, the character CH strikes a pose which requests an input. This notifies the user that the record standby status is adopted.

Subsequently, the CPU 8 serves to display the picture C2, to help point out a message on the display screen.

Thereafter, when the input operation is subsequently required, the user is informed of the desire to re-effect the input operation by the picture C1 (FIG. 28).

However, if an input is unnecessary, the picture C1-B (FIG. 43) is displayed. The guide character CH is displayed while giving a good-by sign.

[Scene 22]

The record standby status may result from an error in the input operation. In this case, the CPU 8 functions to display the picture C1 (FIG. 28), whereby the guide character CH appears to express a greeting. After this action, the character CH strikes a pose which requests an input. Thereafter, the picture C7 (FIG. 34) is displayed. A message is displayed on the display screen indicating the error in the input operation. The guide character CH assumes an explanatory pose for this. The picture C1 (FIG. 28) or the picture C1-B (FIG. 43) is then displayed, and the guide character CH exits.

[Scene 23]

The CPU 8 infers the cause for the record standby status and informs the user of this cause. In this case, the CPU 8 makes the guide character CH appear by using the picture C1 (FIG. 28). After this action, the picture C12 (FIG. 37) is displayed on the display screen to strike a pose for explaining a preset situation. The picture C1 (FIG. 28) or the picture C1-B (FIG. 43) is temporarily displayed. The guide character CH then exits.

[Scene 24]

If the record standby status results from an error in the input sentence, the CPU 8 displays the picture C1 (FIG. 28). The guide character CH then appears to explain the error in the input sentence in the picture C15 (FIG. 40). After this explanation, the picture C1 (FIG. 28) or the picture C1-B (FIG. 43) is displayed, with the result that the guide character CH exits.

(3-3) Standby Waiting Status

The user manipulates a menu display specifying key 6E of the remote controller 6 in the input information processing procedures of FIG. 7. An initial waiting status results to await the user's specification of the items [management data], [system setting], [preference setting] and [timer reservation]. At this time, the CPU 8 makes the guide character appear in the form of the picture C1 (FIG. 28). After this step, the CPU 8 causes the guide character CH to strike a pose to request the input operation.

(3-4) Guide by Face Expression

The CPU 8 sends messages in the man-machine interactive mode at the respective steps and awaits responses from the user. These operations are repeated. When displaying the messages or awaiting the responses, the motion numbers A, B, C, E and F, or D and G of the picture KA0 (FIG. 50) are specified for display. A variety of expressions as necessary are indicated to the user each time. The CPU 8 thus informs the user of its requests.

(3-5) Power Turn-ON Status

When the user turns ON the power supply at the step SP1 of FIG. 7, the CPU 8 specifies the picture C1 (FIG. 28) for display. The guide character CH then appears to greet the user. Thereafter, the character CH strikes a pose requesting the input operation.

(4) Variations of Seventh Embodiment (4-1) The embodiment of the present invention discussed above is applied to a video tape recorder. The present invention is not, however, limited to a VTR but may be widely applied for use where the instructive information is input to electronic devices for consumer use such as, a so-called radio cassette.

(4-2) In the embodiment discussed above the guide character exhibits poses or expressions to indicate the contents of messages in combination with the display thereof. Instead of a message display, or in combination with a message display, the user may be guided by a pictorial display and a list display. In short, the user is informed of the operating state of an electronic device by means of interactive display elements on a display screen. The guide character exhibits poses and expressions to attract the user's attention.

While a preferred embodiment of the invention has been described, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A device for controlling a program reproducing apparatus comprising:
   a recording medium;
   a recording track formed in said recording medium and including a management database recording region and a program recording region in which programs are recorded,
   management data recorded in said management database recording region and being in a form which is reproducible by the program reproducing apparatus for controlling
   the management by the program reproducing apparatus of said programs recorded on said recording medium,
   said management data recorded in said recording region including, for each of said programs, reproduction data representing information indicating whether the respective one of said programs has been reproduced previously from said recording medium; and
   means for displaying to a user the information represented by said reproduction data.

2. A program storage device for use with a recording apparatus comprising:
   a recording medium formed with recording tracks operative to record at least one program in a program portion thereof, wherein a management database recording region is formed in predetermined portions of said recording tracks;
   management data recorded in said management database recording region, the management data corresponding to the at least one program;
   the management data including program reservation information prior to recording of said at least one program for reserving the recording of said at least one program during a predetermined time period by said recording apparatus and a recorded program flag which is operative when changed to a recorded program state by the recording apparatus upon the recording of said at least one program to redesignate said program reservation information as recorded program information.

3. The program storage device of claim 2, wherein said management data includes erase permission information corresponding to said at least one program and which is operative when reproduced by a reproducing device to selectively permit and inhibit erasing of said at least one program by the reproducing device.

4. The program storage device of claim 2, wherein said management data includes external unit control data which is operative when reproduced by a reproducing device to control an external unit coupled with the reproducing device.

5. The program storage device of claim 2, further comprising means for displaying to a user said program reservation information and said recorded program information.

6. The program storage device of claim 2, further comprising means for identifying the existence or nonexistence of a recording space in said program portion of said recording tracks.

7. A program storage device for controlling the display of program reservation information by a program recording and reproducing apparatus, the program reservation information indicating the reservation of a predetermined program by a respective subscriber to be recorded in the future, comprising:

a recording medium formed with recording tracks;

management data corresponding to at least one program, the recording tracks having management database recording regions provided therein; said management data being recorded in at least one of said management database recording regions, said management data being operative to control a display of program reservation information by the subscriber for said at least one program by the program recording and reproducing apparatus.

8. A recording and reproducing apparatus having an interactive information input device for prompting an input operation by a user by means of an interactive display representing operating conditions of said recording and reproducing apparatus operatively associated with the interactive information input device, comprising:

recording and reproducing means for recording and reproducing signals on a recording medium;

user operable input means for entering commands in said recording and reproducing apparatus for controlling the operation thereof;

message display means for providing a display of an interactive display message to the user for assisting the user in operating the input means; and a character display means for displaying in association with the interactive display means a personified guide character exhibiting expressions and actions corresponding to the contents of the interactive display message;

said character display means being operative to display said personified guide character as an animated picture comprised of personified pictorial elements;

the character display means being operative to display at least one of the pictorial elements of the personified guide character by selecting said at least one pictorial element from a plurality of predetermined depiction pictorial elements for providing a selected one of a plurality of possible guide character animated pictures.

9. The recording and reproducing apparatus of claim 8, wherein said recording and reproducing means records and reproduces programs on said recording medium, and wherein one of said commands records erase permission information with one of said programs on said recording medium and which is operative when reproduced to selectively permit and inhibit erasing of said one of said programs.

10. The recording and reproducing apparatus of claim 8, wherein said recording and reproducing means is operable to record and reproduce a program on said recording medium, and wherein one of said commands displays to a user information indicating whether said program recorded on said recording medium has been reproduced previously from said recording medium.

11. The recording and reproducing apparatus of claim 8, wherein said recording and reproducing means is operable to record and reproduce external unit control data which is operative when reproduced to control an external unit coupled with said recording and reproducing apparatus.

* * * * *